United States Patent
Klassen et al.

(10) Patent No.: US 11,566,687 B2
(45) Date of Patent: Jan. 31, 2023

(54) DIFFERENTIAL PLANETARY GEARBOX

(71) Applicant: Genesis Advanced Technology Inc., Langley (CA)

(72) Inventors: James Brent Klassen, Surrey (CA); Richard Bos, Surrey (CA)

(73) Assignee: Genesis Advanced Technology Inc., Langley (CA)

( * ) Notice: Subject to any disclaimer, the term of this patent is extended or adjusted under 35 U.S.C. 154(b) by 0 days.

(21) Appl. No.: 17/069,444

(22) Filed: Oct. 13, 2020

(65) Prior Publication Data

US 2021/0025478 A1 Jan. 28, 2021

Related U.S. Application Data

(63) Continuation of application No. 16/133,676, filed on Sep. 17, 2018, now Pat. No. 10,837,520.

(60) Provisional application No. 62/717,763, filed on Aug. 10, 2018, provisional application No. 62/630,759, filed on Feb. 14, 2018, provisional application No.
(Continued)

(51) Int. Cl.
| | |
|---|---|
| *F16H 1/28* | (2006.01) |
| *F16H 57/08* | (2006.01) |
| *F16H 48/06* | (2006.01) |
| *F16H 1/46* | (2006.01) |

(Continued)

(52) U.S. Cl.
CPC ....... *F16H 1/2836* (2013.01); *F16H 57/0416* (2013.01); *F16H 57/08* (2013.01); *F16H 2057/085* (2013.01)

(58) Field of Classification Search
CPC ........ F16H 1/2836; F16H 57/08; F16H 3/663; F16H 3/666; F16H 2057/085; F16H 2055/185; B64C 13/34
See application file for complete search history.

(56) References Cited

U.S. PATENT DOCUMENTS

| | | | |
|---|---|---|---|
| 1,737,695 | A | 12/1929 | Zadow |
| 3,015,973 | A | 1/1962 | Doerries |

(Continued)

FOREIGN PATENT DOCUMENTS

| | | |
|---|---|---|
| CA | 1047894 A1 | 1/1992 |
| CN | 105090380 A | 11/2015 |

(Continued)

OTHER PUBLICATIONS

International Searching Authority, International Search Report and Written Opinion for International Application No. PCT/CA2015/050072, dated May 7, 2015, (8 pages), Canadian Intellectual Property Office, Quebec, Canada.

(Continued)

*Primary Examiner* — Tinh Dang
(74) *Attorney, Agent, or Firm* — Alston & Bird LLP

(57) ABSTRACT

A torque transfer device has plural planets arranged for planetary rotation about one or more sun gears and within one or more ring gears. Each planet includes at least one planetary gear set comprising plural planetary gears connected to rotate together, but having a different diameter to form a differential gear system. To improve load sharing, the plural planetary gears of each planetary gear set may have a different helical angle, the plural planetary gear sets being axially movable with respect to one another. Alternatively or in addition, the planetary gears may be made flexible with respect to radial forces.

21 Claims, 64 Drawing Sheets

Related U.S. Application Data

62/622,105, filed on Jan. 25, 2018, provisional application No. 62/593,860, filed on Dec. 1, 2017, provisional application No. 62/591,162, filed on Nov. 27, 2017, provisional application No. 62/590,568, filed on Nov. 25, 2017, provisional application No. 62/576,067, filed on Oct. 23, 2017, provisional application No. 62/560,129, filed on Sep. 18, 2017, provisional application No. 62/559,552, filed on Sep. 16, 2017.

(51) Int. Cl.
*F16H 3/66* (2006.01)
*F16H 57/04* (2010.01)

(56) References Cited

U.S. PATENT DOCUMENTS

| | | | |
|---|---|---|---|
| 3,330,171 | A | 7/1967 | Nasvytis |
| 3,380,312 | A | 4/1968 | Barske |
| 4,132,131 | A | 1/1979 | DeBruyne |
| 4,471,667 | A | 9/1984 | Kraus |
| 4,524,643 | A | 6/1985 | Ziegler et al. |
| 4,541,305 | A | 9/1985 | Hamabe et al. |
| 4,561,326 | A | 12/1985 | Hamabe et al. |
| 4,721,016 | A | 1/1988 | Burandt |
| 4,918,344 | A | 4/1990 | Chikamori et al. |
| 5,593,361 | A | 1/1997 | Yanagisawa |
| 5,711,736 | A | 1/1998 | Kyodo |
| 6,554,734 | B1* | 4/2003 | Maydew ............ B64C 13/34 475/248 |
| 6,733,413 | B2 | 5/2004 | Lagarde et al. |
| 6,893,371 | B2 | 5/2005 | Mills et al. |
| 7,022,042 | B2 | 4/2006 | Fleytman |
| 7,052,428 | B2 | 5/2006 | Bolz |
| 7,201,700 | B2 | 4/2007 | Buxton |
| 8,016,893 | B2 | 9/2011 | Weinberg et al. |
| 8,231,503 | B2* | 7/2012 | Buelna ............... B64D 35/00 475/344 |
| 8,235,862 | B2 | 8/2012 | Sugitani |
| 8,672,797 | B2* | 3/2014 | Fox ..................... F03D 9/25 475/330 |
| 8,758,178 | B2 | 6/2014 | Gunji et al. |
| 8,814,746 | B2* | 8/2014 | Fox ................... F16H 1/2845 475/331 |
| 8,951,162 | B1 | 2/2015 | Mourani |
| 9,249,861 | B2 | 2/2016 | Fedosovsky et al. |
| 9,371,855 | B2 | 6/2016 | Voellmer |
| 9,567,069 | B2 | 2/2017 | Cox |
| 9,725,161 | B2 | 8/2017 | Cox |
| 9,725,163 | B2 | 8/2017 | Edelson et al. |
| 9,755,463 | B2 | 9/2017 | Klassen et al. |
| 10,106,255 | B2* | 10/2018 | Covington ........ B64C 29/0033 |
| 10,132,392 | B2 | 11/2018 | Klassen |
| 10,174,818 | B2 | 1/2019 | Klassen |
| 2002/0091030 | A1 | 7/2002 | Haga et al. |
| 2006/0073933 | A1 | 4/2006 | Vranish |
| 2010/0122598 | A1 | 5/2010 | Salutzki |
| 2010/0331133 | A1 | 12/2010 | Joachim et al. |
| 2012/0043850 | A1 | 2/2012 | Zhang et al. |
| 2013/0203553 | A1 | 8/2013 | Fong et al. |
| 2015/0072828 | A1 | 3/2015 | Reuter |
| 2015/0354668 | A1 | 12/2015 | Bouwer et al. |
| 2015/0360774 | A1* | 12/2015 | Covington ........ B64C 29/0033 244/7 R |
| 2016/0025152 | A1 | 1/2016 | Klassen et al. |
| 2016/0153426 | A1 | 1/2016 | Groenager |
| 2016/0122008 | A1 | 5/2016 | Cox et al. |
| 2016/0290490 | A1 | 10/2016 | Brassitos et al. |
| 2017/0089218 | A1 | 3/2017 | Hasting et al. |
| 2017/0128234 | A1 | 5/2017 | Roh et al. |
| 2017/0184185 | A1 | 6/2017 | Schorsch |
| 2017/0184190 | A1 | 6/2017 | Klassen |
| 2017/0321790 | A1 | 11/2017 | Klassen et al. |

FOREIGN PATENT DOCUMENTS

| | | |
|---|---|---|
| DE | 102014110545 A1 | 1/2016 |
| EP | 3098477 A2 | 11/2016 |
| GB | 664297 A | 1/1952 |
| GB | 1465838 | 3/1977 |
| JP | 2011-102623 A | 5/2011 |
| JP | 2016-201945 A | 12/2016 |
| SU | 1294606 A1 | 3/1987 |
| WO | WO-81/00899 A1 | 4/1981 |
| WO | WO-2008/116646 A1 | 10/2008 |
| WO | WO-2009/116646 A1 | 10/2008 |
| WO | WO-2013/173928 A1 | 11/2013 |
| WO | WO-2014/105894 A2 | 7/2014 |
| WO | WO-2015/168793 A2 | 11/2015 |
| WO | WO-2019/012431 A1 | 1/2019 |

OTHER PUBLICATIONS

International Searching Authority, International Search Report and Written Opinion for International Application No. PCT/CA2018/051154, dated Jan. 8, 2019, (11 pages), Canadian Intellectual Property Office, Quebec, Canada.

International Searching Authority, International Search Report and Written Opinion for International Application No. PCT/CA2019/051060, dated Oct. 2, 2019, (9 pages), Canadian Intellectual Property Office, Quebec, Canada.

Jett, Timothy R. et al. *Space Shuttle Body Flap Actuator Bearing Testing for NASA Return to Flight*, Proceedings of the 38$^{th}$ Aerospace Mechanisms Symposium, Langley Research Center, May 17-19, 2006, (16 pages).

Krantz, Timothy L. et al. *Gear Tooth Root Stresses Of A Very Heavily Loaded Gear Pair-Case Study: Orbiter Body Flap Actuator Pinion And Ring Gear*, Proceedings of the ASME 2015 International Design Engineering Technical Conferences & Computers and Information in Engineering Conference, IDETC/CIE 2015, Aug. 2-5, 2015, (10 pages). https://ntrs.nasa.gov/search.jsp?R=20150016602 Aug. 14, 2019 T19:26: 58+00:00Z.

Oswald, Fred B. et al. *Space Shuttle Rudder/Speed Brake Actuator A Case Study: Probabilistic Fatigue Life And Reliability Analysis*, Power Transmission Engineering, www.powertransmission.com, Oct. 2015, 11 pages.

Levai, Zoltán. *Structure And Analysis Of Planetary Gear Trains*, Jnl. Mechanisms vol. 3, pp. 131-148; Pergamon Press, 1968.

Chapter II of *Simple Planetary Gear Trains For High Transmission Ratios*, Henriot; 2001, pp. 149-151.

Kapelevich, Alexander, *High Gear Ratio Epicyclic Drives Analysis*, Gear Technology, Jun. 2014, pp. 62-67.

Marsch, Jim. *Design and Use of Epicyclic Gear Systems*, National Manufacturing Week, Seesion #4D32, Mar. 10, 2005, (38 pages).

TIMKEN. *Setting Techniques for Tapered Roller Bearings*, Order No. 5556, 2015, (20 pages).

Amendment in response to Mar. 14, 2018 Office Action in U.S. Appl. No. 15/461,170, (6 pages).

Notice of Allowance for U.S. Appl. No. 15/461,170 dated Jul. 25, 2018, (7 pages).

Extended European Search Report for European Patent Application No. 18855814.2, dated Jul. 13, 2021, (10 pages), European Patent Office, Munich, Germany.

First Office Action and Search Report for Chinese Patent Application No. 201880062473.0, dated Sep. 22, 2022, (25 pages), Chinese National Intellectual Property Administration, Beijing, China.

* cited by examiner

DIFFERENTIAL PLANETARY GEARBOX

CROSS-REFERENCE TO RELATED APPLICATIONS

This patent application is a continuation of U.S. patent application Ser. No. 16/133,676, filed Sep. 17, 2018, which claims priority to U.S. Provisional Appl. Ser. No. 62/559,552, filed Sep. 16, 2017; U.S. Provisional Appl. Ser. No. 62/560,129, filed Sep. 18, 2017; U.S. Provisional Appl. Ser. No. 62/576,067, filed Oct. 23, 2017; U.S. Provisional Appl. Ser. No. 62/590,568, filed Nov. 25, 2017; U.S. Provisional Appl. Ser. No. 62/591,162, filed Nov. 27, 2017; U.S. Provisional Appl. Ser. No. 62/593,860, filed Dec. 1, 2017; U.S. Provisional Appl. Ser. No. 62/622,105, filed Jan. 25, 2018; U.S. Provisional Appl. Ser. No. 62/630,759, filed Feb. 14, 2018; and U.S. Provisional Appl. Ser. No. 62/717,763, filed Aug. 10, 2018. The contents of all of which are incorporated herein by reference in its entirety.

BACKGROUND

Technical Field

Differential planetary gearboxes.

Description of Related Art

Planetary gearbox reducers require load balancing between all pinions to ensure that all the planets are being used equally. Load balancing is often accomplished by the use of only three planetary gears so the sun gear centers itself by triangulation. If four planets are used, and if all gears are not perfectly the same size, three gears will take the majority of the load and the fourth gear will carry less than 25% of the total load. The more gears that are added, the smaller the planets must be, so at a certain number of planets, there is a detriment to max torque that can be transferred. As evidence of this, most planetary gearsets in industry have only three planet gears per stage with a small percentage having four or five planets per stage.

A differential planetary allows much higher gear ratios with smaller diameter planet gears. The same load sharing problem exists as with a standard planetary, however, so the use of more than three planets can be detrimental. As described above, this is because smaller diameter planets cannot transmit as much load, so if three or four planets take most of the load, the rest of the planets do not contribute proportionately to the torque transmission and the planets that are doing the majority of the torque transmission may be too small to provide benefit as compared to using only three larger diameter planets.

Smaller diameter planets are highly desirable, because they allow a larger center through hole in the gearbox. If load sharing is achieved for a high number of planets, greater torque transmission is also shown to be possible. In embodiments of a differential gearbox such as those disclosed here, FEA analysis has shown that between 12 and 18 smaller planets provide favorable torque transmission as compared to using only 3 larger planets.

What is needed is a way to provide consistent load sharing between the planets of a differential gearbox so a large number of smaller planets can be used. There are many applications where high torque output, with minimal weight and strict envelope is required. Other benefits of the device will be evident in the description below.

BRIEF SUMMARY

There is provided a torque transfer device having plural planets arranged for planetary rotation about one or more sun gears and within one or more ring gears. The plural planets each include a respective first planetary gear set comprising plural planetary gears connected to rotate together and having different diameters. A respective first output gear of the one or more sun gears or one or more ring gears is arranged to mesh with a respective planetary gear of each first planetary gear set, and a respective first reference gear of the one or more sun gears or one or more ring gears being arranged to mesh with a respective planetary gear of each first planetary gear set. Load sharing is provided by one or more of A or B or C or D, where:

A is the plural planetary gears of each first planetary gear set have different helical angles and each first planetary gear set is axially movable, for example against an elastic element such as a spring with respect to an axis defined by the one or more sun gears;

B is the plural planets number at least 5, 6, 7, 8, 9, 10, 11, 12, 13, 14, 15, 16, 17, 18, 19, or 20 and are formed of a first material with yield strength-to-stiffness ratio greater than 0.10;

C is the plural planetary gears of each first planetary gear set are defined by a pinion surface and separated by a torsionally flexible portion of the pinion surface;

D is the plural planets number at least 5, 6, 7, 8, 9, 10, 11, 12, 13, 14, 15, 16, 17, 18, 19, or 20 and one or more of the one or more sun gears and/or one or more of the one or more ring gears are formed of a first material with yield strength-to-stiffness ratio greater than 0.10.

In various embodiments, there may be included any one or more of the following features.

Each planet further may also have second planetary gear set corresponding to and arranged axially symmetrically with respect to the first planetary gear set. The second planetary gear set may be arranged to mesh with a corresponding second output gear of the one or more sun gears or one or more ring gears and a corresponding second reference gear of the one or more sun gears or one or more ring gears. The second planetary gear set of each planet may have a gear tooth profile axially symmetric with respect to a gear tooth profile of the corresponding first planetary gear set. Here, the gear tooth profile refers to the three dimensional shape of the gear teeth on the gears. The first and second output gears may be connected via a shim for adjusting the relative axial positioning of the first and second output gears. The first and second reference gears may be connected via a shim for adjusting the relative axial positioning of the first and second reference gears. Where there is a first input gear as described below, there may also be a second input gear, arranged to mesh with the second planetary gear set, and the first input gear and the second input gear may be connected by a shim for adjusting the relative axial positioning of the first and second input gears. The first reference gear and first output gear may be connected via bearings, the bearings connected to at least one of the first reference gear and first output gear via a shim. The bearings may be connected to the at least one of the first reference gear and first output gear via plural shims connected to different bearing races. The second output gear may be the first output gear, and may have plural gear surfaces or single continuous gear surface. The second reference gear may be the first reference gear, and may have plural gear surfaces or a single continuous gear surface. The first reference gear and second reference gear may be ring gears, and the first reference gear may be connected to the second reference gear (which rigid connection makes them the same gear, as the notion of sameness is defined here) via a housing portion extending through a center hole defined by the one or more sun gears. This housing portion may define a center bore. There may be gear set spacing springs arranged to space the respective second planetary gear set of each planet in relation to the corresponding first planetary gear set. The second planetary gear sets may be aligned with the corresponding first planetary gear sets by rods, each extending through a respective second planetary gear set and the corresponding first planetary gear set. There may also be gear set positioning springs on the rods arranged to position the first planetary gear sets and second planetary gear sets relative to the rods. The first output gear and the first reference gear may both be sun gears of the one or more sun gears or both be ring gears of the one or more ring gears, and connect to different planetary gears of each first planetary gear set.

Some cases of gear combinations are as follows. One of the plural planetary gears of the first planetary gear set may be a spur gear, and another a helical gear. One of the plural planetary gears of the first planetary gear set may be a helical gear, and another a helical gear of the same handedness of different magnitude of helix angle. One of the plural planetary gears of the first planetary gear set may be a helical gear, and another is a helical gear of opposite handedness. Load sharing technique A is particularly applicable to the above cases of gear combinations, and in technique A each first planetary gear set is axially movable with respect to an axis defined by the one or more sun gears. In other cases, one of the plural planetary gears of the first planetary gear set may be a helical gear, and another a helical gear with the same handedness and magnitude of helix angle, or one of the plural planetary gears may be a spur gear, and another also a spur gear. For ease of manufacture, the plural planetary gears of the first planetary gear set may have the same number of teeth and corresponding teeth of the plural planetary gears may be circumferentially aligned. Further, the teeth of the plural planetary gears of the first planetary gear set may be connected by a continuous tooth profile fill between corresponding teeth. Regardless of the choice of A, B or C for load sharing, there may be 5 or more, 6 or more, 7 or more, 8 or more, 9 or more, 10 or more, 11 or more, 12 or more, 13 or more, 14 or more, 15 or more, 16 or more, 17 or more, 18 or more, 19 or more, or 20 or more planets.

The planets of the plural planets may be hollow. The planets of the plural planets may each define a respective axial bore having a respective bore diameter at least ½, ⅔, ⅘, ⁹⁄₁₀ or ¹⁹⁄₂₀ of a respective outer planet diameter.

For any torque transfer device described above, option B may be chosen, so that the plural planets number at least 5, 6, 7, 8, 9, 10, 11, 12, 13, 14, 15, 16, 17, 18, 19, or 20 and are formed of a first material with yield strength-to-stiffness ratio greater than 0.10. Particularly with respect to option B, each planet of the plural planets may have a respective outer pinion portion defining a respective pinion surface. The respective outer pinion portion of each planet may be mounted on a respective hollow tube, the respective outer pinion portions being formed of the first material. The respective hollow tubes may be formed of a second material stiffer than the first material. The first material may be a plain or fiber reinforced polymer resin and the second material is a metal. The respective pinion surfaces of the plural planets may each have an output geared surface arranged to mesh with the output gear and a reference geared surface arranged to mesh with the reference gear, the output geared surface and the reference geared surface separated by a torsionally flexible pinion portion of the respective outer pinion portion. Each torsionally flexible pinion portion may define a recessed portion of the pinion surface. Each torsionally flexible pinion portion may define axial or radial slots in the pinion surface. The first material may have a ratio of torsion twist stiffness to bending stiffness of less than 1.

Option C may also be chosen, including in combination with option B. With option C the plural planetary gears of each first planetary gear set may be defined by a pinion surface and separated by a torsionally flexible portion of the pinion surface. Particularly with respect to option C, each torsionally flexible pinion portion may define a recessed portion of the pinion surface. Each torsionally flexible pinion portion may define axial or radial slots in the pinion surface. Each planet of the plural planets may have a respective outer pinion portion defining the respective pinion surface, the respective outer pinion portion being mounted on a respective hollow tube. The respective outer pinion portions may be formed of a first material, and the respective hollow tubes are formed of a second material, the second material being stiffer than the first material. The first material may be a plain or fiber reinforced polymer resin and the second material may be a metal. Each planet may have a ratio of torsion twist stiffness to bending stiffness of less than 1.

With respect to any torque transfer device as described above, the planetary gear sets may be arranged in groups, the planetary gears of each group in phase with respect to meshing with other gears, and planetary gears of different groups not in phase, and the planetary gears of each group may be evenly distributed about the sun gear(s). The planets could alternatively be spaced unevenly. Optionally, the planetary gear sets of each planet may be in phase with one another, so that the planets as a whole are arranged in such groups.

There may also be a free spinning sun or ring element arranged to engage in traction or geared contact with the planets. The free spinning sun or ring element may be a gear of the one or more sun gears or one or more ring gears, the free spinning sun or ring element being arranged to mesh with a respective planetary gear of each first planetary gear set. There may also be a brake arranged to contact the free spinning sun or ring element. The free spinning sun or ring element may also have two axially separated contact portions for contacting the planets, the contact portions being oriented to preload the planets depending on a relative axial position of the contact portions. The contact portions may be biased to preload the planets. There may also be an actuation means for adjusting the axial separation of the contact portions.

There may also be a respective first input gear of the one or more sun gears or one or more ring gears, the first input gear being arranged to mesh with a respective planetary gear of each first planetary gear set. The first input gear may be connected to an input member, and the first reference gear connected to a housing member, the input member rotatably connected to the housing member through one or more intermediate members, the input member rotatably connected to an intermediate member of the one or more intermediate members through a first set of bearings and the output member rotatably connected to the intermediate member or another intermediate member of the one or more intermediate members through a second set of bearings. Two of the first input gear, first reference gear, and first output gear may be ring gears and one of the first input gear, first reference gear, and first output gear may be a sun gear. In such a case, the input gear may be a sun gear for a speed reducer. Two of the first input gear, first reference gear, and first output gear may be sun gears and one of the first input gear, first reference gear, and first output gear may be a ring gear. In such a case, the input gear may be a ring gear for a speed reducer.

There is also provided an actuator combining a torque transfer device having an input gear as described above with a motor connected to drive the input gear relative to the first reference gear. The actuator may have a heat conductive component adjacent to the motor and protruding through a housing to an outer surface of the actuator. There is also provided an electric device adding, to the torque transfer device described above, first electromagnetic elements mounted on the planetary rollers and second electromagnetic elements arranged to act on the first electromagnetic elements to drive the planetary rollers. The second electromagnetic elements may be connected to the first reference gear. The first electromagnetic elements may be permanent magnets. The second electromagnetic elements may be electromagnets. The second electromagnetic elements may have soft magnetic posts or may be air coils. If air coils, or if using an unusually small soft magnetic post, the stator may use a soft magnetic material backiron without introducing much cogging. Thus, there may be a backiron adjacent to the second electromagnetic elements. This provides a more efficient air coil design.

An electric device is also provided without a load sharing scheme as described above. Thus, there is also provided an electric device having an inner free spinning sun ring, planetary rollers in rolling contact with the inner free spinning sun ring, an outer fixed ring, an outer output ring, the planetary rollers having a first diameter in geared contact with the outer fixed ring and a second diameter in geared contact with the outer output ring to drive the outer output ring relative to the outer fixed ring, first electromagnetic elements mounted on the planetary rollers and second electromagnetic elements arranged to act on the first electromagnetic elements to drive the planetary rollers. The second electromagnetic elements may be connected to the outer fixed ring. There may also be an additional outer fixed ring connected to the outer fixed ring through a center hole defined by the inner free spinning sun ring. The first electromagnetic elements may be permanent magnets. The second electromagnetic elements may be electromagnets. The second electromagnetic elements may be air coils. There may be a backiron adjacent to the second electromagnetic elements.

These and other aspects of the device are set out in the claims.

BRIEF DESCRIPTION OF THE SEVERAL VIEWS OF THE DRAWINGS

Embodiments will now be described with reference to the figures, in which like reference characters denote like elements, by way of example, and in which.

DETAILED DESCRIPTION

Figure 1:
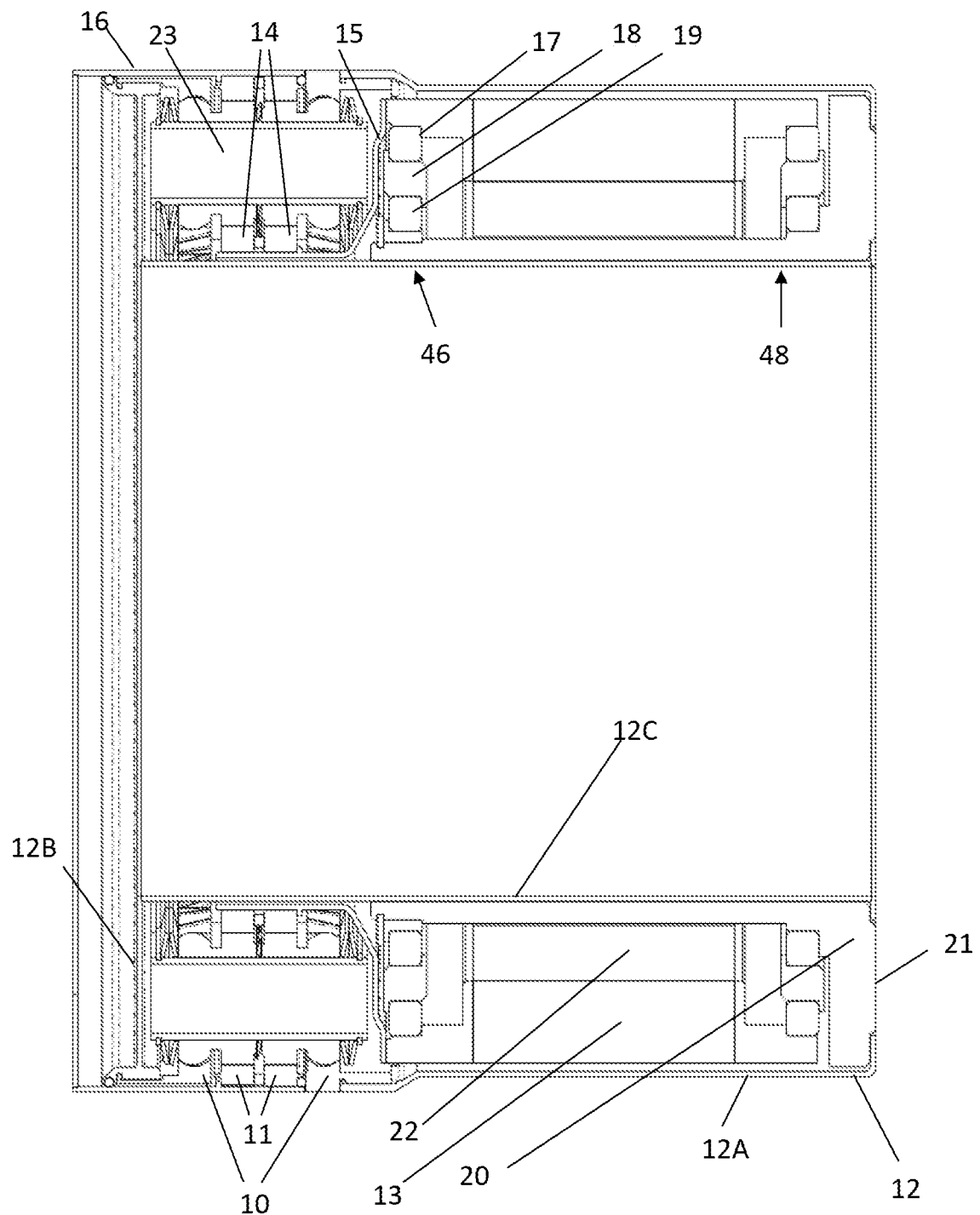
FIG. 1 is a side cutaway view of an exemplary actuator including an electric motor and a differential gearbox that uses planets each having portions with different helix angles.

Immaterial modifications may be made to the embodiments described here without departing from what is covered by the claims.

Embodiments of the device allow load sharing through the use of one or more strategies as described below. Other benefits of some embodiments may include reducing or preventing backlash, and maintaining appropriate axial and circumferential location of planets without the use of a planet carrier.

One strategy is to use planets that have different portions with different helix angles. In this strategy, an input, output and reference gear may each contact the planets. The different gears contacting the planets may collectively be referred to as i/o gears. For a speed reducer, typically the input will be on one side of the planets (e.g., a sun gear) and the output and reference on the other (e.g., ring gears). In this document, a "sun gear" refers to any gear with a radial outer surface meshing with planet gears, and a "ring gear" refers to any gear with a radially inner surface meshing with planet gears. A "sun ring" is a ring-shaped sun gear, not a ring gear by this definition. The two of the input, output or reference gears on one side, in this strategy, have different helix angles, meshing with corresponding helix angles of the planet gears. This allows load balancing through axial shifting of the planet gears. To keep overall axial alignment, two axially symmetric sets of gears may be provided, with the planet gears of the two sets combined into single planets with halves connected by axial springs. The axial inner ring and/or sun gears of the two sets may also be combined. Embodiments using this strategy are further described in the section below entitled "DIFFERENTIAL HELIX ANGLE WITH AXIAL SPRING LOCATION."

Another strategy is to use flexible gears. Gears may be made with the use of a flexible material such as plastic. A surprising benefit is found from plastic which might conventionally be expected to have lower torque to weight than steel. Embodiments using flexible materials are further described in the section below entitled "PLASTIC GEARS."

Flexibility depends not only on the material choice but also on the shape of the gears.

Also described in this document are further applications of the strategies summarized here. The section entitled "EXAMPLE PLANET DRIVEN ACTUATOR" provides an additional example of an actuator comprising an electric motor combined with a speed reducing gearbox.

Additional features are also disclosed that may be combined with embodiments of one or more of the strategies described.

The section entitled "PLANETARY BEARING" describes how a planetary gearbox may also act as a bearing, for example for a motor.

The section entitled "OUT OF PHASE GEARS" describes how different planets may mesh with the ring gears at two or more tooth mesh positions at any given moment to reduce noise and vibration.

Differential Helix Angle with Axial Spring Location

In an embodiment, an electric motor is housed within the gearbox enclosure.

FIGS. 1-24 show an exemplary cylindrical actuator including an electric motor and a differential gearbox that uses planets each having portions with different helix angles and elastic elements which bias the pinion portions to a preferred but movable axial position. This allows consistent enough load sharing between pinions to take advantage of a large number of smaller pinions. A simplified electric motor stator and rotor is shown inside the housing. An internal electric motor allows the two outer ring gears 10, 10 to be attached to housing members 12A, 12B connected through an annular housing portion 12C defining the center bore so the ring gears 10, 10 are held from relative rotation to each other. Housing members 12A, 12B and 12C comprise portions of housing 12.

Figure 2:
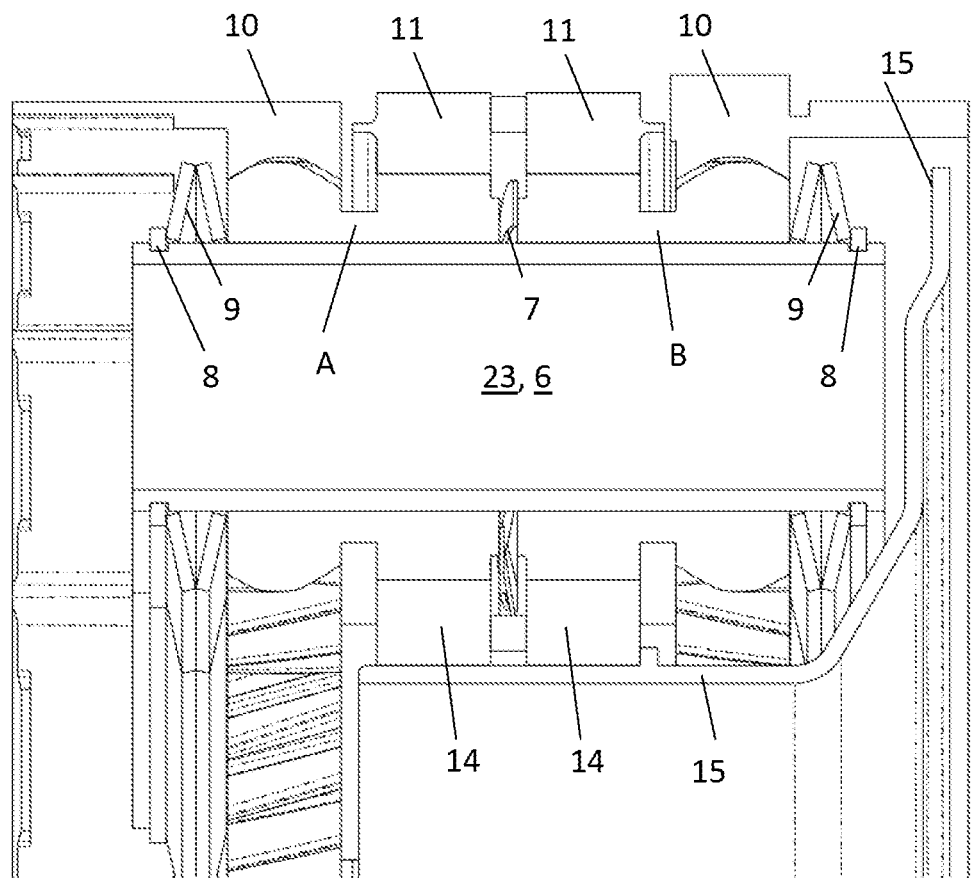
FIG. 2 is a closeup side cutaway view of the actuator of FIG. 1.
Figure 3:
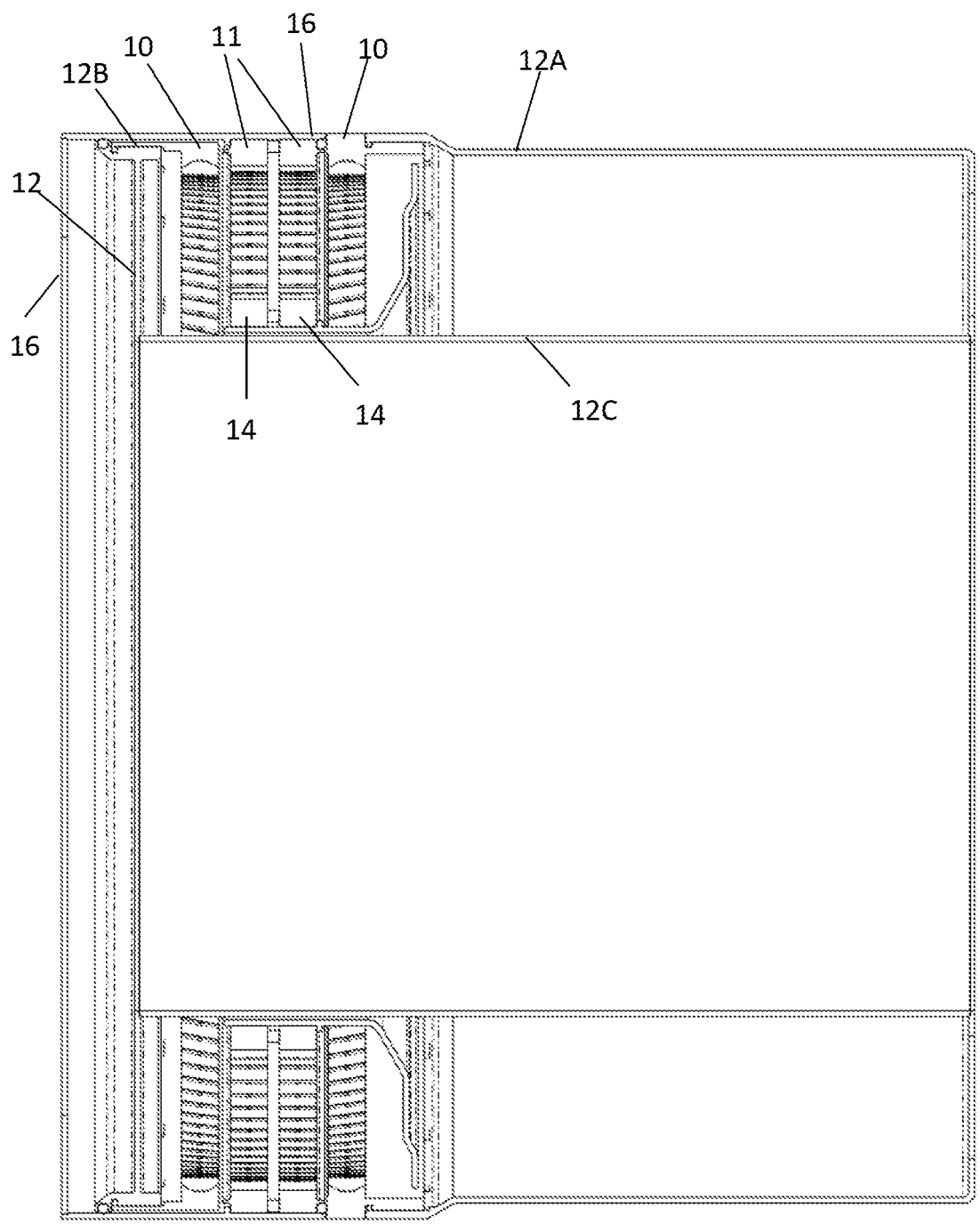
FIG. 3 is a side cutaway view of the actuator of FIG. 1.

A side section view of the exemplary embodiment is shown in FIG. 1. FIGS. 1-3 show cutaway views of this exemplary embodiment and FIGS. 5-8 show views of the outside of the actuator.

The motor in this embodiment is configured with an inner stator 22 and outer rotor 13, with the rotor supported by stacked bearing assemblies 46 and 48. Bearing assembly 46, as shown here and further described below, comprises a ring 18 that links two sets of bearings 17 and 19.

The outer rotor drives a connecting plate 15, which drives the sun gears 14 through a spline fit. Note that instead of using a connecting plate 15, it would also be possible to integrate the rotor 13 into the sun gears 14. This would enable a more axially compact actuator albeit with a smaller center hole.

The sun gears drive the planets 23 with central straight spur gear teeth. A small amount of backlash is introduced to this interface via a tooth offset in order to ensure proper meshing. In the embodiment shown there are 18 planets.

The planets do not require a carrier as would be found in many planetary gear configurations. Instead, they mesh with an axially outer ring gear 10 on the outer helical teeth. Axial location of the planet gears is also provided within tolerances by the load balancing mechanism described below. Because the axially outer ring gear is stationary, the planets orbit the sun input as the input rotates. The central spur gear teeth on the planets then mesh with the center ring gears 11. The pitch diameter of the center spur teeth on the planets is different than the pitch diameter of the helical teeth on the planets, causing a differential output between the center and axially outer ring gears. The output from the center ring gears 11 then connects to a connecting tube 16 with a spline fit and contains a bolt group for fastening to other parts of the mechanism.

Also shown in FIG. 1 are a heat sink 20 and holes 21 in the housing 12, further described below. FIG. 2 shows a closeup cutaway view of the gears and connecting plate 15 only. Also visible in FIG. 2 is a central spring 7 connecting two halves A and B of the geared portions of a planet 23, the halves moveably mounted on a tube 6, and outer springs 9 connecting the halves to stops 8 mounted on the tube 6. The function of these parts of the planet 23 is further described below in relation to FIGS. 14-20.

Figure 4:
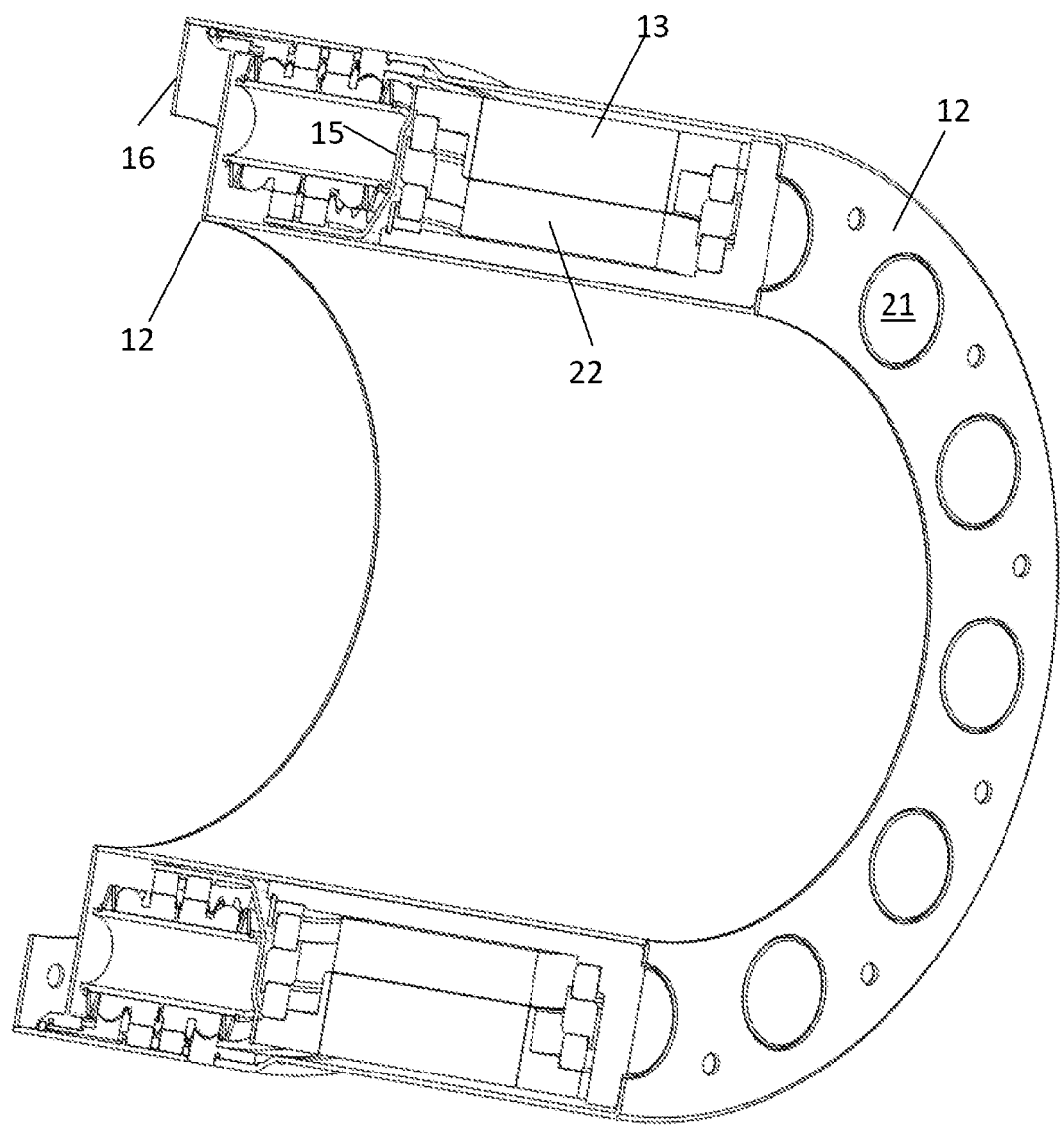
FIG. 4 is an isometric cutaway view of the actuator of FIG. 1.

FIG. 3 shows the actuator of FIG. 1 with the motor and planets omitted for clarity. FIG. 4 shows an isometric cutaway view of the actuator of FIG. 1.

Figure 5:
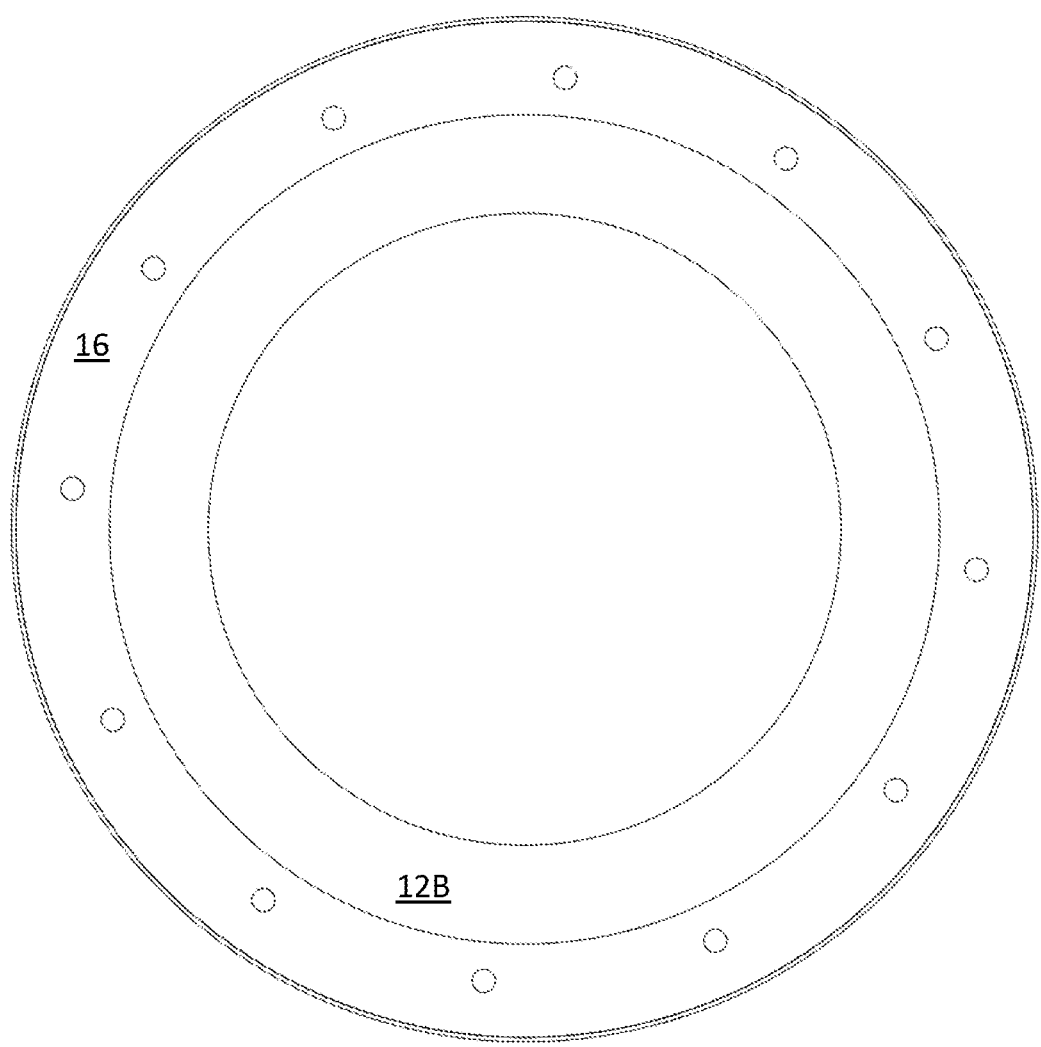
FIG. 5 is a front view of the actuator of FIG. 1.
Figure 6:
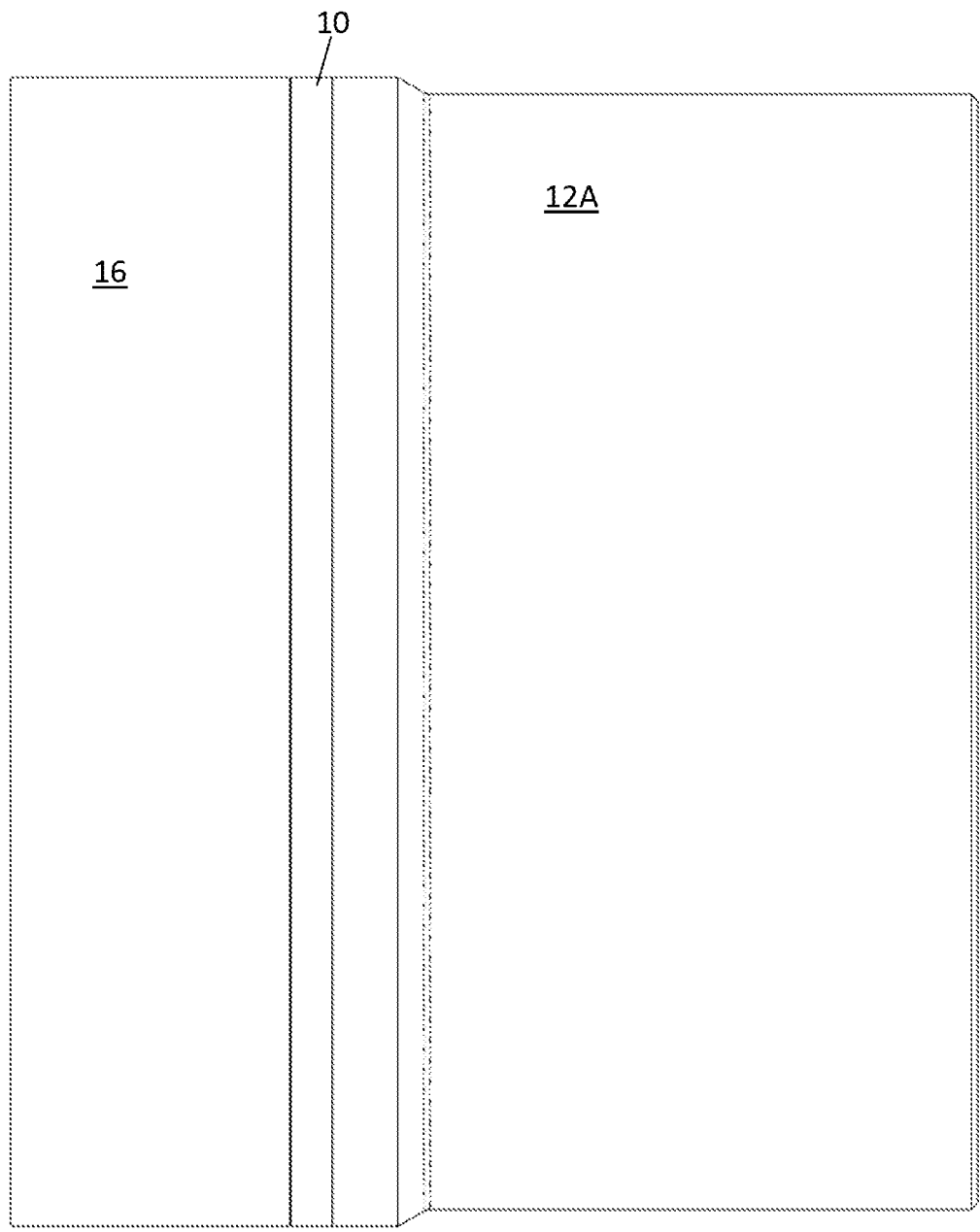
FIG. 6 is a side view of the actuator of FIG. 1.
Figure 7:
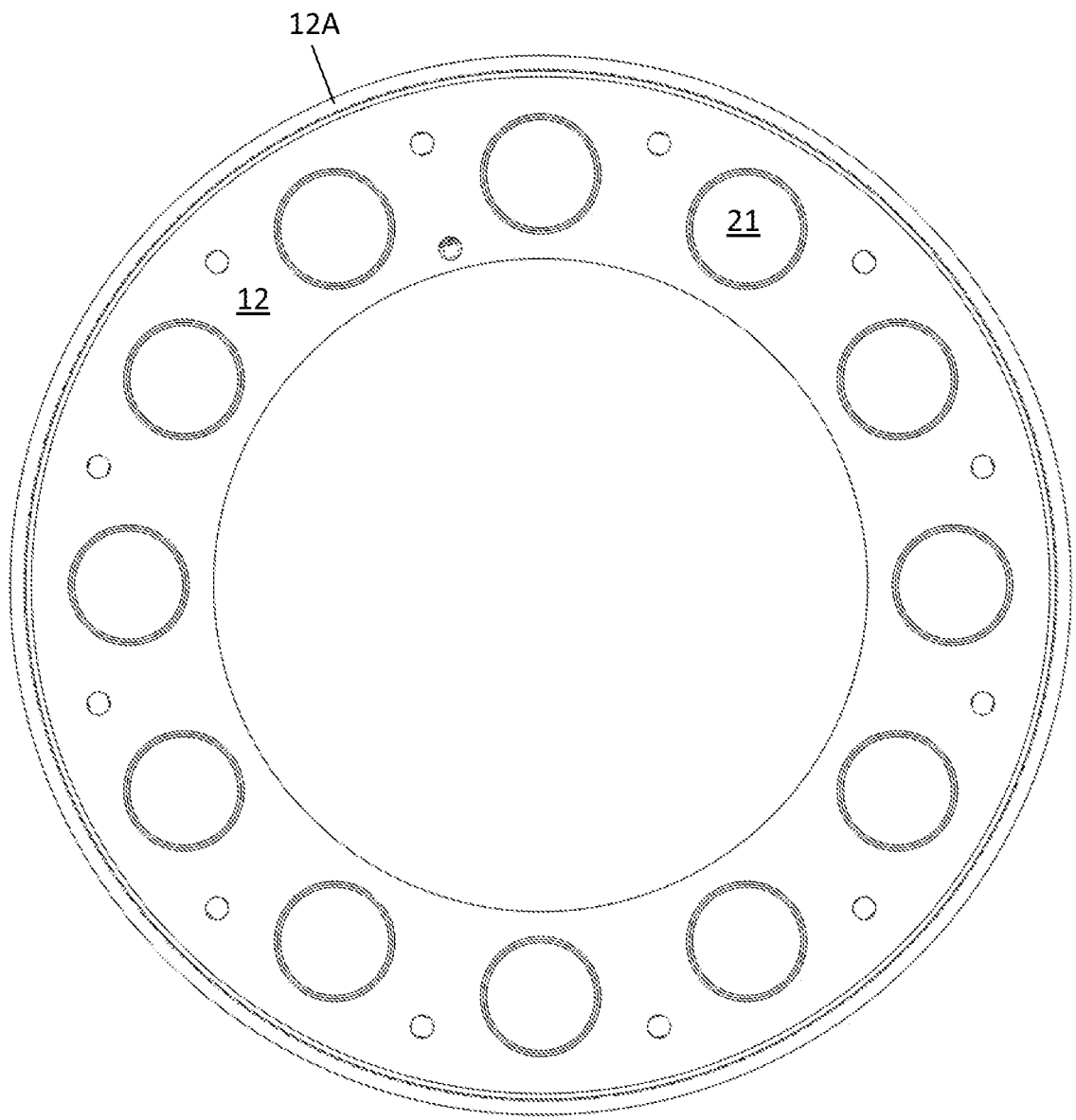
FIG. 7 is a rear view of the actuator of FIG. 1.
Figure 8:
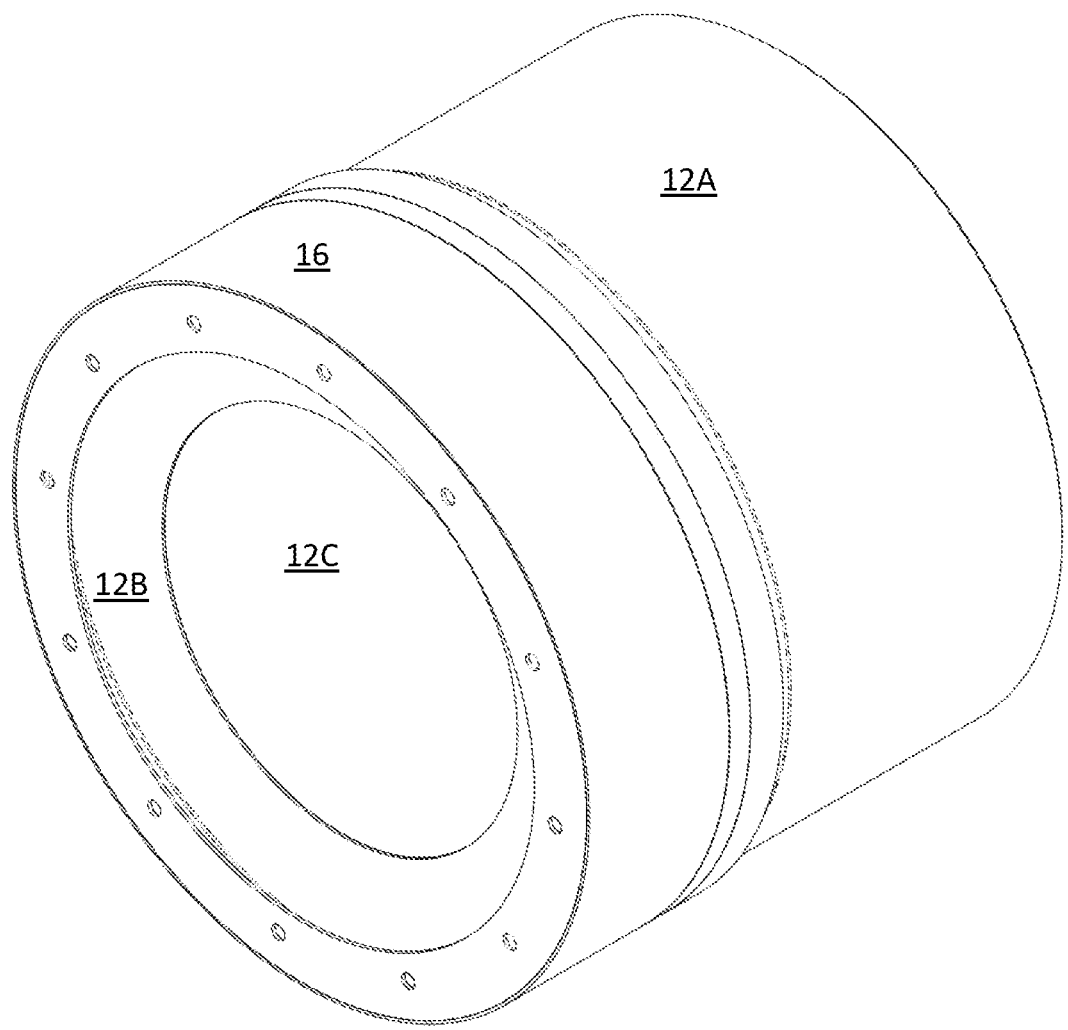
FIG. 8 is an isometric view of the actuator of FIG. 1.

FIGS. 5-8 show external views of the actuator of FIG. 1. FIG. 5 shows a front view of the actuator of FIG. 1. FIG. 6 shows a side view. An outer portion corresponding to one of the axially outer ring gears 10 is visible, but the axially outer ring gears 10 in this embodiment are fixed to the housing 12 and could alternatively both be enclosed in the housing. FIG. 7 shows a rear view. 8 shows a front isometric view.

Figure 9:
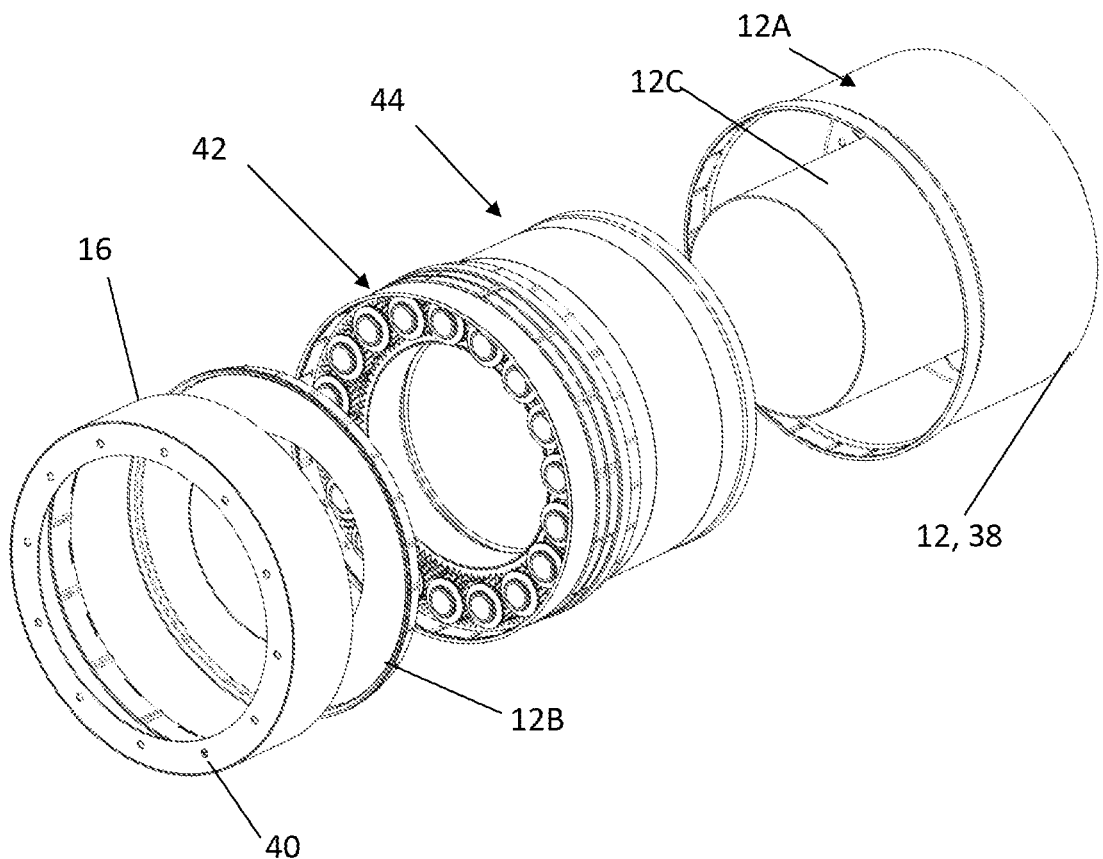
FIG. 9 is an exploded view of the actuator of FIG. 1.
Figure 10:
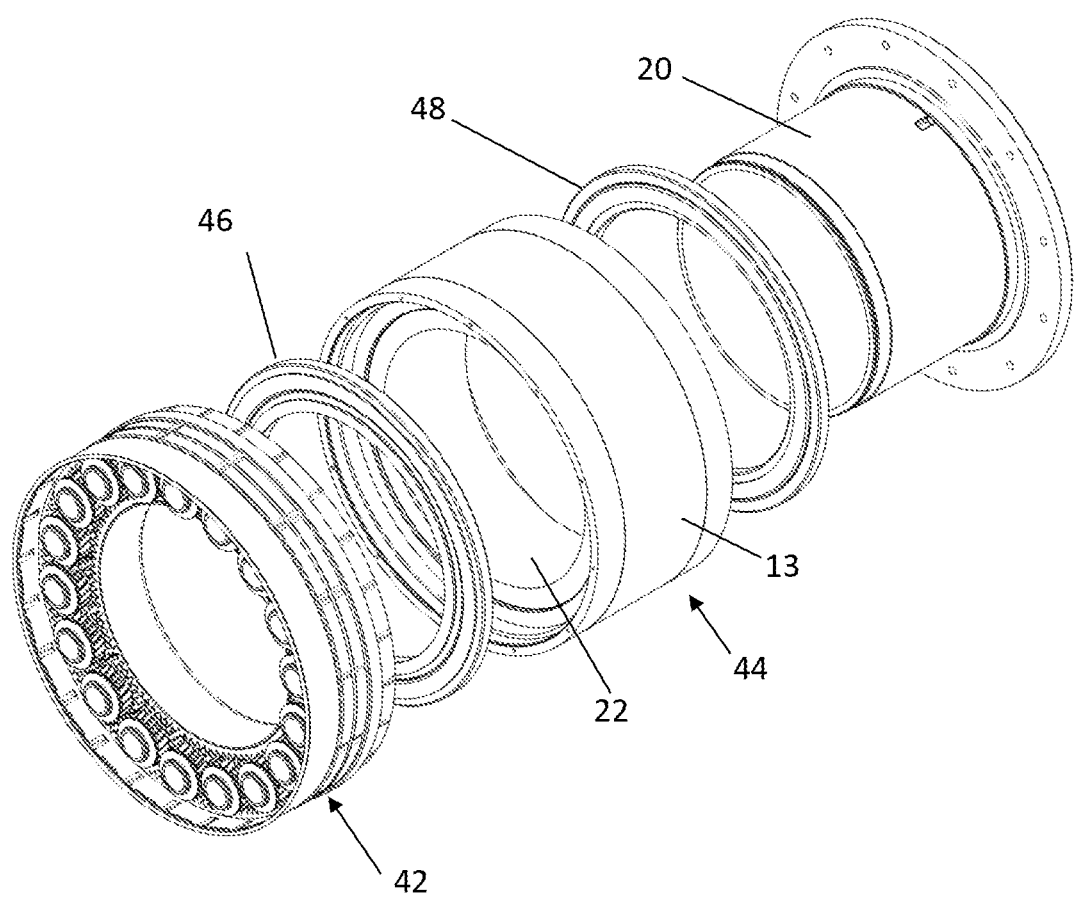
FIG. 10 is an exploded view of the actuator of FIG. 1 without housing or input connector.
Figure 11:
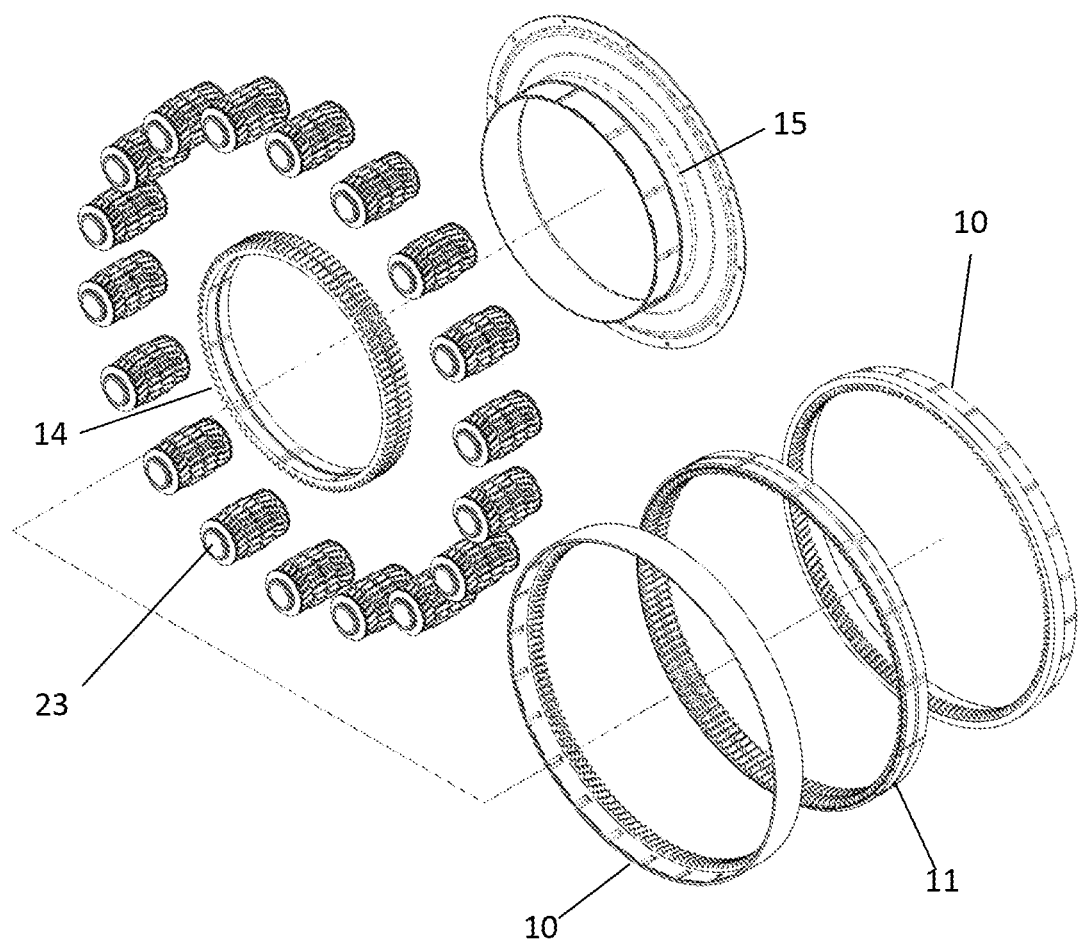
FIG. 11 is an exploded view of a gearbox of the actuator of FIG. 1.

FIGS. 9-11 show exploded views of the actuator of FIG. 1. The actuator may be connected to an external structure through the housing 12, for example at a first end 38 of the actuator, and may be connected to driven items through output connector 16, for example at a second end 40 of the actuator. The gearbox 42 and motor 44 each take up respective annular portions of the actuator in this embodiment.

FIG. 10 shows the actuator without the housing or output connector. Bearing assemblies 46 and 48 are seen, which when the actuator is assembled connect both sides of rotor 13 to the heatsink 20.

FIG. 11 shows an exploded view of the gearbox. As can be seen, the axially inner sun gears 14 in this embodiment are formed as a single piece, and the axially inner ring gears 11 are formed as a single piece.

Figure 12:
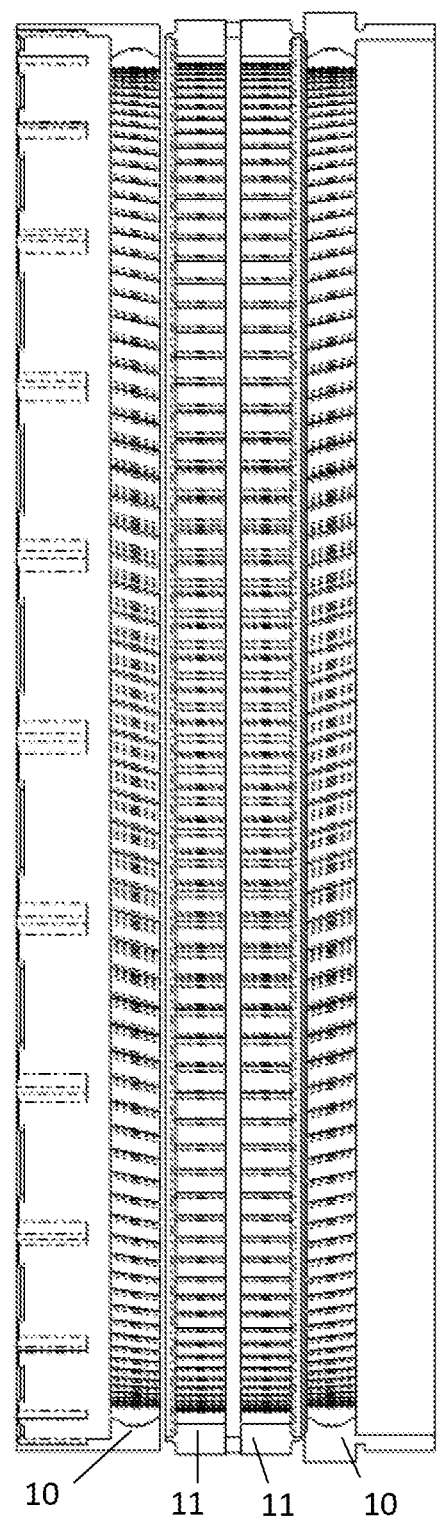
FIG. 12 is a side cutaway view of the ring gears of the actuator of FIG. 1.
Figure 13:
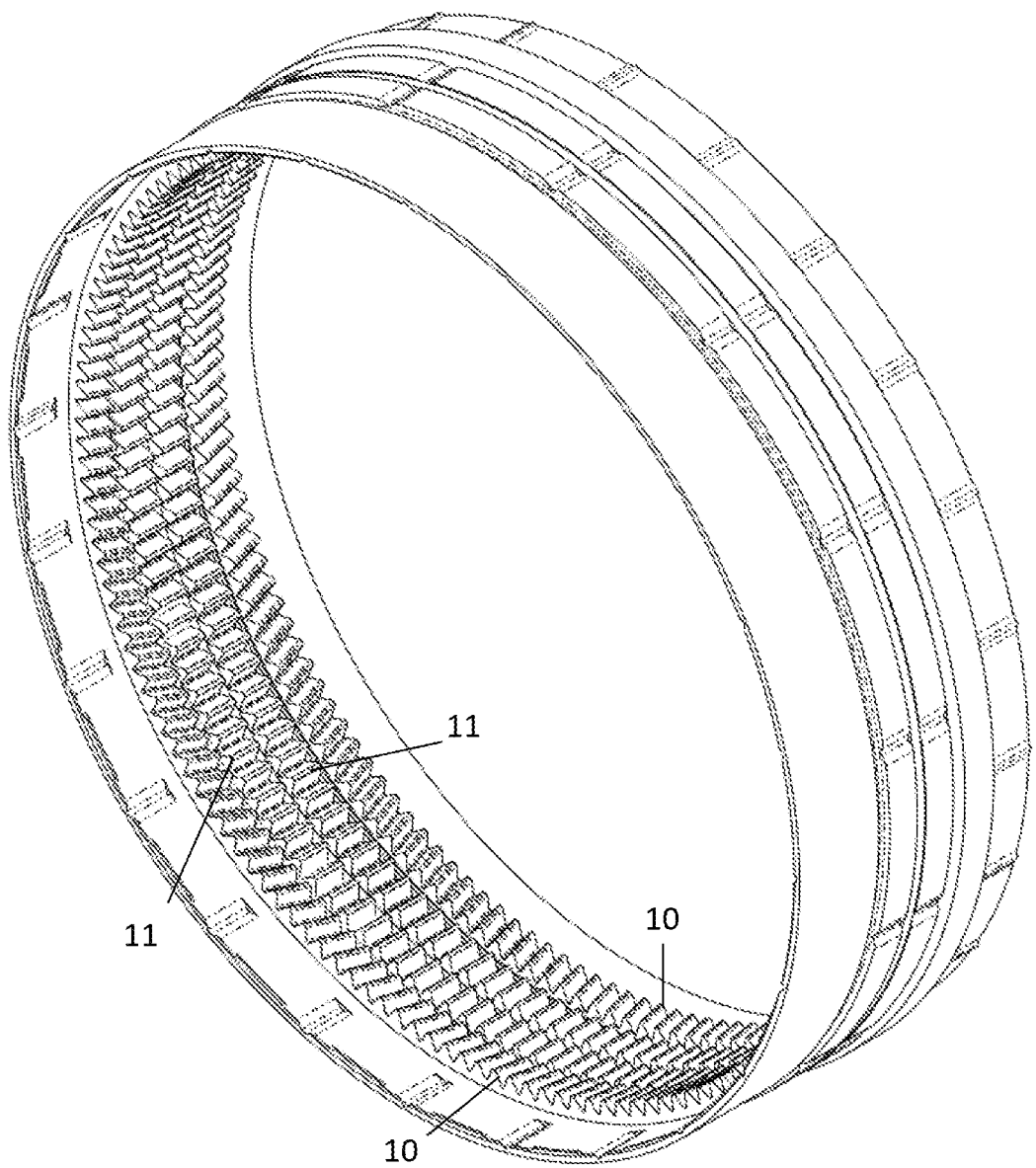
FIG. 13 is an isometric view of the ring gears of the actuator of FIG. 1.

FIG. 12 is a side cutaway view and FIG. 13 is an isometric view of the ring gears 10 and 11 of the actuator of FIG. 1, better showing the patterns of the teeth of these gears.

Figure 14:
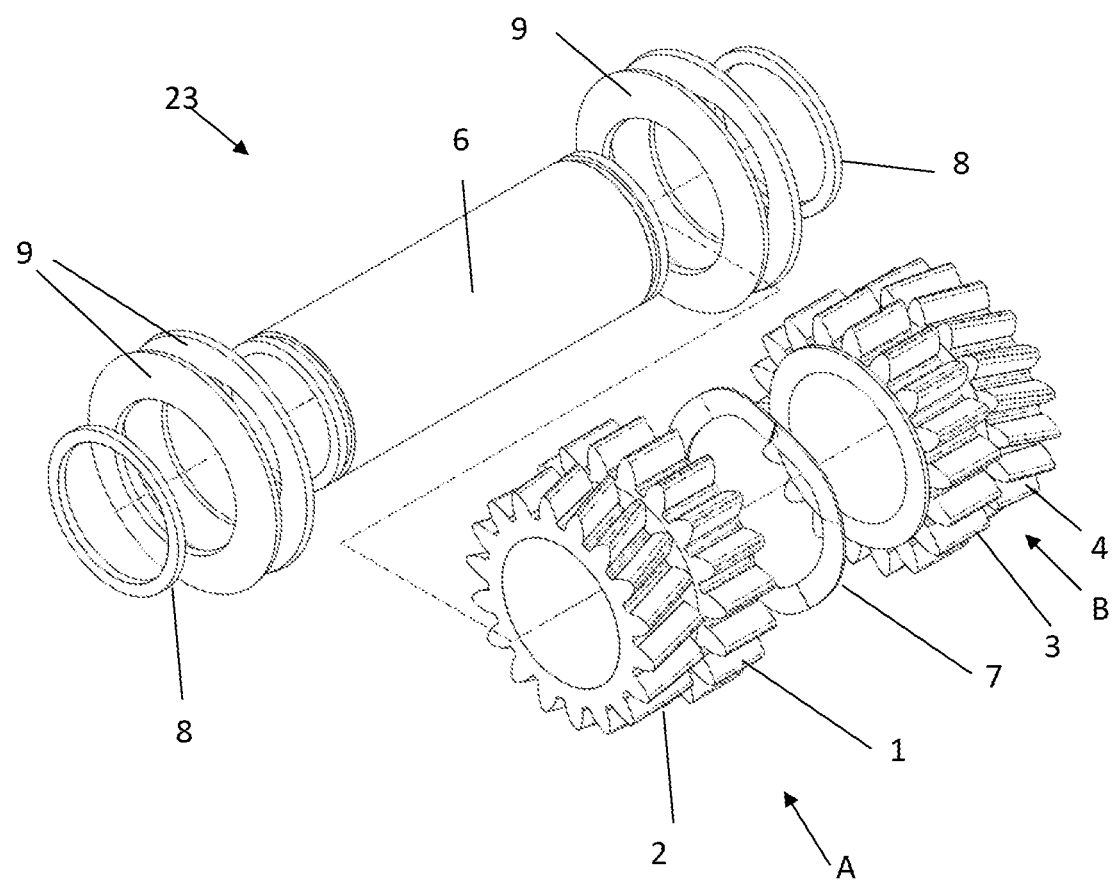
FIG. 14 is an exploded view of a planet for the gearbox of the actuator of FIG. 1.
Figure 15:
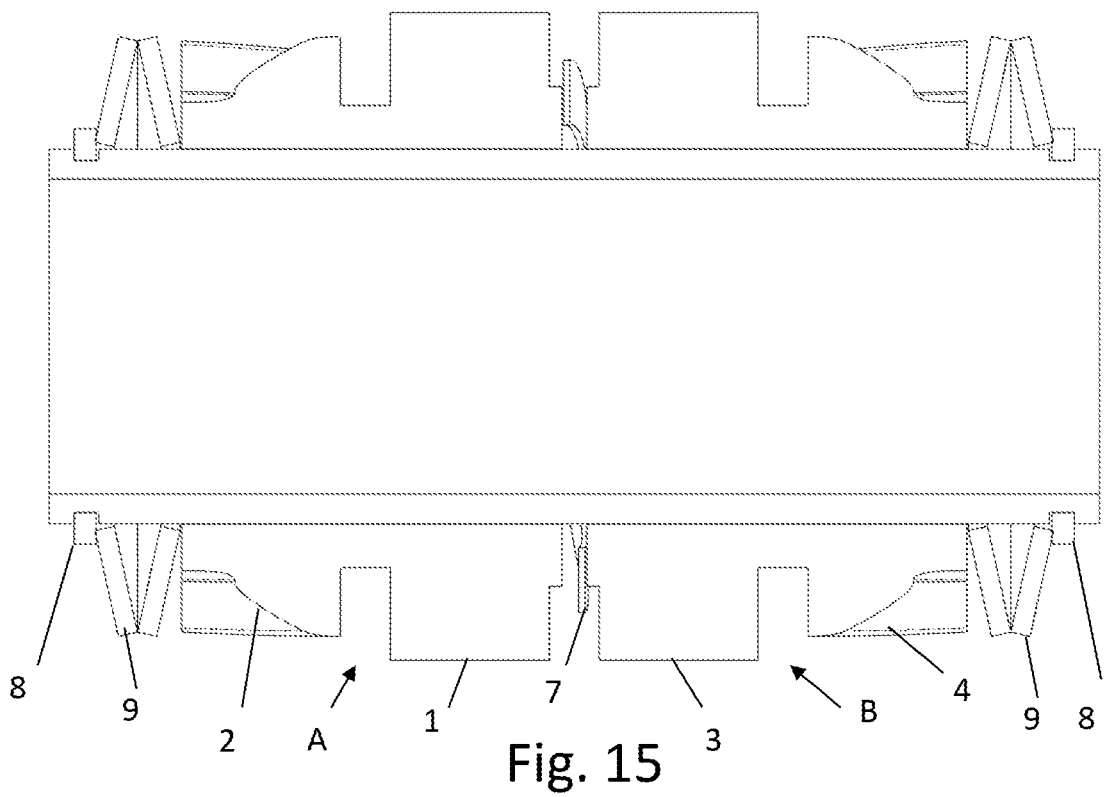
FIG. 15 is a side section view of the planet of FIG. 14.
Figure 16:
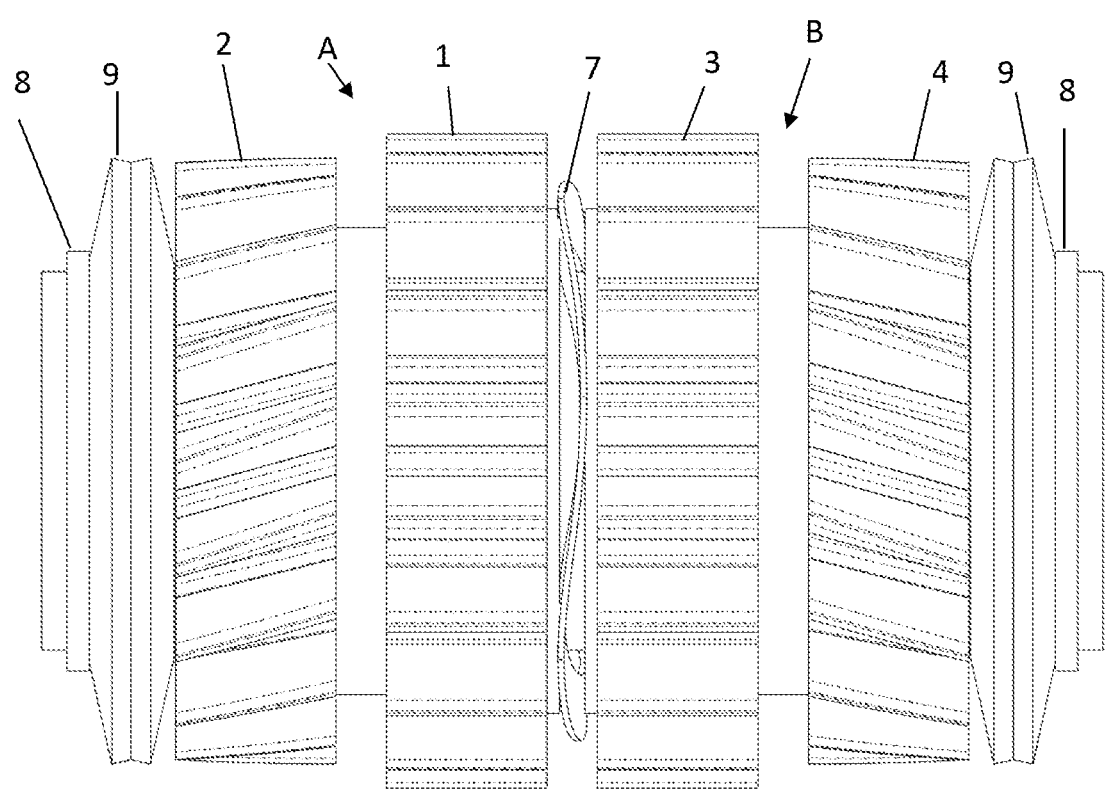
FIG. 16 is a side view of the planet of FIG. 14.

FIGS. 14-16 are closeup views of planet gears 23 of the actuator of FIG. 1, showing a load balancing mechanism.

FIG. 14 is an exploded view of a planet 23, FIG. 15 is a side section view, and FIG. 16 is a side view. As shown in these views, an axially inner and an outer planet gear 1, 2 are manufactured to act as one piece (gearset A) with symmetric axially inner/outer gears 3, 4 comprising gearset B. Both gearsets A and B are held in coaxial alignment by a center tube or rod 6. The term "rod" may encompass the term "tube." The fit between the gearsets A and B and the rod 6 is such that axial and rotational movement of the gearsets A, B on the tube 6 is possible. A center spring 7 between the gearsets A, B, and an outside spring 9 between the gearsets A, B and the retaining rings 8 at the ends of the shaft 6 allow axial motion of the gearsets A, B on the tube 6, and also rotational motion of gearset A relative to the other symmetric set B. The inner and outer gears on each set A and B are created with different helical angles (In this example, a helical angle of zero is used for the inner gear 1 but any helical angle can be used as long as the axially inner and outer gears have different angles. The gears having the same magnitude of helix angle with different handedness also provides a difference of helix angle. This helical angle difference must also compensate for the different diameter of the inner and outer gears such that axial movement of the gearset results in the loading of the inner gear teeth on the inner gear ring in the opposite direction of the outer gear teeth on the outer gear ring). As a result, any axial movement of a gearset A will cause the whole gearset A to rotate due to the larger helical gear angle on one of the gears 2 as it meshes with the helical gear teeth on the reference ring gear 10 which is fixed to the housing 12. We will refer to a stationary output ring gear 11 in this description for simplicity of explanation) The rotation of the gearset A during axial movement of gearset A will cause the axially inner spur gears 1 to rotate relative to the axially inner (output) ring gear 11 spur gears (FIG. A6) until the spur gears on gear 1 are contacting and transmitting torque to the axially inner (output) ring gear 11.

Figure 17:
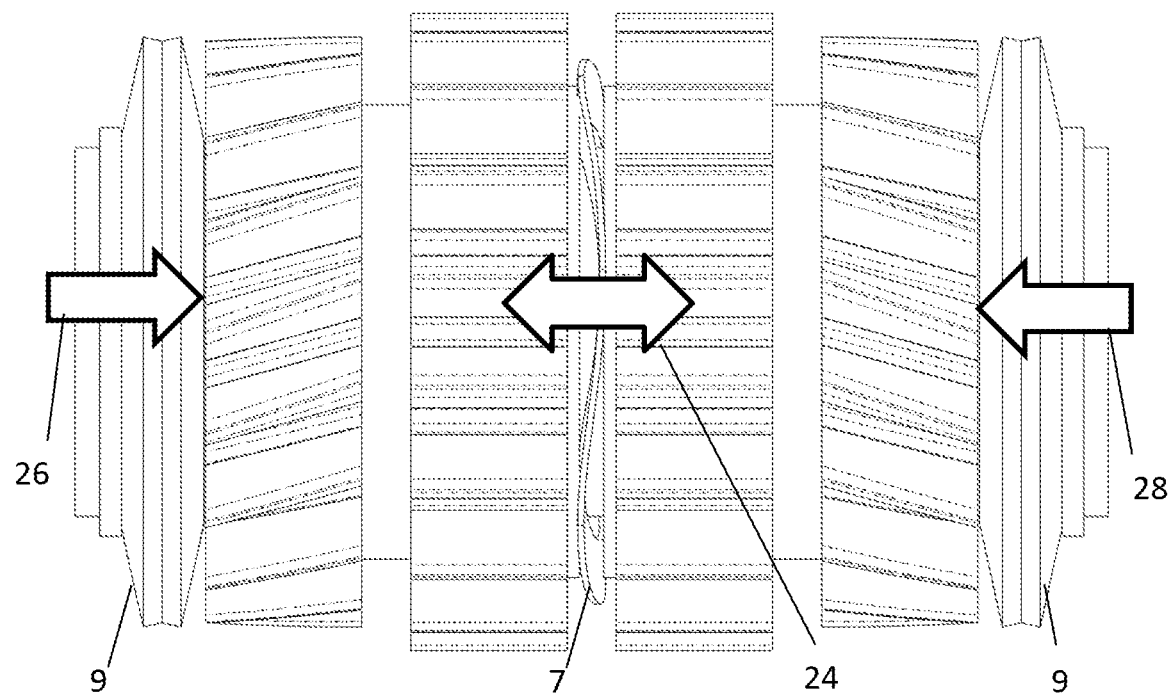
FIG. 17 is a side view of the planet of FIG. 14 showing prestressed forces.

The relative forces on and movements of the components of the planets 23 in this embodiment are illustrated in FIGS. 17-20. The center spring 7 may exert a force 24 and the end springs 9 may exert forces 26 and 28. Optionally, as shown in FIG. 17, the springs may be prestressed so that in the absence of the external forces, all of these spring forces are non-zero. This can enable all springs to remain in compression as the forces change, as may be useful for springs using Belleville and wave washers as shown. For other designs, it could be useful for the springs to be and remain in tension.

Figure 18:
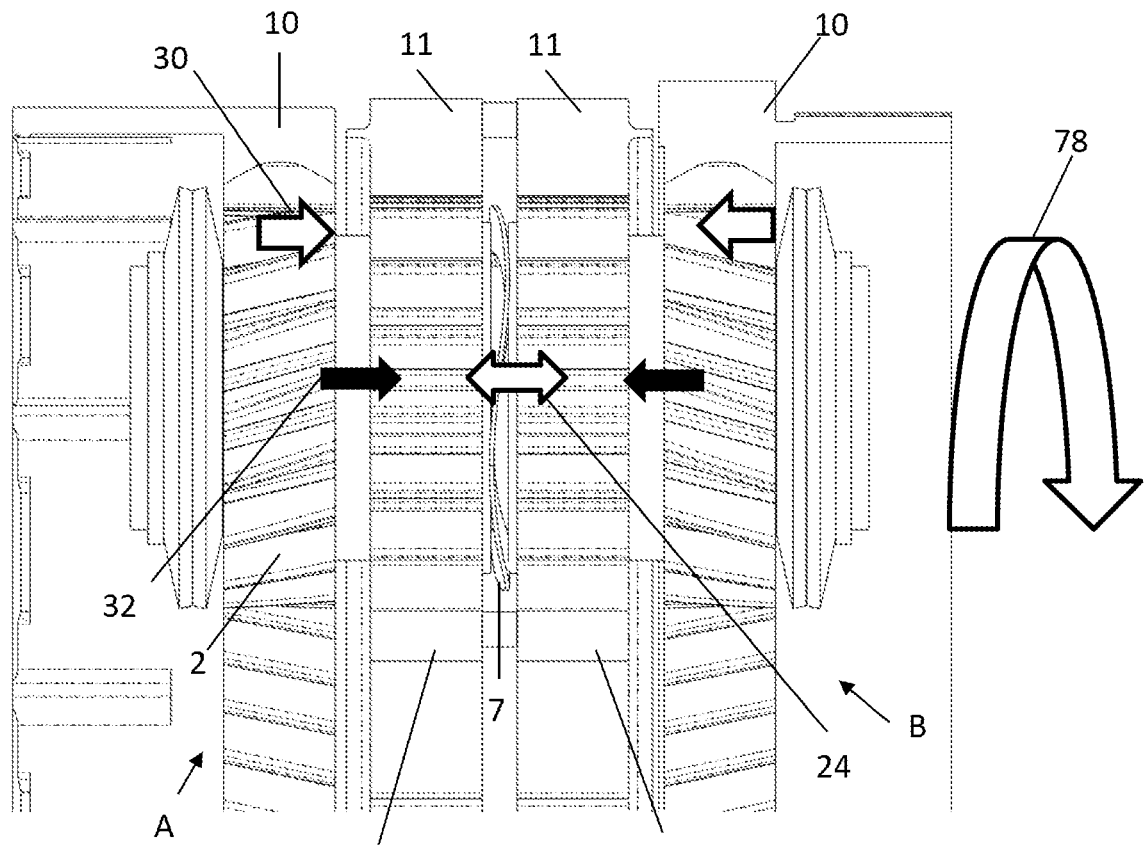
FIG. 18 is a side cutaway view of the exemplary actuator of FIG. 1 showing forces on a nominal planet.
Figure 19:
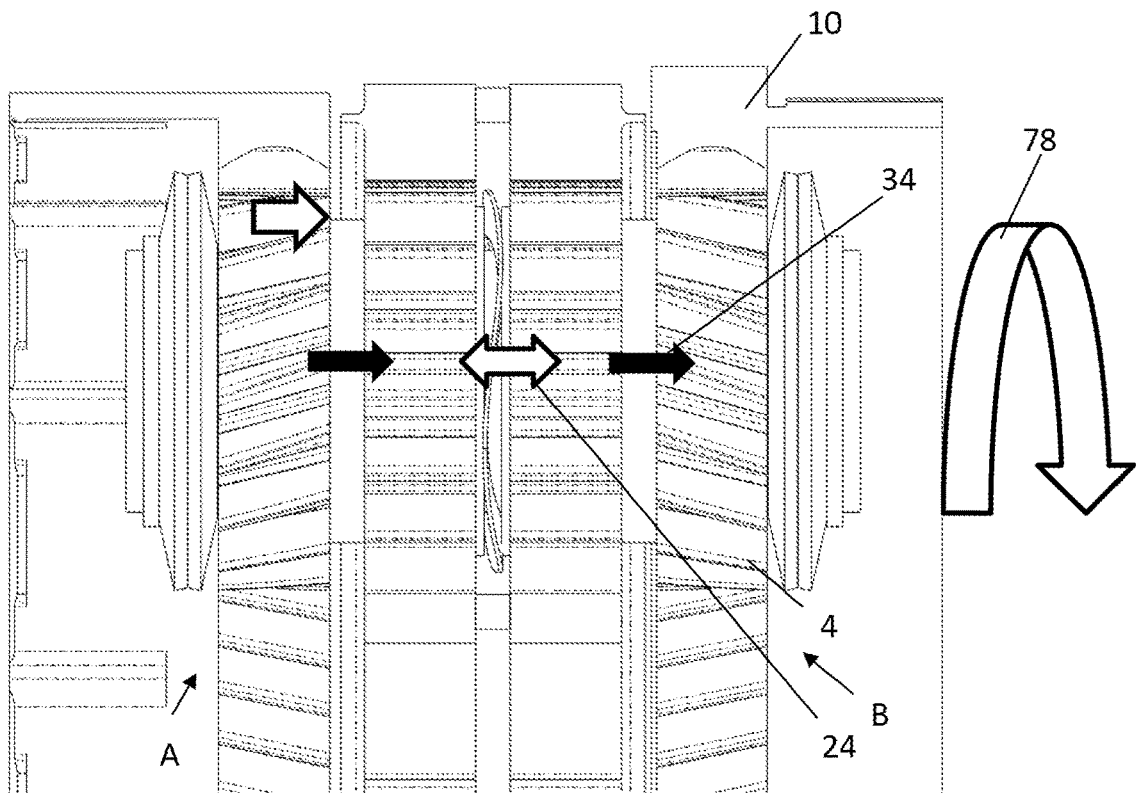
FIG. 19 is a side cutaway view of the exemplary actuator of FIG. 1 showing forces on a planet with one side small.
Figure 20:
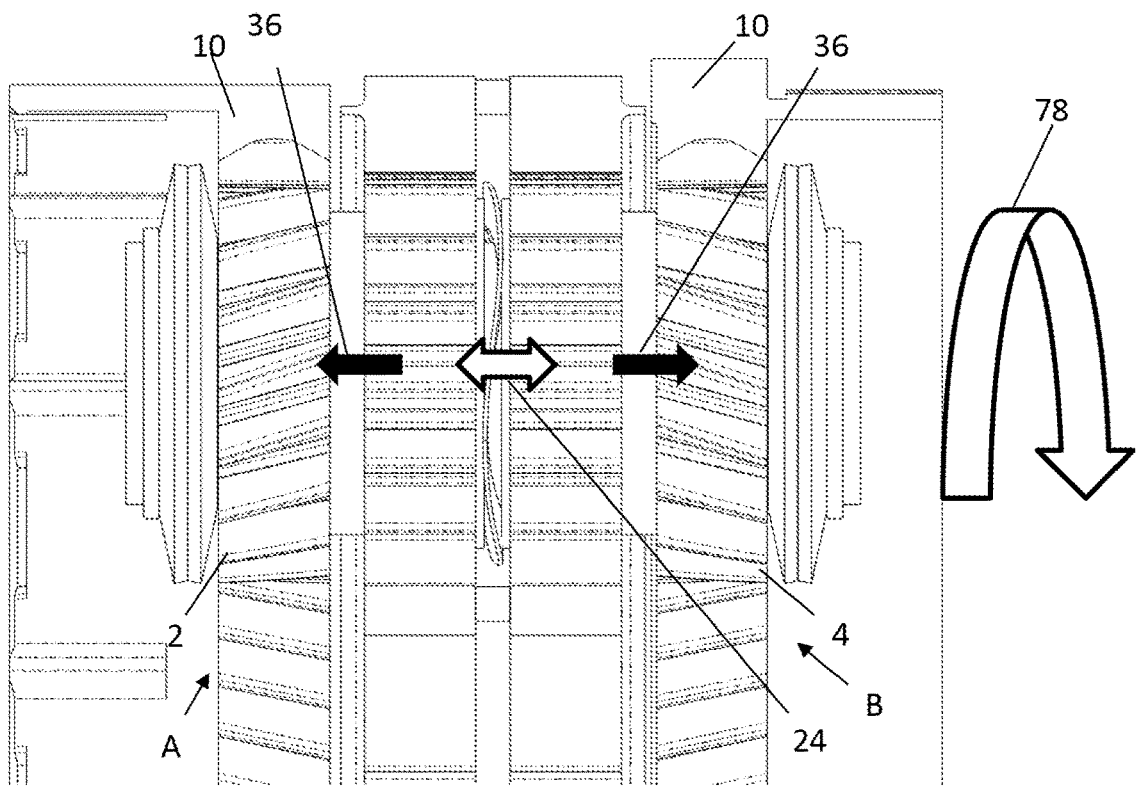
FIG. 20 is a side cutaway view of the exemplary actuator of FIG. 1 showing forces on a planet with both sides small.

An arrow 78 in FIGS. 18-20 indicates direction of motion of the teeth of the planet.

Axial movement of the gearset A (or B) is caused by the opposing torque that is transferred through the pinions when the reference ring gear 10 experiences a resisting torque during operation (operation referring to the torque that is applied by the electric motor rotor 13 to the axially inner (input) sun gears 14 through the sun gear flange 15. This torque applied to the gearset A will result in a torque being transferred through the outer helical gear 2 to the outer helical ring gear 10. In other embodiments other ring or sun gears could mesh with and transfer torque through the helical gears. The torque applied through this helical gear mesh will result in an axial force 30 on the gearset A as shown in FIG. 18. This axial force is similar to a nut applying axial force to a threaded bolt. This axial force 30 results in an axial displacement 32 of the gearset A that is opposed by one or more of the springs. When the axial force of the spring (e.g., the force 24 exerted by center spring 7) equals the axial force experienced by the gearset A as a result of torque transfer on the helical gear mesh 2, the gearset A reaches an equilibrium where axial motion ceases. Due to the spring rate of the springs 7, 9 (which may be, for example, Belleville washers and wave washers as shown here), each gearset A, B on each of the planets 23 will find its own equilibrium where the axial position and resulting relative rotation results in all of the gearsets in the planet (A and B on each of the multiple planets 23) transmitting a more consistent load than if all the gearsets A were one piece with the symmetric gearsets B. This allows the use of more than 3 pinons with relatively consistent load sharing between all of the pinions. Corresponding forces and displacements are also shown for gearset B in FIG. 18. FIG. 18 shows forces and displacements in default conditions with good contact.

FIG. 19 shows forces and displacements if one side is small. Helical gear 3 is small and does not initially experience an axial force from the corresponding gear 10. The forces and displacements on gearset A are initially the same as those shown in FIG. 18. The displacement of gearset A increases the center spring force 24 which forces gearset B to displace in motion 34. This will force gear 4 into contact with corresponding gear 10 to share some of the load.

FIG. 20 shows the case of both gearsets A and B being small. Neither helical gears 2 or 4 would experience an axial force from the corresponding gears 10 if the gears are in the positions of FIG. 18. Compared with the situation in FIG. 18, the center spring force 24 is less opposed by other axial forces and displaces both gearsets outwards as shown by arrows 36 to contact the corresponding gears 10 and share some of the load.

In this embodiment, torque on the helical gears and corresponding gears in one rotational direction will result in the pinion gearsets A, B on each pinion assembly to move inward (toward each other) compressing wave spring 7, which exerts a corresponding outward force 24. When torque is reversed, the gearsets A, B on each planet 23 will move in the opposite axial direction, compressing the end springs 9.

Including both gearsets A and B allows balancing of axial forces so that the planetary gears do not axially shift out of alignment with the sun and ring gears. The gear system could also work with only one of gearsets A and B, so long as the axial forces were balanced in another way, such as for example by mounting the rod 6 on a planet carrier so that one end spring 9 could transmit a net axial force from the planet carrier to the planetary gears to balance the axial force on the gears. The symmetric gearsets A and B also prevent twisting of the planet assemblies by balancing the loading of the planets from end to end.

Figure 21:
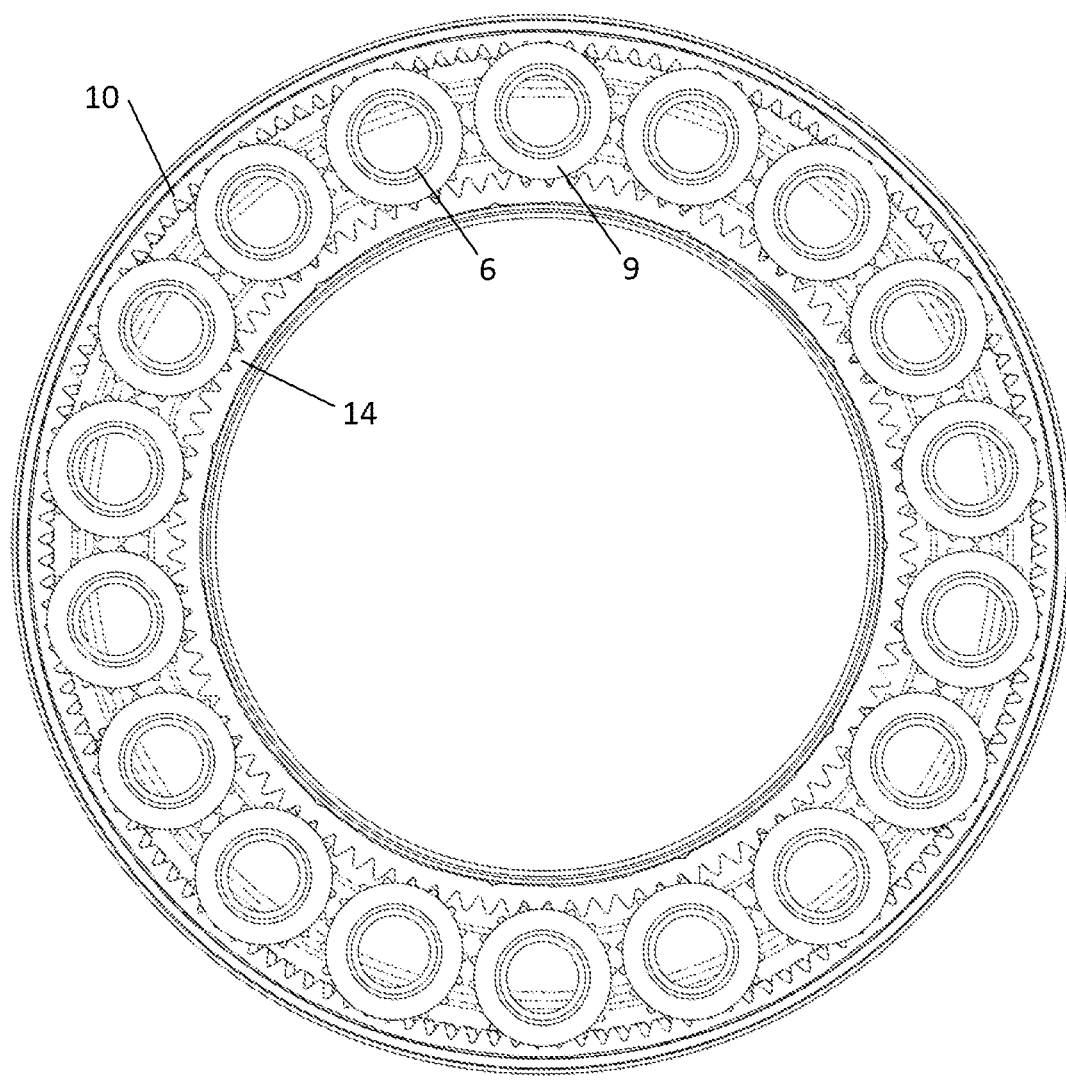
FIG. 21 is a front view of the actuator of FIG. 1 with the front output and housing portions removed.
Figure 22:
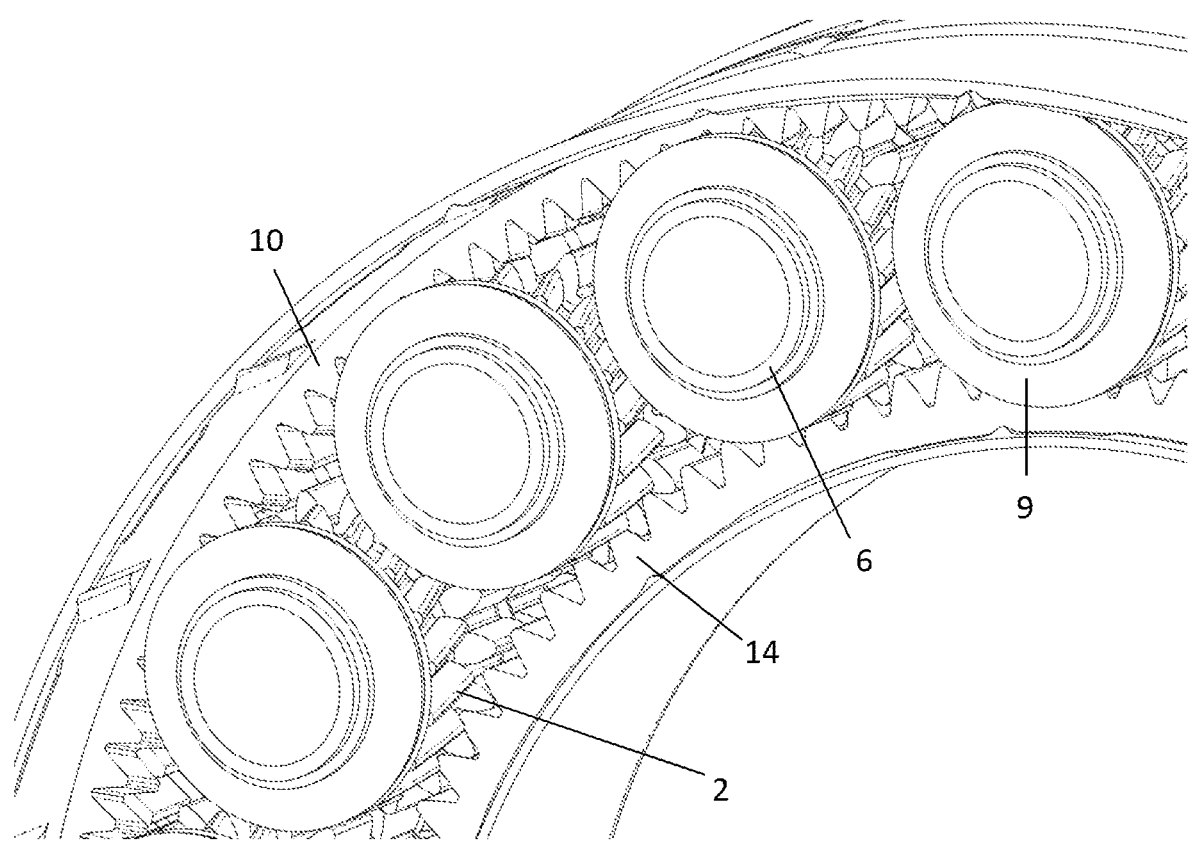
FIG. 22 is an isometric view of the actuator of FIG. 1 with the front output and housing portions removed.
Figure 23:
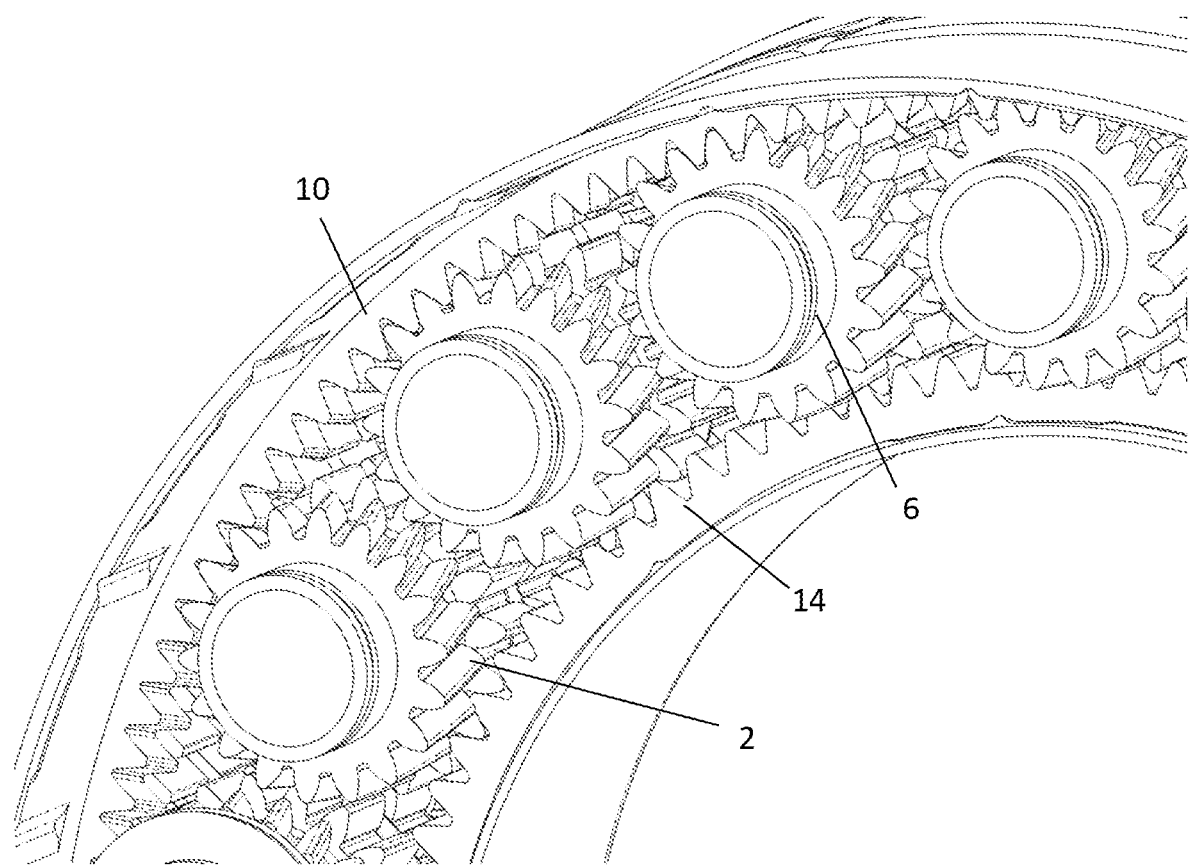
FIG. 23 is an isometric view of the actuator of FIG. 1 with the front end springs of the planets also removed.
Figure 24:
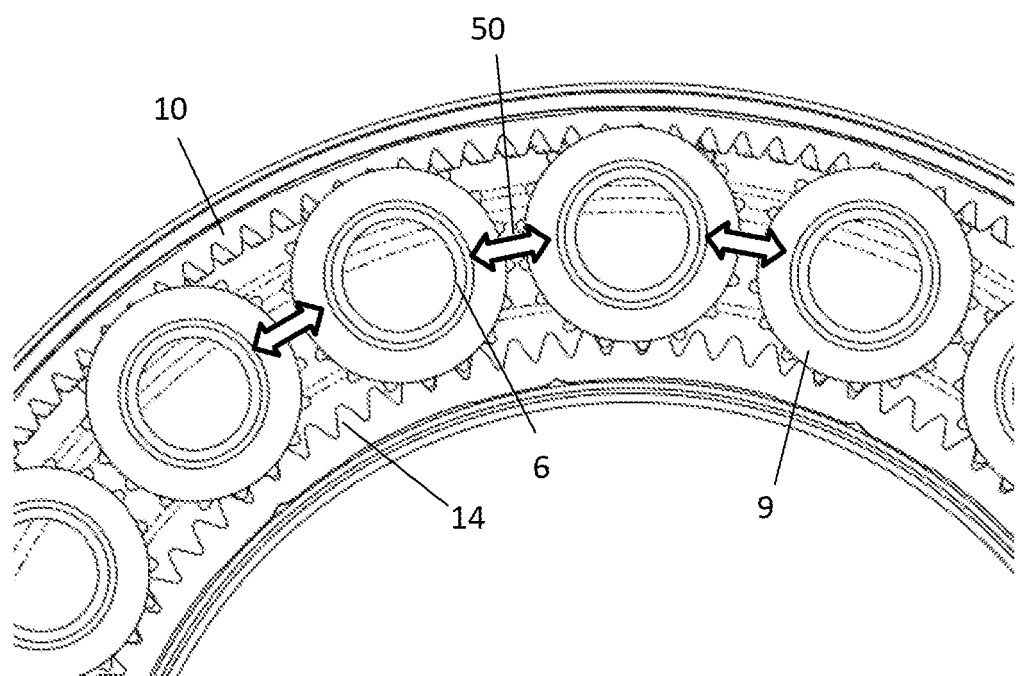
FIG. 24 is a front view of the actuator of FIG. 1 with the front output and housing portions removed, also schematically showing planet positioning changes.

FIGS. 21-24 show the actuator of FIG. 1 with the front output and housing portions removed. FIG. 21 is a front view, and FIG. 22 is an isometric view. FIG. 23 is an isometric view with the front end springs of the planets also removed. FIG. 24 schematically shows planet positioning changes 50 for load sharing. Because all the gears mesh with the input and output gears, which in the embodiment shown are straight, these relative positioning changes 50 are smaller than shown, but the small positioning changes help share the load.

Figure 25:
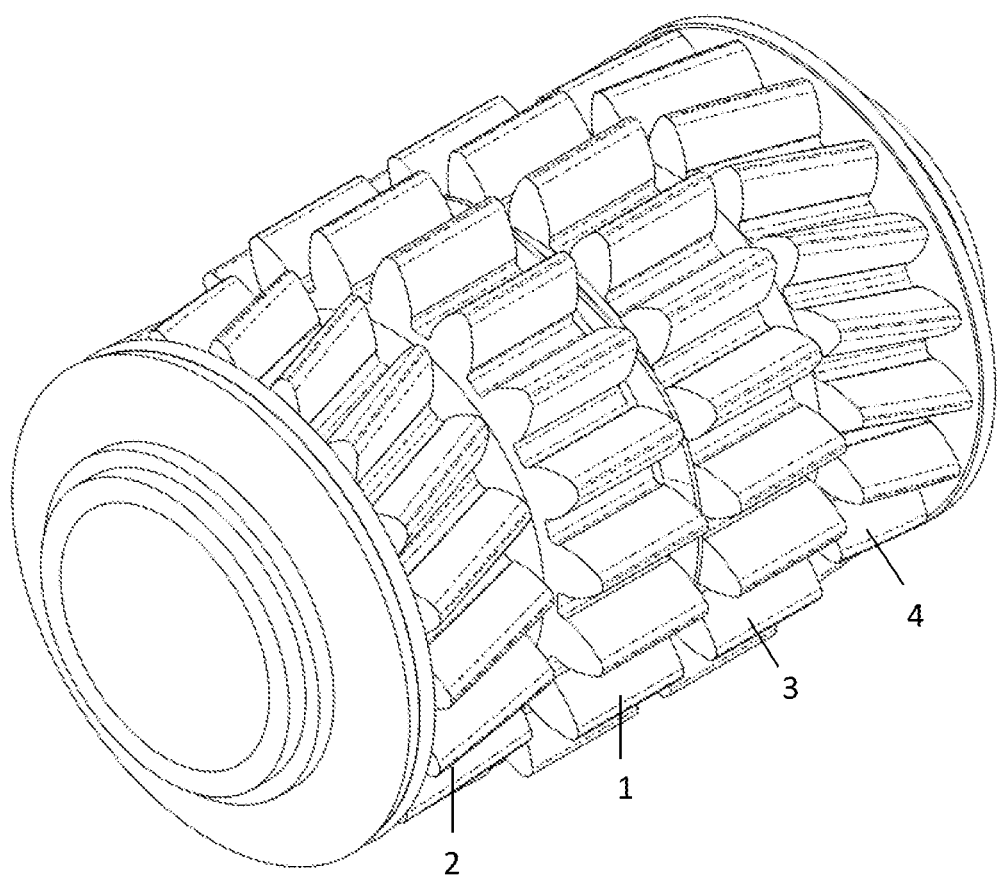
FIG. 25 is an isometric view of a planet for the actuator of FIG. 1 having aligned teeth.
Figure 26:
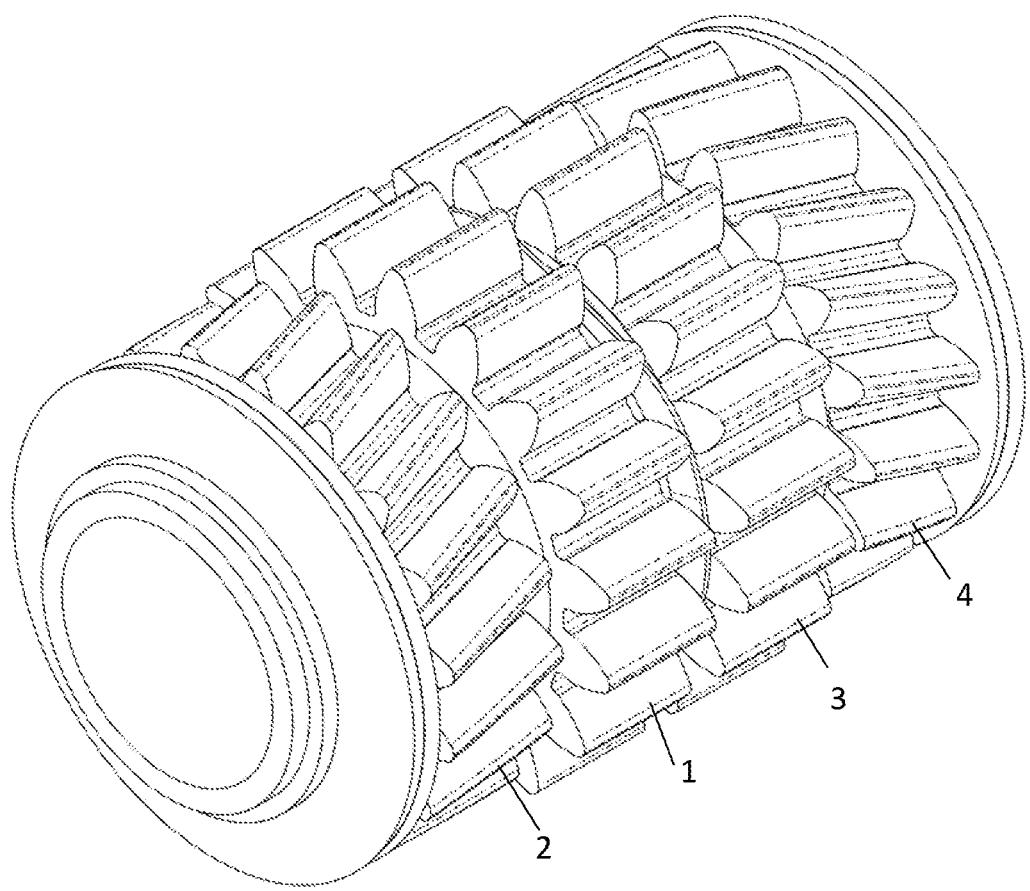
FIG. 26 is an isometric view of a planet for the actuator of FIG. 1 having offset teeth.

As shown in FIGS. 25-26, the teeth of the gears 1 and 2, and those of gears 3 and 4, can be aligned (as shown in FIG. 25) or offset (as shown in FIG. 26). As described further below, for some manufacturing techniques it may be easier to produce gearsets with aligned teeth.

Double Bearing: One of the challenges in selecting bearings for large diameter applications is that the maximum rated rotation speed is often limited due to inconsistencies in the bearing tolerances. In order to use off-the-shelf bearings, but allow for higher rotational speeds, multiple bearings may be stacked concentrically as shown in FIG. 1. Each bearing would then see a significantly reduced rotation speed.

With each bearing maintaining rolling contact, n bearings would each see 1/n of the rotation speed.

This premise consists of two or more concentric bearings with axial constraint appropriate for the loads applied in that application. One embodiment, shown in FIG. 1 consists of a pair of concentric bearings 17 and 19, with a supporting ring 18 between them. This ring allows for a precise fit to each of the bearings, while retaining the bearing in the loaded direction. Axial force can then be transmitted from the rotating end, through the outer bearing, through the retaining ring, through the inner bearing, and on to the internal shaft.

Aluminum Heat Sink: Because of the fact that the gearbox makes use of stationary ring gears on either side of the assembly, the motor, in embodiments of the device, is contained within the structure 12 connecting the stationary (reference) ring gears 10. This poses a potential problem with heat dissipation within this structure. In certain applications, the surrounding structure may be constructed of a poor heat conducting material. Heat generated by a motor would then have a highly resistant heat flow path out of the enclosure. By making use of an aluminum (or other highly heat conductive material) heat sink 20 as shown in FIG. 1, the heat generated by a motor has a significant sink to collect in, ensuring that the stator does not overheat from periodic and short temperature spikes, In FIG. 1, the heat sink is exposed to the external support structure through holes 21 in the enclosure, allowing heat energy to be efficiently dissipated by contact with another heat conducting body in the structure, or by convection cooling, without the heat needing to pass through the enclosure material directly.

Other arrangements of the input, output and reference could also be used. In general, for the gear system to act as a large ratio gear reducer (amplifying torque), as in the embodiment shown in the figures, the output and reference should be both radially inner or radially outer with respect to the planet arrangement, and the input should be the opposite, connected to either of the gears the output or reference is connected to, or, in principle, to still another gear. For the system to act as a large ratio gear increaser (reducing torque), the input and reference should be both radially inner or radially outer with respect to the planet arrangement, and the output should be the opposite, connected to either of the gears the input or reference is connected to, or, in principle, to still another gear. For the system to act as a small ratio gear increaser or reducer, the input and the output should be both radially inner or radially outer with respect to the planet arrangement, and the reference should be the opposite, connected to either of the gears the input or output is connected to, or, in principle, to still another gear.

Where a planet gear connected to one of the input, output or reference in one of the radially inward or outward directions, but not connected to any of those in the other of the radially inward or outward directions, a floating gear can be added if desired.

In an embodiment, a high torque LiveDrive™ electric motor may be used, such as disclosed in U.S. Pat. No. 9,755,463, the content of which is hereby incorporated by reference in its entirety.

Differential gearboxes are typically lower efficiency because the full output torque is also meshing at high speed resulting in a high percentage of work required to overcome this friction. But with the higher motor torque at lower speed of the LiveDrive™ a significantly lower gear ratio can be used, thus increasing efficiency. With 18 planets and a mechanism to ensure proper load sharing, the contact ratio is 6× that of a traditional planetary gearbox, thus increasing torque capabilities significantly. The low-ratio allows the input rotor to run slower for a given output speed. This allows for the use of low-profile bearings, which when radially stacked as described above, results in lower total bearing weight. Low maintenance: Very few moving parts. Frequency of maintenance activities and overall downtime are expected to be reduced.

The actuator may be used for high torque applications where a hydraulic actuator might otherwise be used. Advantages over hydraulics include the following. Highly reliable: damage to one power line does not affect multiple actuators. Higher MTBF with electrical actuation. Easy to monitor: only the actuator needs monitoring. Controllability: highly responsive and precise due to low-ratio gear-reduction. Electric actuation allows more sophisticated control algorithms. Environmentally safe: no possibility of leakage or dangerous emissions.

Plastic Gears

The use of plastic gears in a planetary gear box is generally expected to provide lower torque and lower torque to weight than a steel gearbox of the same size and geometry. In one simple example, a conventional steel planetary gearbox using high strength steel for all the gears and housing and using three large planets would provide approximately three times the torque-to-weight of the same gearbox made from carbon reinforced PEEK (which is a very strong injection moldable plastic).

When configured as shown here, the use of plastic gears is believed to have the potential of providing a surprising result, which is to approach or even exceed the torque to weight of an equivalent construction gearbox made from high strength steel.

Figure 27:
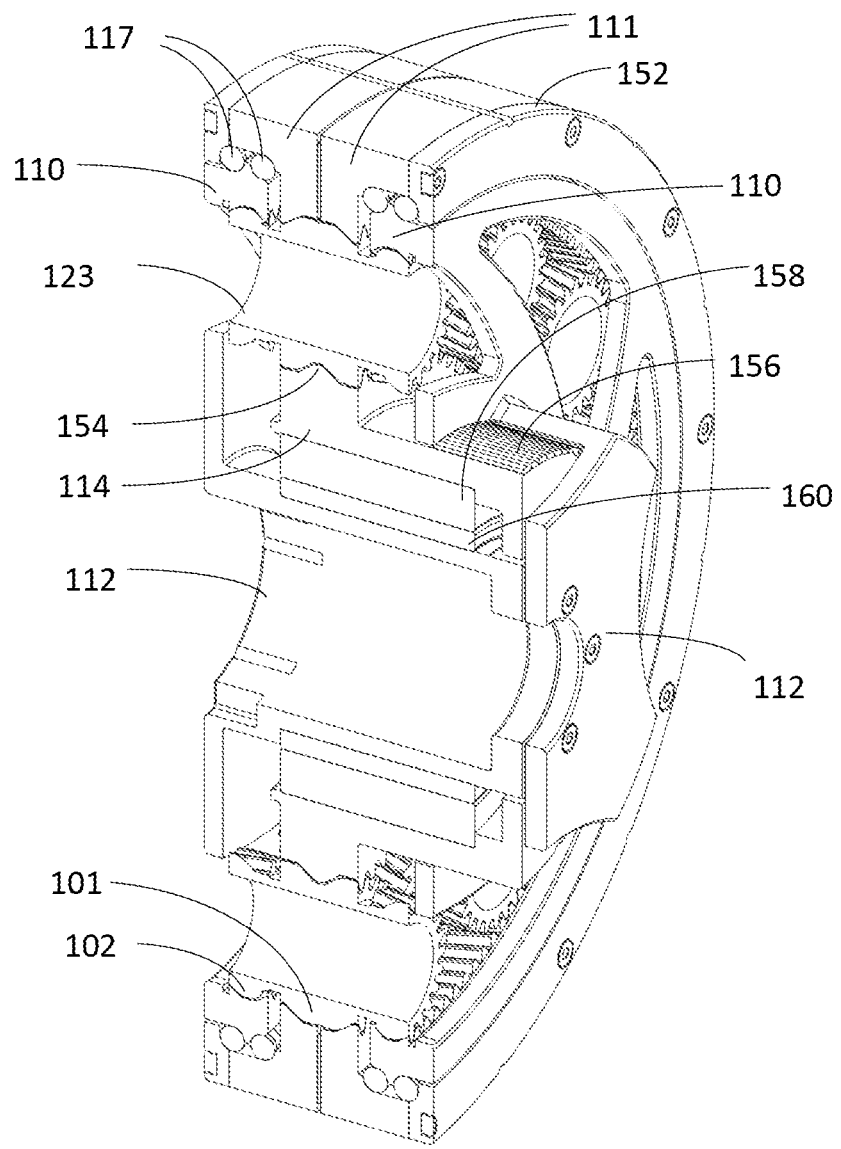
FIG. 27 is an isometric cutaway view of an exemplary gearbox.

FIGS. 27-37 show a non-limiting example of this construction. As shown in FIG. 27, an array of 12 planets 123 are constructed to drive an output ring gear 111 relative to stationary ring gears 110 with a 15:1 differential ratio when driven with a sun gear 114. Note that for clarity, the frame of reference describing the gears is relative to the axial direction of the gearbox, with the center gear teeth closer to the axial center of the gearbox and the outer gear teeth further from the axial center of the gearbox as labeled in FIG. 27. The sun gear 114 has teeth 154 that can be designed to mesh with either the center planet gear teeth 101 (which are preferably larger in pitch diameter) or the outer planet gear teeth 102 (which are preferably smaller pitch diameter). A motor rotor (not shown) may be positioned on the ID of the sun gear 114. In the embodiment shown, the sun gear has an exposed grooved portion 156 that is designed for input by hand as a demonstration. In another embodiment, the grooves could be replaced by gear teeth so that the grooved portion 156 may mesh with an input gear (not shown). If the input gear is smaller than the sun gear 114 at the exposed gear portion 156 a further gear reduction may be obtained. A direct input could be provided here with limited range of motion, or alternatively, the housing 112 could be enlarged such that it surrounds a motor, which allows for continuous input.

The sun gear 114 is supported in this embodiment from the housing 112 by a bearing 158 on a bearing sleeve 160.

The center planet gear teeth mesh with the center ring gears 111 which in an embodiment are the output of the gearbox. The outer gear teeth 102 on the planets mesh with the two outer ring gears 110 which, in this exemplary embodiment, are attached to ground via housing 112. Ball bearings 117 may support the output ring 111 for rotation relative to the stationary rings 110. A bearing retaining ring 152 in this embodiment is attached to the output.

Rotation of the sun gear 114 causes the planets 123 to rotate and to orbit around the ID of the ring gears 110 and 111. As a result of the different ratios between the inner planets and the inner ring gear 111, and the outer planet gears and the outer ring gear 110, a differential reduction is provided which, in this case, equals approximately 15:1 with the following gear tooth numbers:

TABLE 1

| Gear | Number of Teeth | Pitch Diameter (mm) |
|---|---|---|
| Sun gear | 84 | 82.63 |
| Inner ring gear (Output) | 132 | 129.85 |
| Outer ring gear (Stationary) | 144 | 127.5 |
| Inner planet gear | 24 | 23.61 |
| Outer planet gear | 24 | 21.25 |

Figure 28:
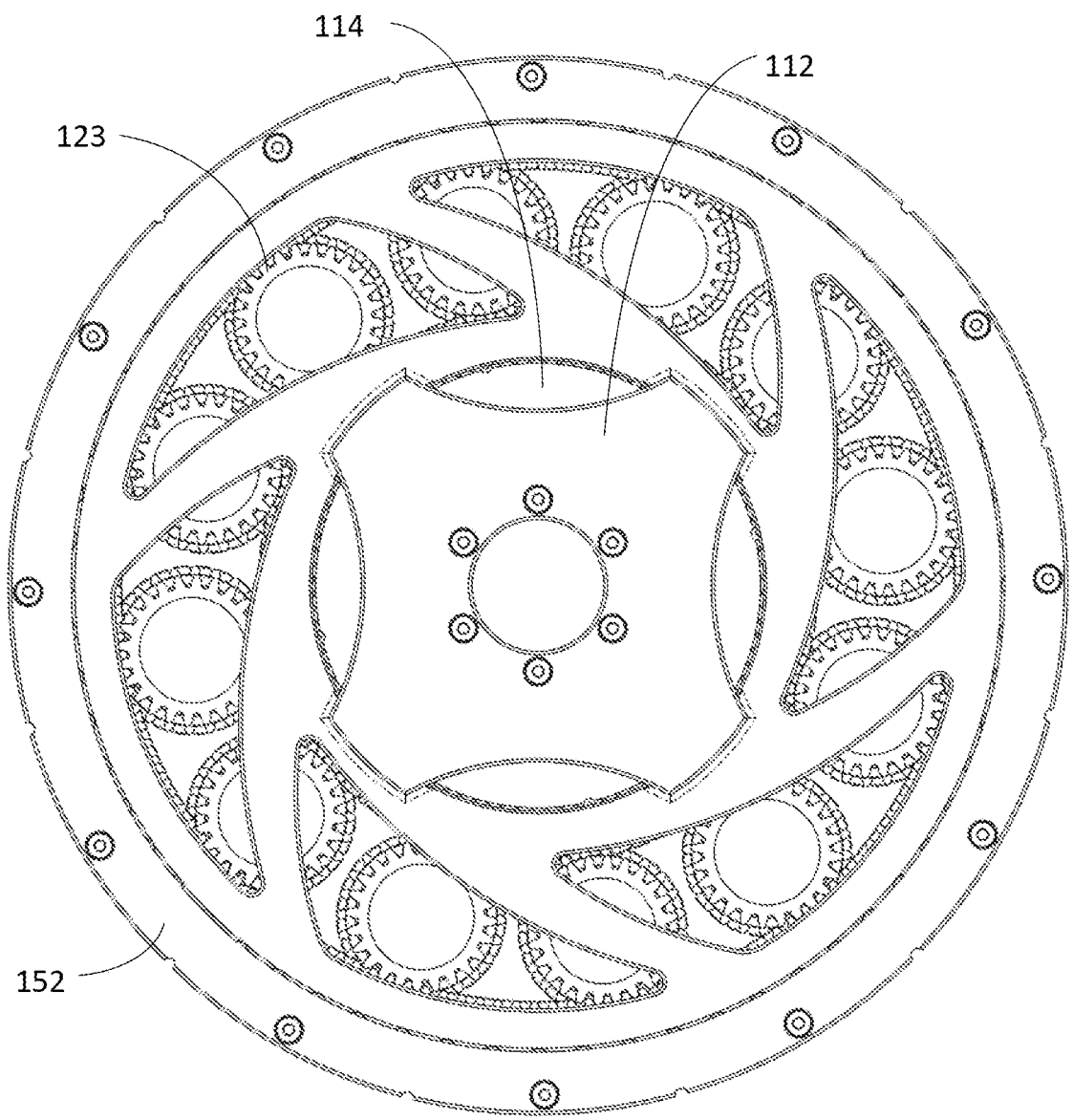
FIG. 28 is a front view of the gearbox of FIG. 27.
Figure 29:
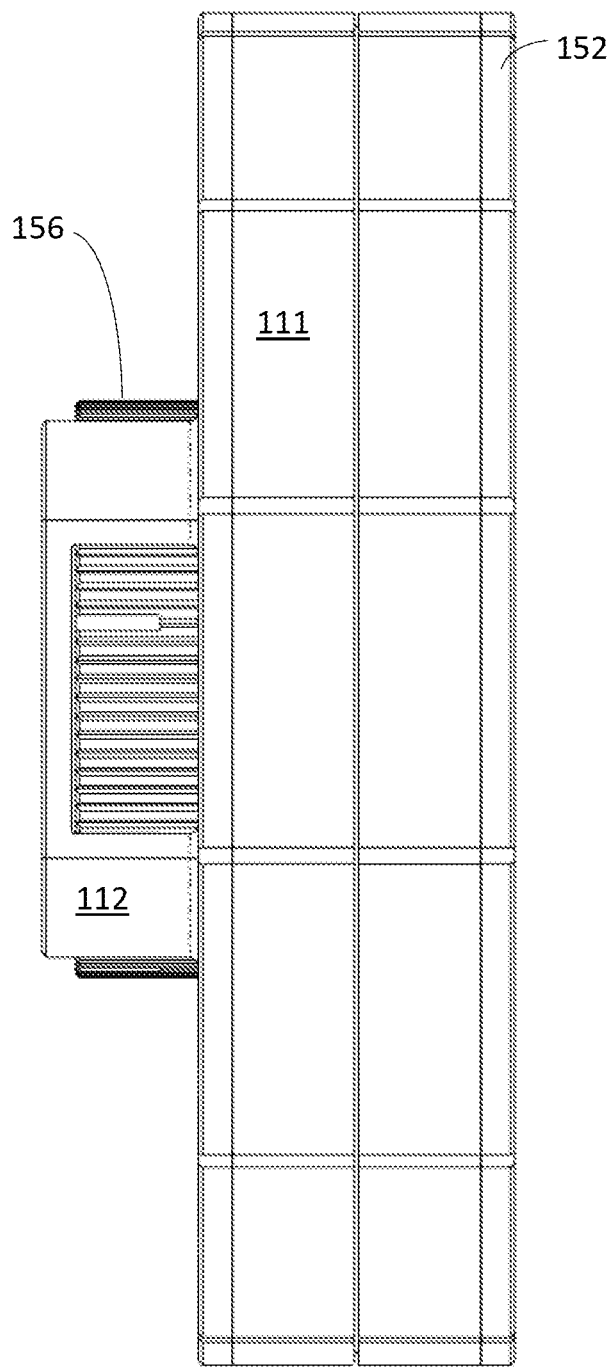
FIG. 29 is a side view of the gearbox of FIG. 27.
Figure 30:
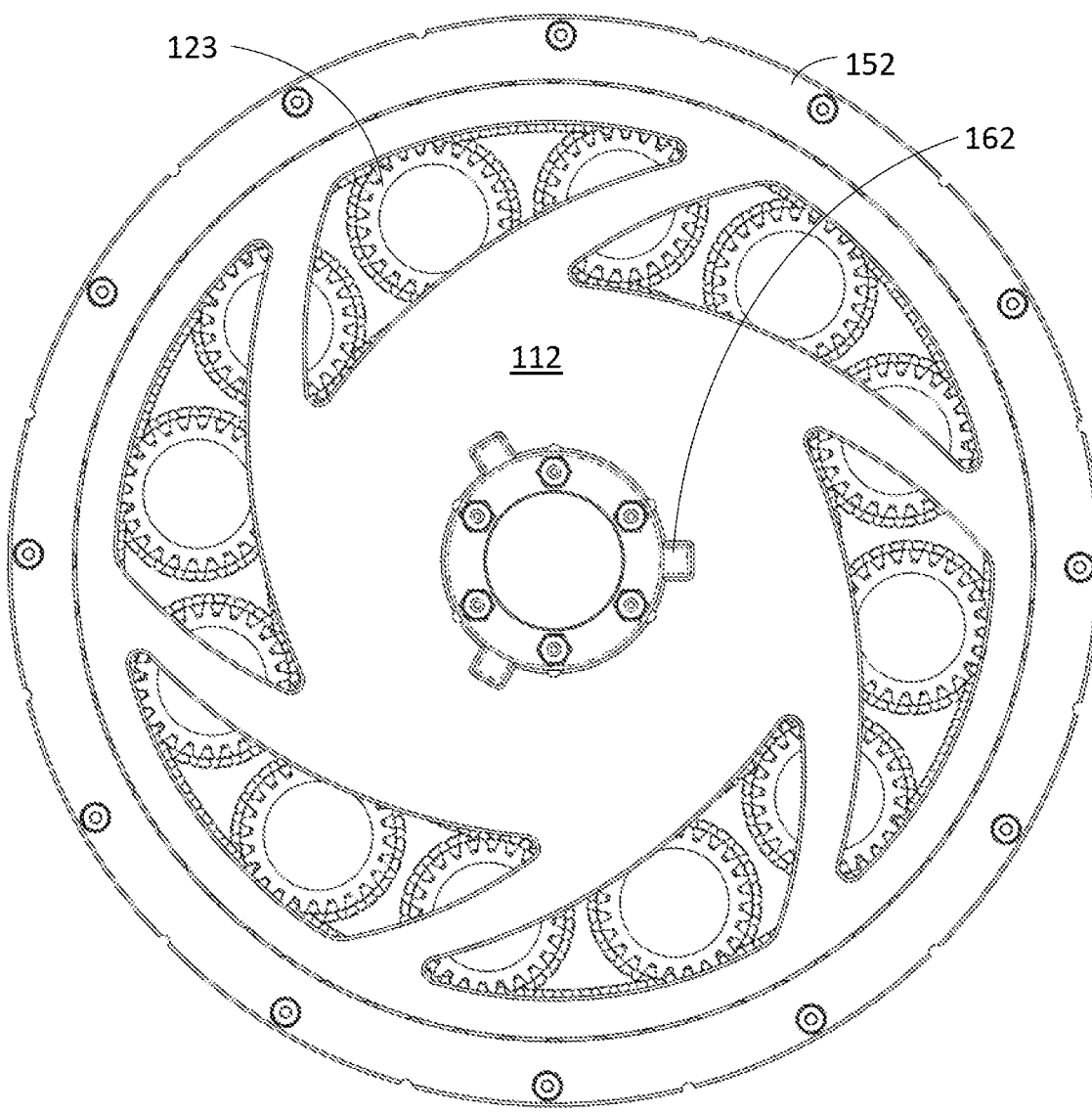
FIG. 30 is a rear view of the gearbox of FIG. 27.
Figure 31:
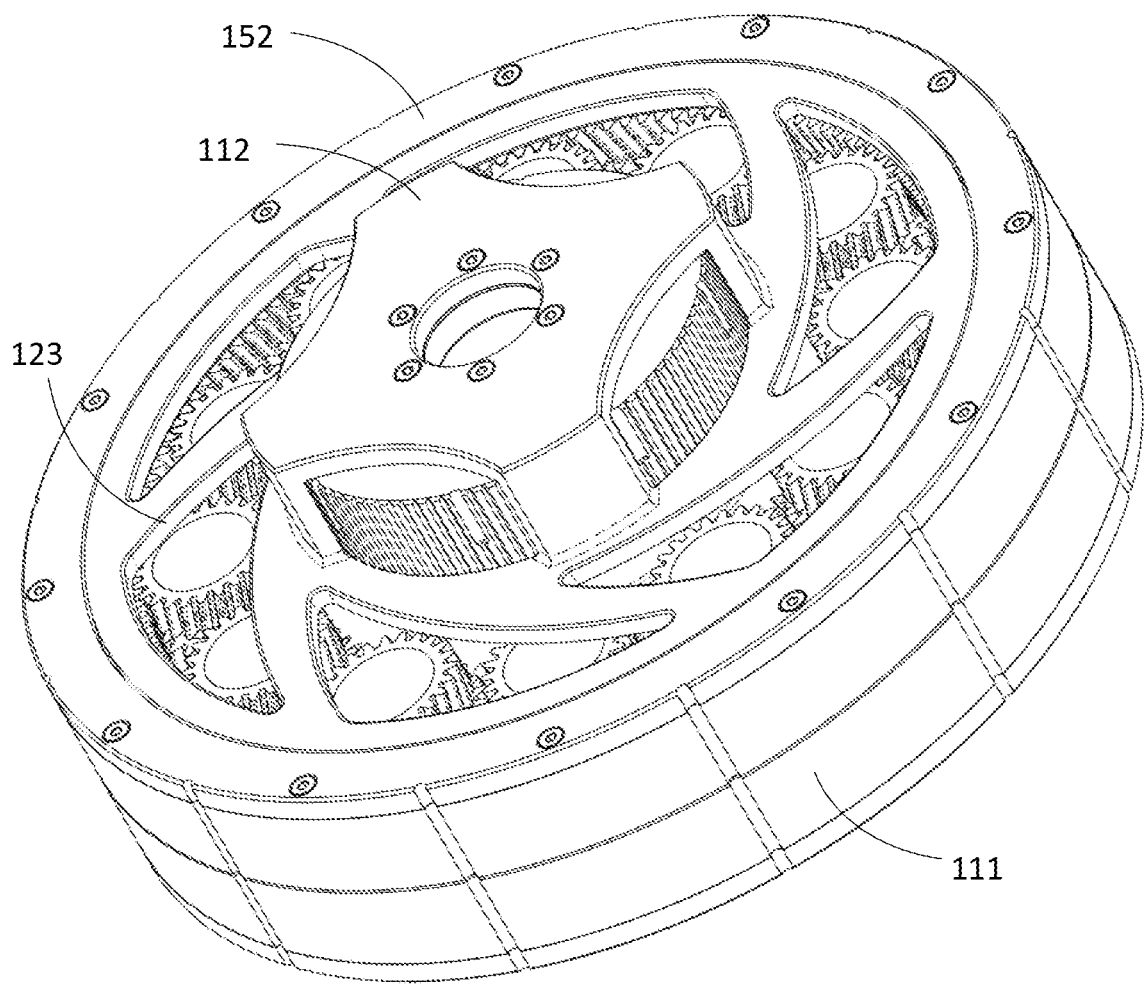
FIG. 31 is an isometric view of the gearbox of FIG. 27.
Figure 32:
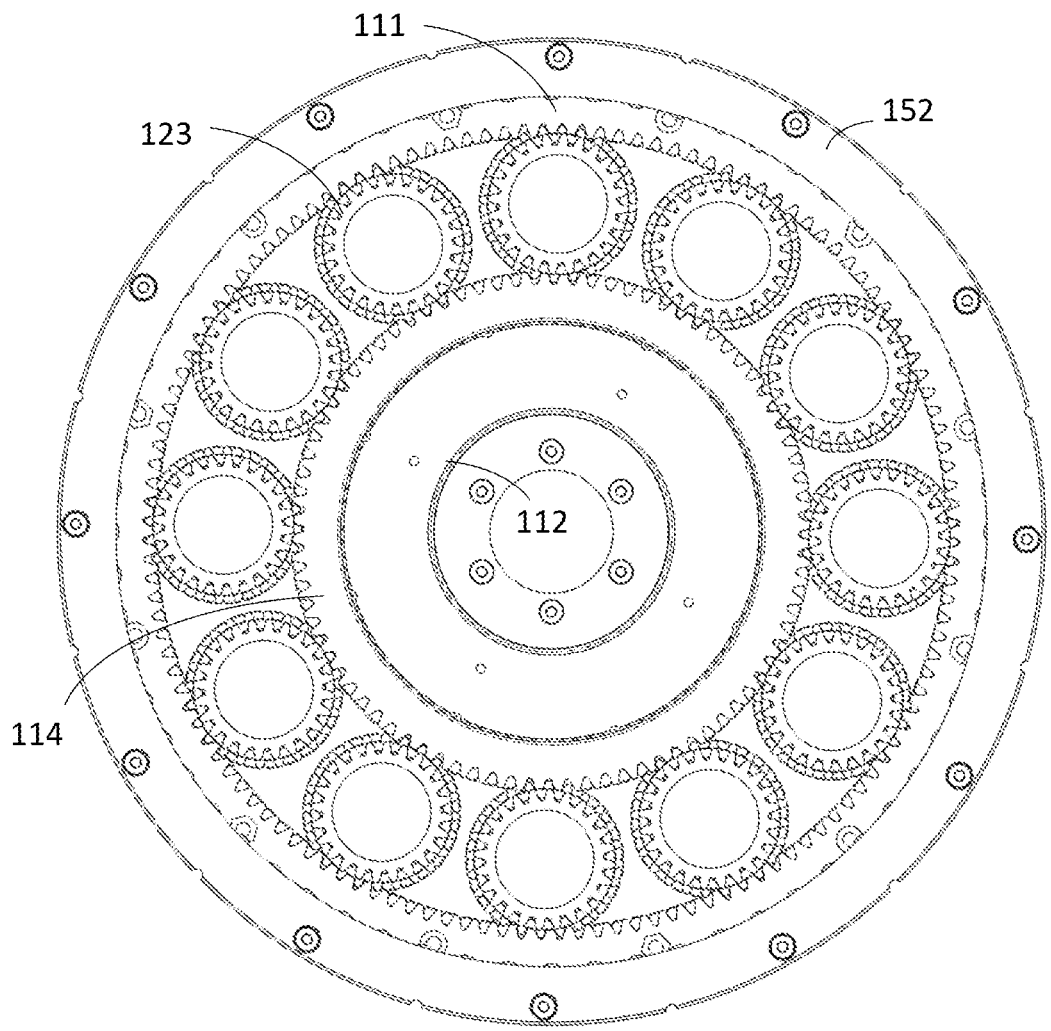
FIG. 32 is a rear view of the gearbox of FIG. 27 with the stationary ring gears and portions of the housing removed.

FIGS. 28-32 show further views of the gearbox of FIG. 27. FIG. 28 is a front view, FIG. 29 is a side view, and FIG. 30 is a rear view. As shown in FIG. 30, the housing 112 may have static mounting features/keyways 162 on an inner diameter of housing 112 to better enable the gearbox to be mounted to another object. FIG. 31 is an isometric view. FIG. 32 is a rear view with the stationary ring gears, and portions of the housing that would obscure the planet gears 123, removed.

Figure 33:
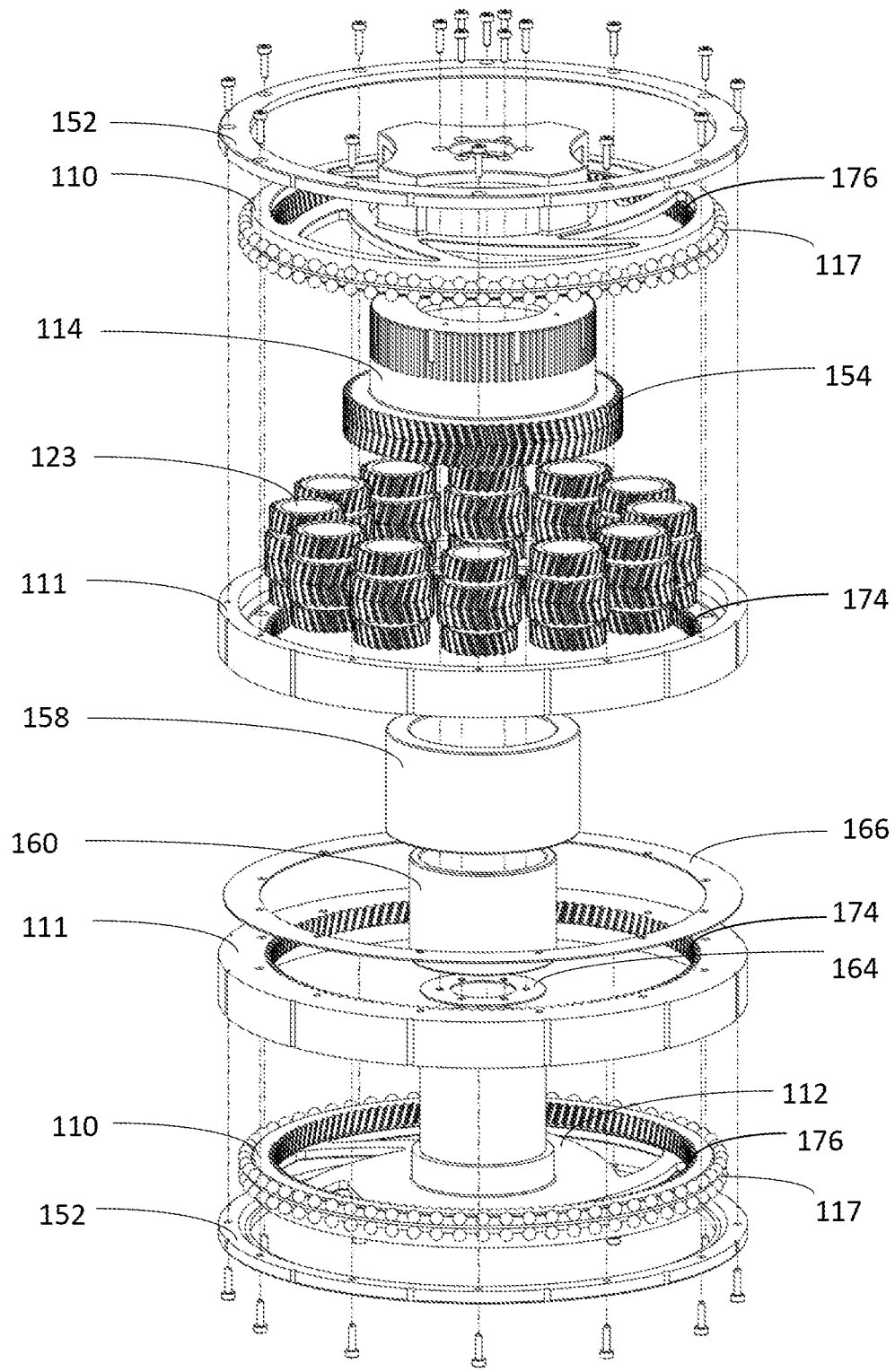
FIG. 33 is an exploded view of the gearbox of FIG. 27.

FIG. 33 is an exploded view of the gearbox of FIG. 27. As seen in FIG. 33, an inner shim 164 allows axial adjustment of the bearing sleeve relative to the housing 112, thus allowing axial adjustment of the sun gear 114, and an outer shim 166 separates the two output gears 111 from each other, allowing axial adjustment of the output gears 111. Uses of such axial adjustments are described further below in relation to FIGS. 54-56. FIG. 33 also shows the teeth 174 of the output gears 111 and the teeth 176 of the stationary gears 110.

Figure 34:
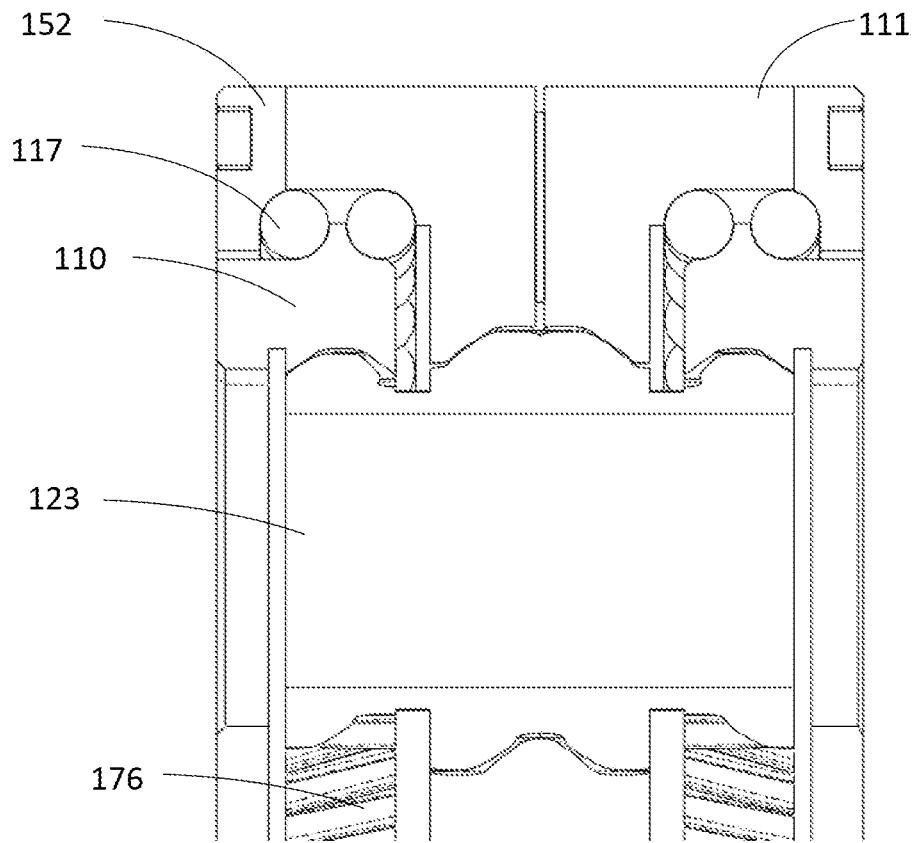
FIG. 34 is a side cutaway view of a portion of the gearbox of FIG. 27 including a planet gear.
Figure 35:
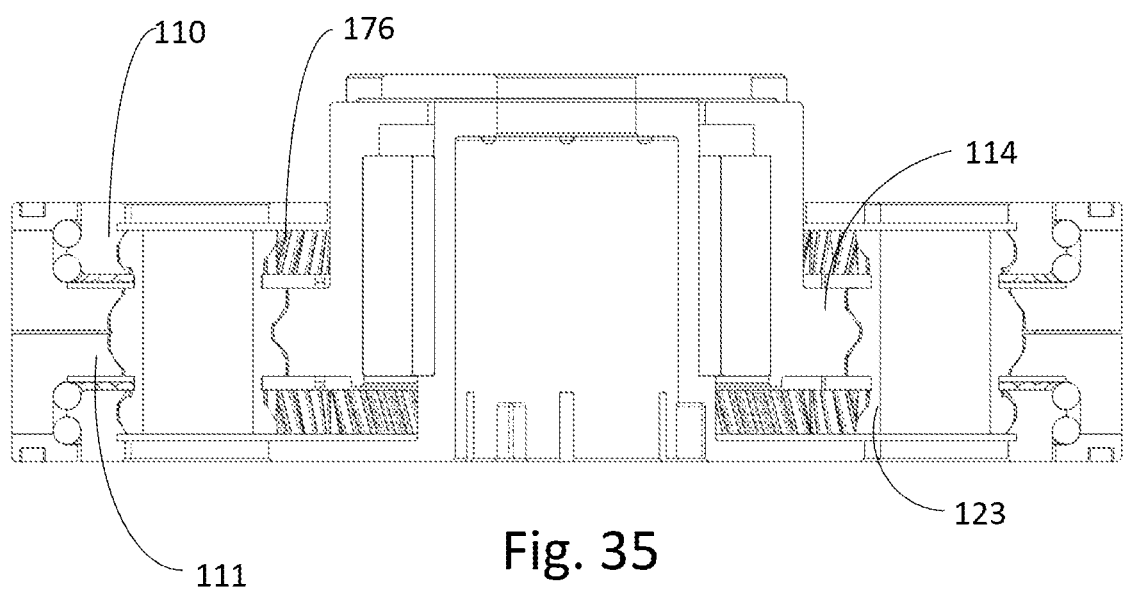
FIG. 35 is a side cutaway view of the gearbox of FIG. 27.
Figure 36:
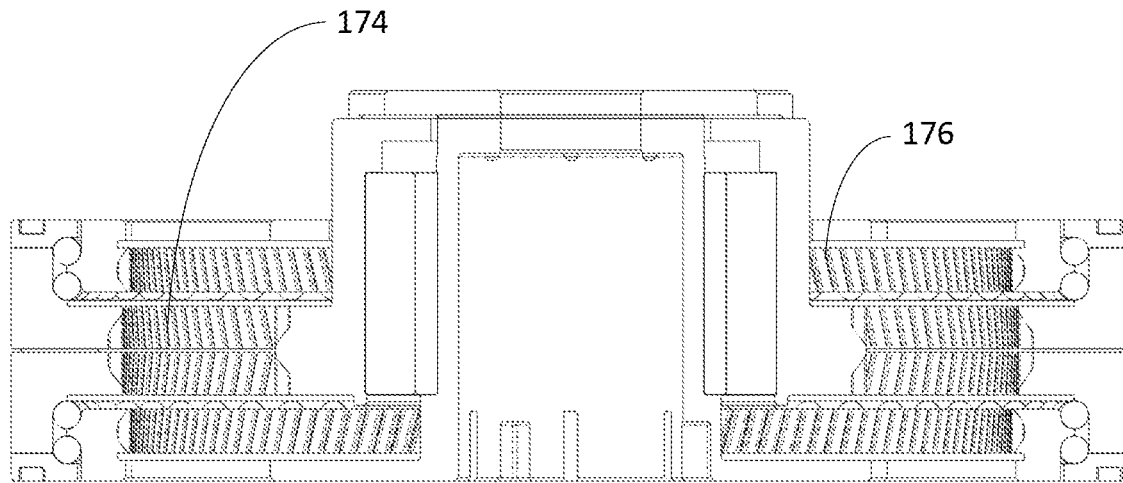
FIG. 36 is a side cutaway view of the gearbox if FIG. 27 with the planets removed.
Figure 37:
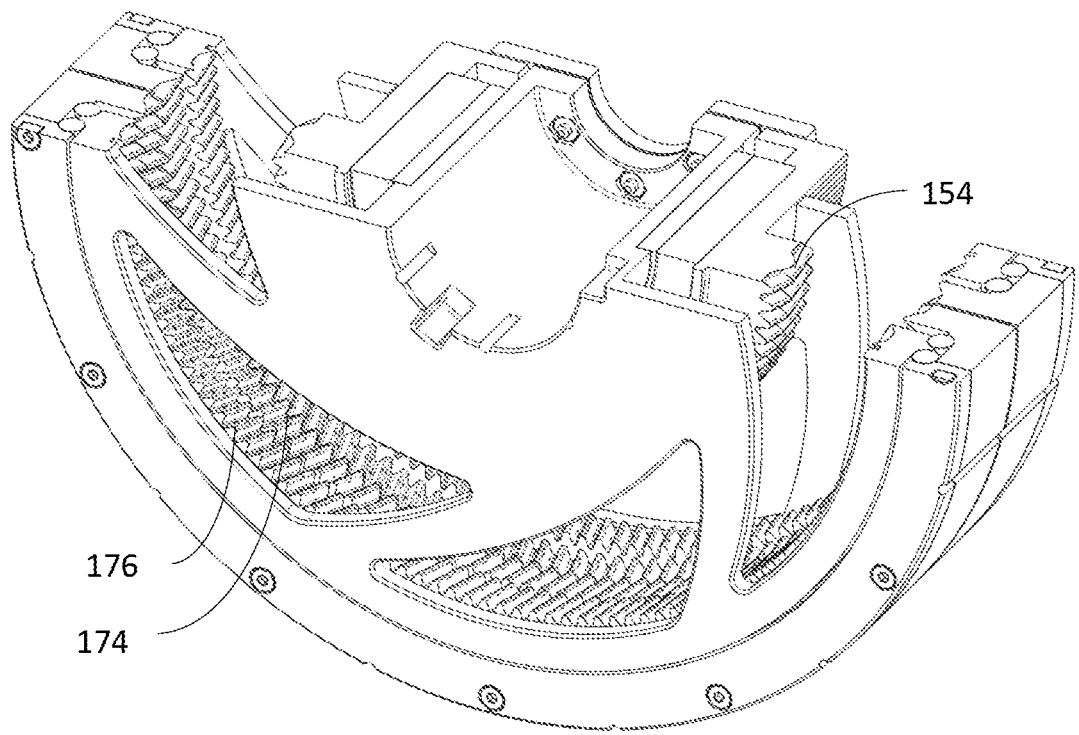
FIG. 37 is an isometric cutaway view of the gearbox of FIG. 27.

FIG. 34 shows a side cutaway view of a portion of the gearbox of FIG. 27 including a planet gear 123. FIG. 35 shows a side cutaway view of the whole gearbox of FIG. 27. FIG. 36 shows a side cutaway view with the planets removed. This allows the teeth 174 of the output gears to be seen. FIG. 37 shows an isometric cutaway view.

Figure 38:
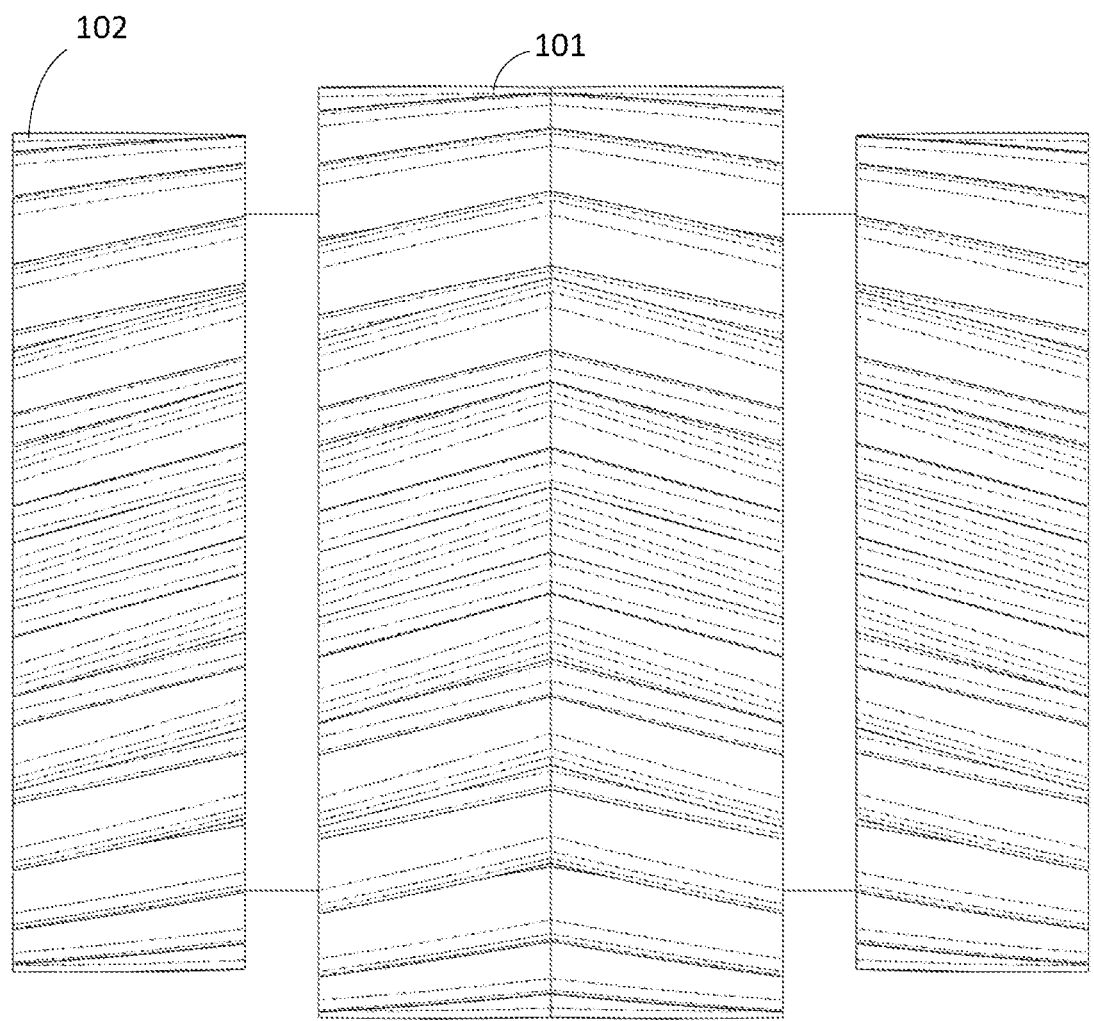
FIG. 38 is a side view of an exemplary planet for the gearbox of FIG. 27.
Figure 39:
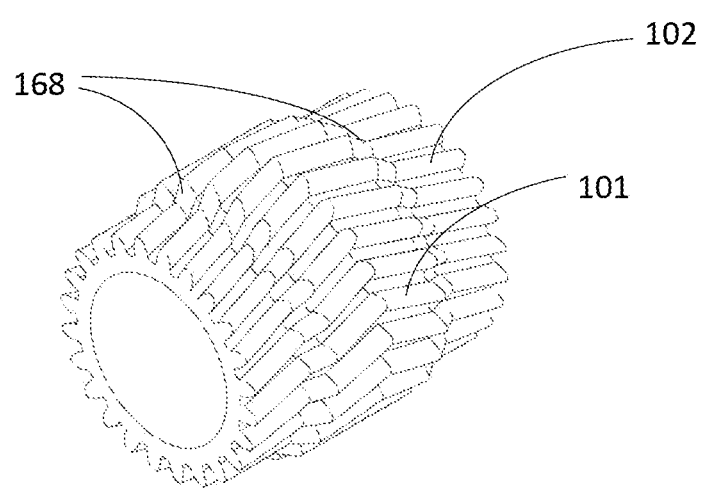
FIG. 39 is an isometric view of a planet for the gearbox of FIG. 27, formed as one piece of injection molded plastic.

In embodiments of the device, at least one outer planet gear on each planet gear assembly must be rotationally fixed to an inner planet gear so torque can be transmitted from a fixed ring gear to the inner ring gear output. The inner planet gear on each planet may be a single gear such as a spur gear or two symmetrical helical gears as shown in FIG. 38. Note that, in flexibility-based embodiments, it is not necessary for the inner planet gear teeth 101 and outer planet gear teeth 102 to have different helical angles. FIG. 39 shows a preferred configuration of a plastic planet gear for this exemplary device made of plastic where the outer planet gear teeth and inner planet gear teeth are made of one piece of injection molded plastic. A continuous tooth profile fill 168 connects the inner teeth 101 to the outer teeth 102. The helix angle on the inner and outer is similar or the same which allows the gears to be pulled out of a two part mold.

One half of the mold comprising the negative of the clockwise helix teeth and the other half of the mold comprising the negative of the counter clockwise helix teeth.

In a preferred embodiment, the number of teeth on the inner planet gears and outer planet gears is the same to allow the part to be removed from the mold, or to allow gear tooth cutters to shape the teeth without interference with either the inner or outer teeth.

Load sharing in this embodiment is accomplished with plastic gears (and possibly a plastic housing) as follows:

The use of steel gears in this exemplary embodiment can be used but are problematic because steel gears are very rigid and are subject to variations in manufacturing tolerances, especially in a low cost actuator. As a result, only 3-5 of the 12 planet gears would be expected to transmit a higher percentage of the torque if the gearbox is made of steel.

By using plastic for the one or two or all of the planet gears and/or the ring gears, and/or the sun gears (and possibly the housings) a more flexible assembly is created. As an example, carbon fiber PEEK may have a tensile modulus of 3200 ksi (22 gpa) while a high strength steel such as maraging steel would have a tensile modulus of 27600 ksi (190 gpa). Maraging steel is stronger than carbon fiber PEEK. In a conventional planetary gearbox with three large planets per stage, this would give a steel gearbox greater torque-to-weight compared to a carbon fiber PEEK gearbox of the same design. In the embodiments shown, plastic planet gears are used. However, it would also be possible to use plastic ring and/or sun gears in combination with metal planets. This would have performance and wear life benefits, and would still provide adequate load sharing, for example via the shape changes shown in FIGS. 49 and 50, if the consistency of the metal parts is high.

As the number of planets is increased, however, the load sharing of a steel gearbox, with its high tensile modulus (high stiffness) will result in a reduction in the load sharing consistency (as a result of slight variations in the manufacturing tolerances). By contrast, a carbon fiber PEEK gearbox may have approximately 6× lower stiffness from the components which allows the teeth to flex much more than the steel gears. This flexibility would, in a conventional three-pinion-per-stage planetary gearbox, result in 6X the flexibility for a given size, and as much as an estimated 5× the flexibility for the same torque-to-weight. This would be seen as a detrimental combination of effects and would steer a designer away from using plastic gears in a gearbox where high torque is required from a given size or given weight.

Proposed here is a way to provide torque-to-weight and torque to size from a plastic gearbox that is higher than would be expected, by combining plastic gears of a certain range of stiffness-to-strength with a gearbox design having a high number of planets such as disclosed here.

The stiffness of steel or other metal, is ordinarily seen as a benefit in terms of creating a gearbox with high stiffness but in a device like embodiments shown here with many pinions, the stiffness of the steel gears can actually be a detriment because it can reduce the consistency of load sharing.

The higher flexibility of plastic is believed to be beneficial to the torque to weight of embodiments of the present device because at a certain number of pinions, the high stiffness of the steel gears becomes detrimental to load sharing while the flexibility of the plastic gears allows load sharing to be more consistent above this number of pinions. The result is believed to be a range of high pinion number gearbox geometry that provides better performance in certain regards such as torque to weight when the geometry of embodiments of the device are combined with the use of plastic gears rather than steel gears, or even a combination of steel and plastic such as but not limited to steel pinons and plastic ring gears and sun gears.

Above some number of pinions and below a certain strength to stiffness ratio (more flexible is better for load sharing), the increased load sharing which results from the flexibility of the plastic (or mechanical torsion flex member between the inner and outer pinion gears (which also applies to metal gears) it will be possible to achieve higher torque with a weaker material. The looser the manufacturing tolerances in the construction of the gears, the more variability in the gears and the more benefit will be obtained from torsional flexibility of the pinions.

The result is the potential for a very low cost gearbox by virtue of making all or part of it injection moldable combined with much better performance in terms of torque to weight than would be expected from a plastic gearbox and possibly even similar or better torque to weight than a steel gearbox of the same design made with reasonable manufacturing tolerances.

Figure 40:
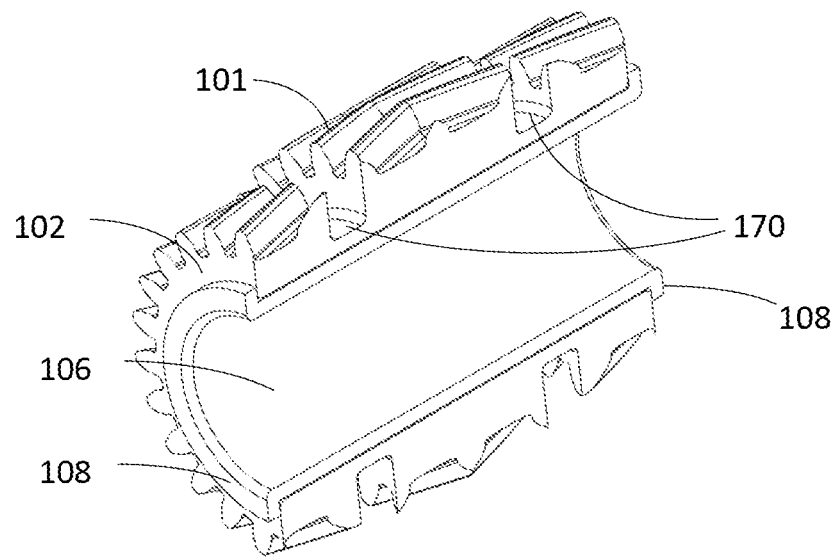
FIG. 40-42 are isometric views of additional embodiments of planets suitable for the gearbox of FIG. 27.
Figure 41:
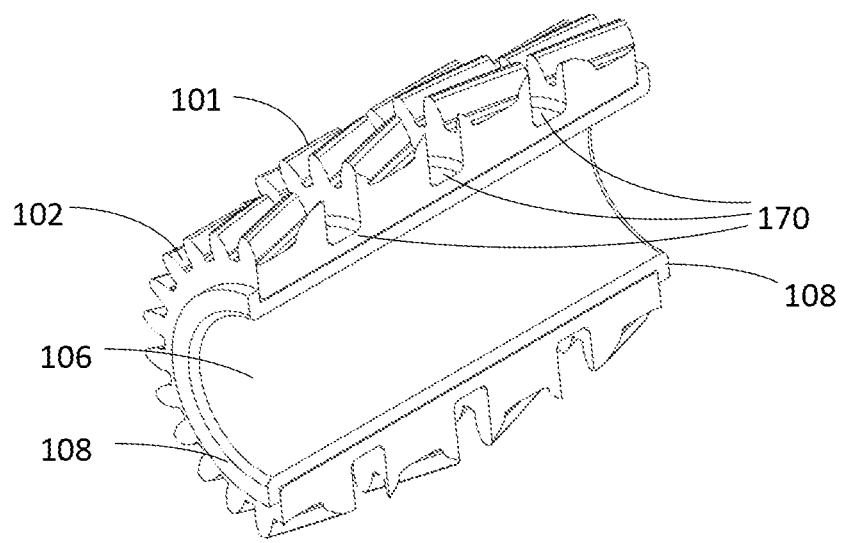
Figure 42:
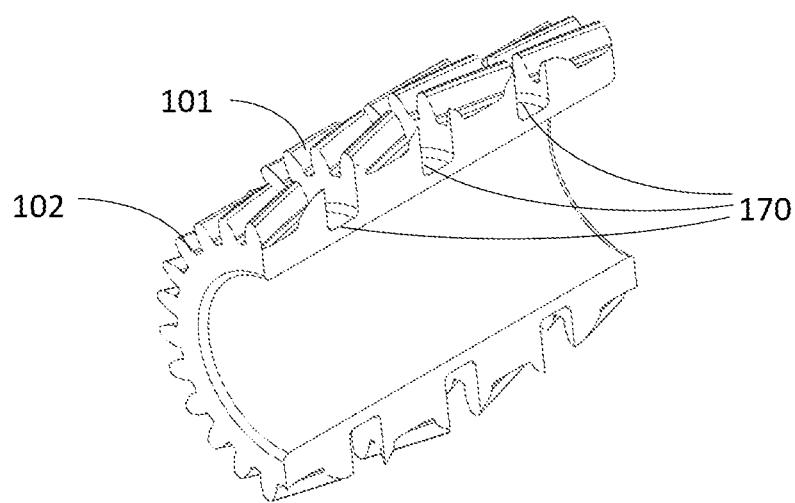
Figure 43:
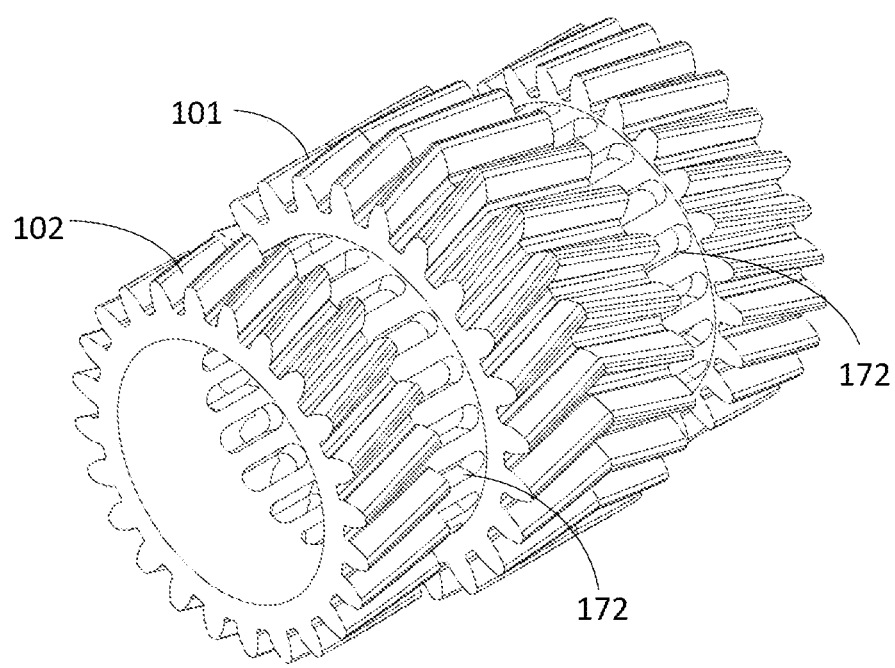
FIG. 43 is an isometric view of a planet with axial slots and no tube.
Figure 44:
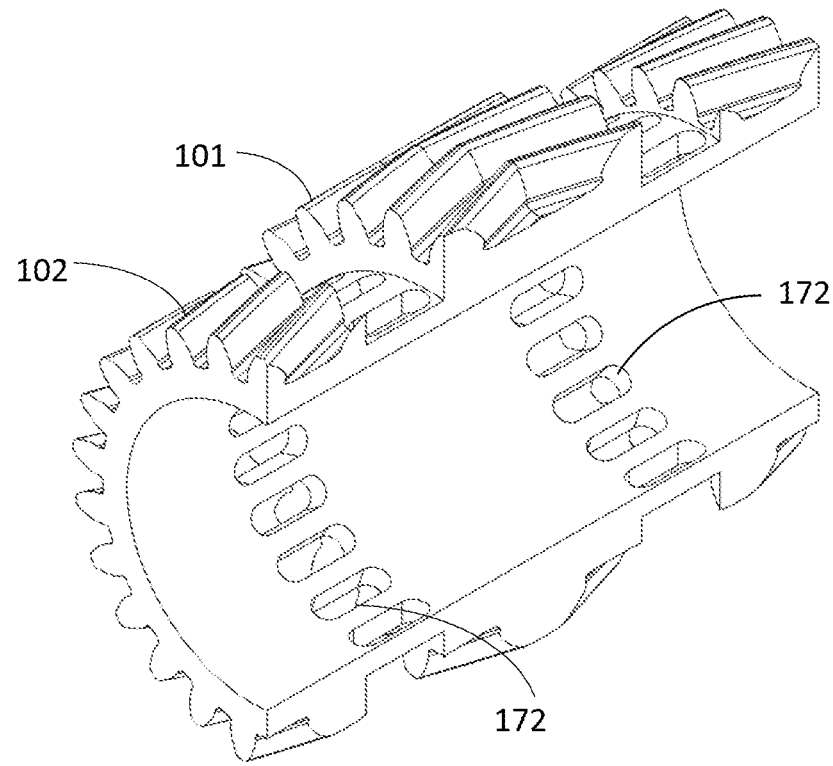
FIG. 44 is a cutaway isometric view of the planet of FIG. 43.
Figure 45:
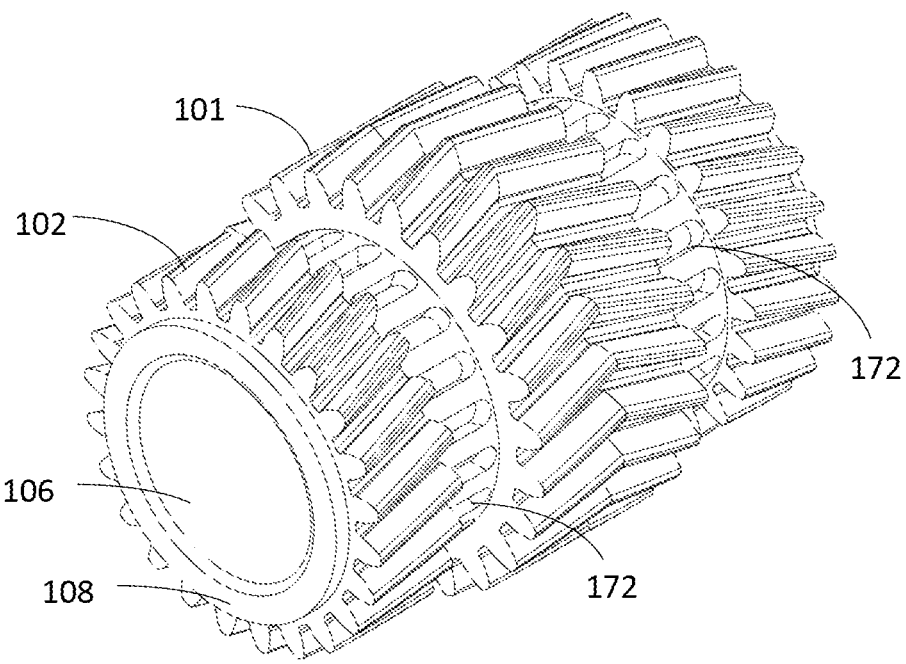
FIG. 45 is an isometric view of a planet with axial slots and a central tube.
Figure 46:
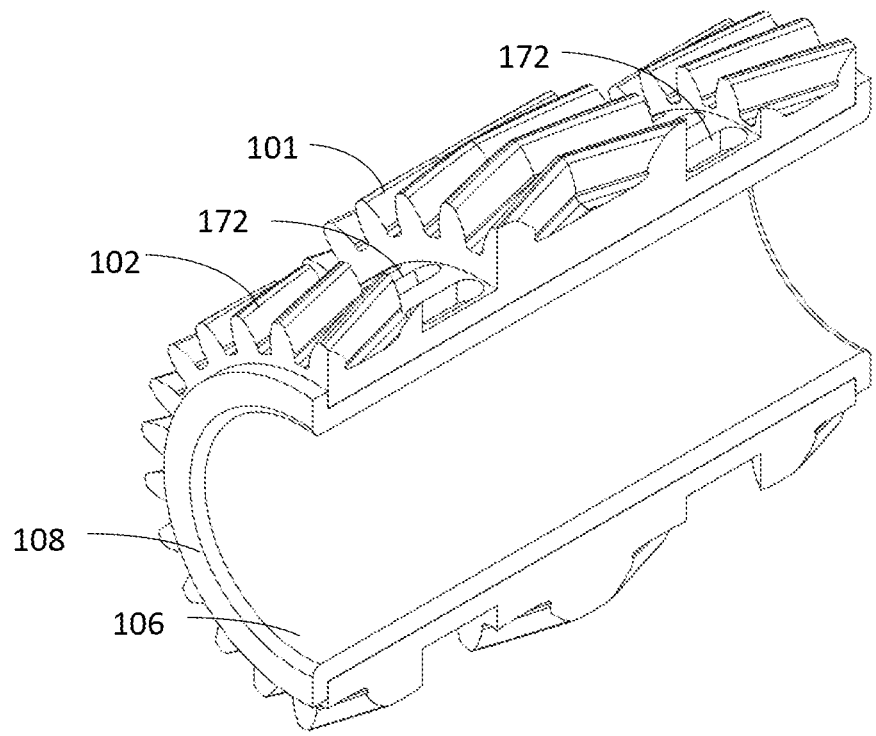
FIG. 46 is a cutaway isometric view of the planet of FIG. 45.

As shown in FIG. 40, another embodiment of a pinion, suitable for use in a gearbox of the embodiment of FIG. 27, has outer and inner gears which are all one piece and made of plastic (although other materials can be used with various effects). An optional cylindrical section 170 is located between the inner and outer gears 101 and 102 (and possibly between the two inner gears as shown in FIG. 41). A steel or aluminum or other material (such as possibly a thick walled plastic or thin-walled metal) bar or tube 106 provides bending stiffness so lengthwise bending of the pinion is reduced during torque transmission. The plastic gear is created with an ID that is slightly larger than the OD of the tube or bar such that the plastic gear is able to rotate freely on the tube 106. The plastic gear may be bounded axially on the tube 106 by stops 108, for example lips as shown here. The tube can also be omitted as shown in FIG. 42. The optional cylindrical sections between the inner and outer gears is thin enough that the opposing torque direction on the inner and outer gears of a pinion will result in a small amount of torsional twist of the cylindrical sections. This torsional stiffness can be decreased by increasing the length of the cylindrical sections or by decreasing the thickness of these cylindrical sections and/or by creating slots 172 in the cylindrical sections. The slots may be for example axial or helical. FIGS. 43 and 44 show a version with axial slots 172, with no inner tube, and FIGS. 45 and 46 show a version with axial slots 172 and an inner tube 106. Decreasing the torsional stiffness of the cylindrical sections is considered to be beneficial in this design because the twisting of cylinder sections allows the inner and outer gears on the pinion to rotate slightly relative to each other. As a result, manufacturing intolerance can be compensated for by this relative rotation so a high number of pinions can be used while still achieving a high consistency of load sharing.

It should be noted that plastic gears are used as an example here, but metal gears will benefit from the same construction even if to a lesser degree. FIGS. 42-44 show pinions with no inner cylinder. This may in some configurations provide enough bending stiffness and torsional flexibility to provide adequate load sharing between all pinions.

Backlash is detrimental to the performance and precision of gearbox reducers in many applications such as robotics.

Disclosed here are mechanisms and constructions for equalizing the load sharing between four or more pinions in a differential planetary geartrain. Also disclosed here are mechanisms and constructions for reducing or eliminating backlash in a differential geartrain.

One object of the present device is to simplify and reduce the cost of the assembly through the elimination of the need for a planet carrier to position the gears axially in the assembly. This is accomplished in embodiments of the device, through the use of opposite helical gears on either end of the planet gears. Straight gears may also be used, as disclosed below in relation to FIGS. 54-56. These gears are also designed with a taper which has the benefit of making them easier to pull out of a mold. The helical gears are beneficial for smooth operation while the taper allows easy removal from an injection mold for low cost production.

The symmetric construction of the design together with the opposing helical gears on either side of the center plane and/or the tapering of the planets on either side of the center plane eliminates the need for a planet carrier to keep the planets axially positioned. The symmetrical configuration of embodiments of the device eliminates the need for a planet carrier because twisting of the planets perpendicular to their axis is virtually eliminated. This allows the planets to be hollow which reduces weight and allows them to compress radially under radial preloading to remove backlash while preventing binding during heat expansion as shown in FIG. 51.

Figure 47:
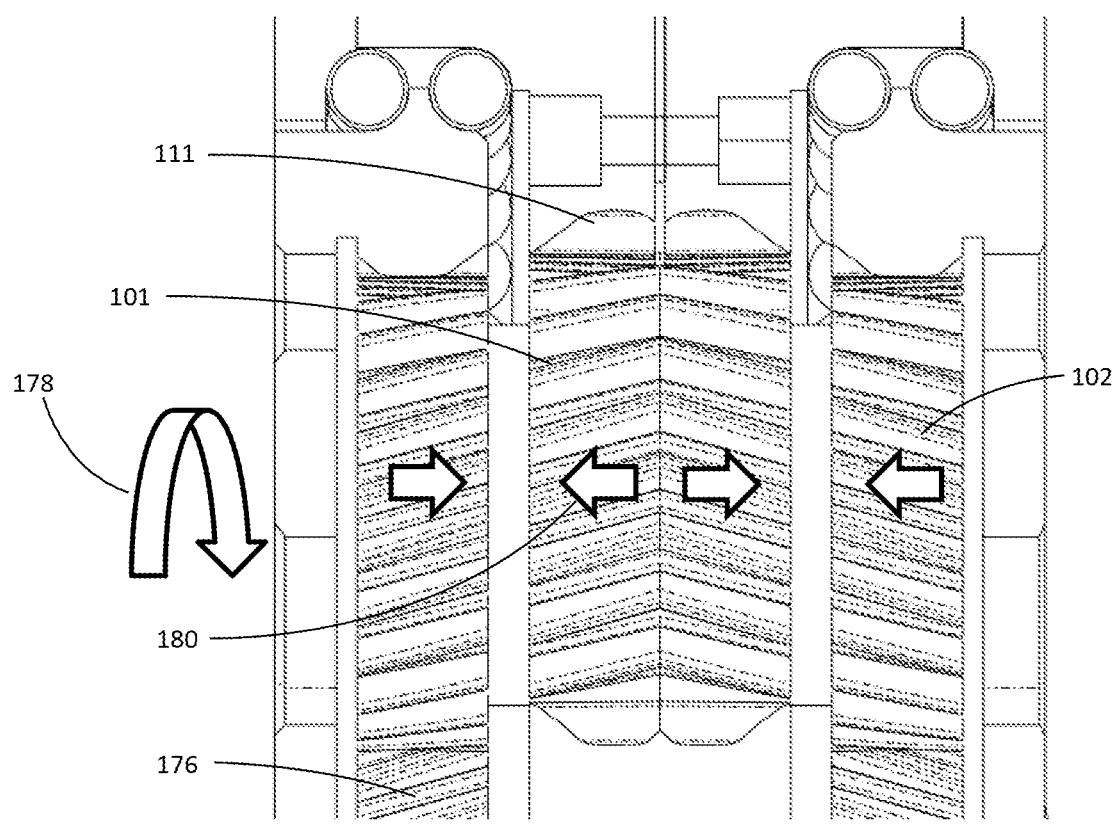
FIG. 47 is a cutaway view of the gearbox of FIG. 27 showing axial forces on a planet.
Figure 48:
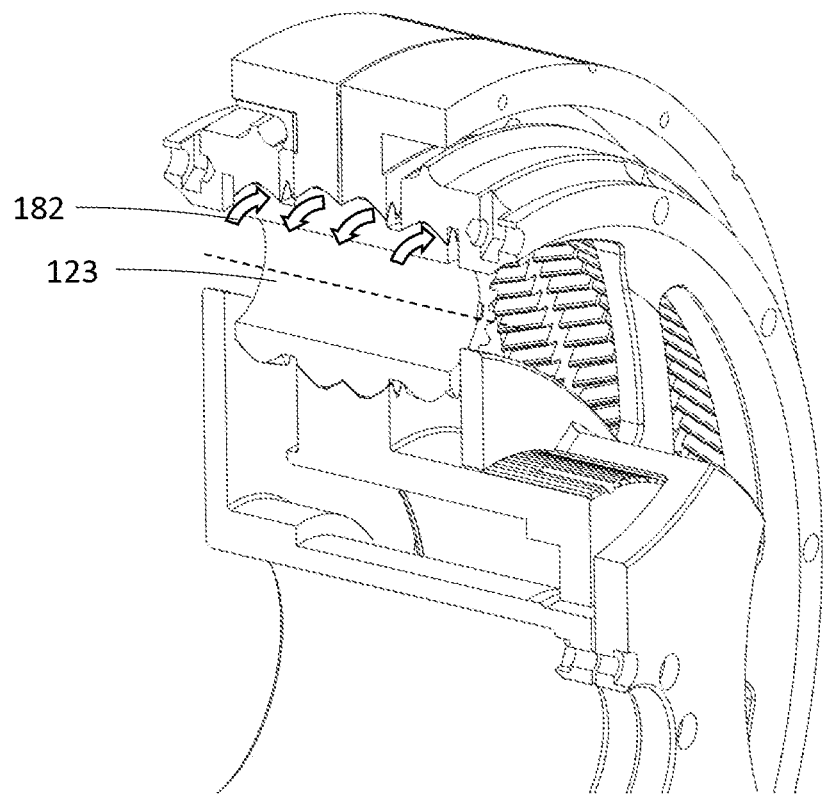
FIG. 48 is an isometric cutaway view of a planet in the gearbox of FIG. 27 showing load paths on the planet.

FIG. 47 shows axial forces on a planet gear of FIG. 38 in a gearbox of FIG. 27, when the teeth of the planet gear are rotating in the direction shown by curved arrow 178. The directions of axial forces are shown by arrows 180. FIG. 48 is an isometric cutaway view showing the load paths on the planet 123 leading to the axial forces shown in FIG. 47. The circumferential forces of the load paths are shown by arrows 182. All but one planet and the retaining rings and bearings are omitted in FIG. 48.

Figure 49:
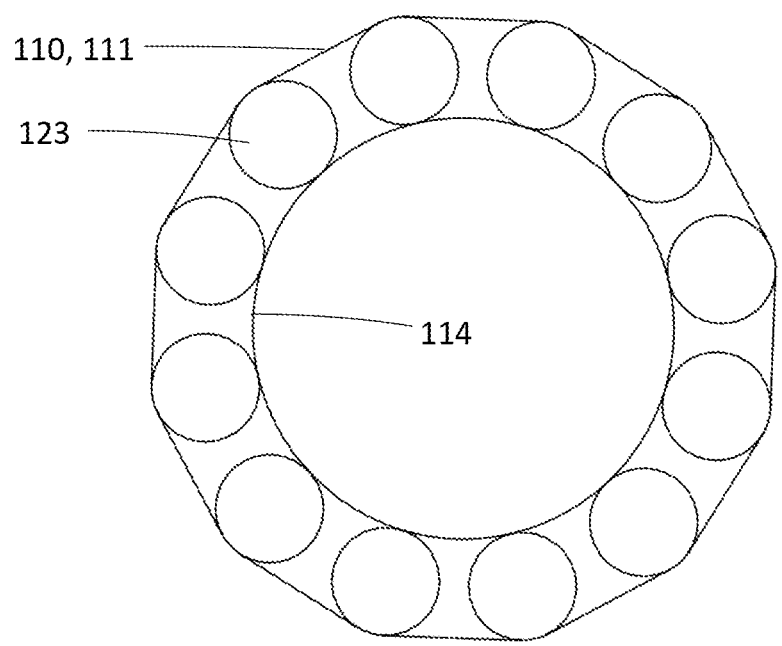
FIG. 49 is a schematic illustration of a gearbox showing outer gear deformation.
Figure 50:
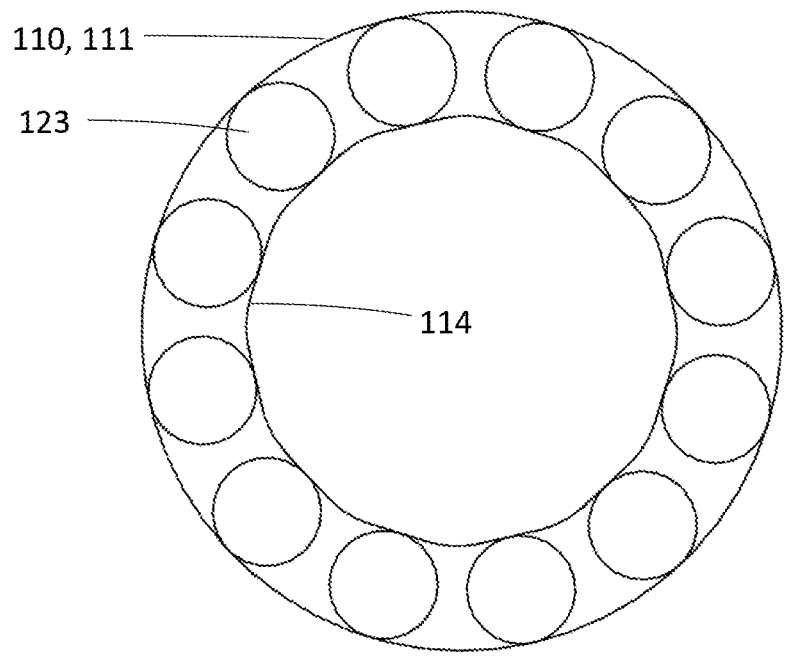
FIG. 50 is a schematic illustration of a gearbox showing sun gear deformation.
Figure 51:
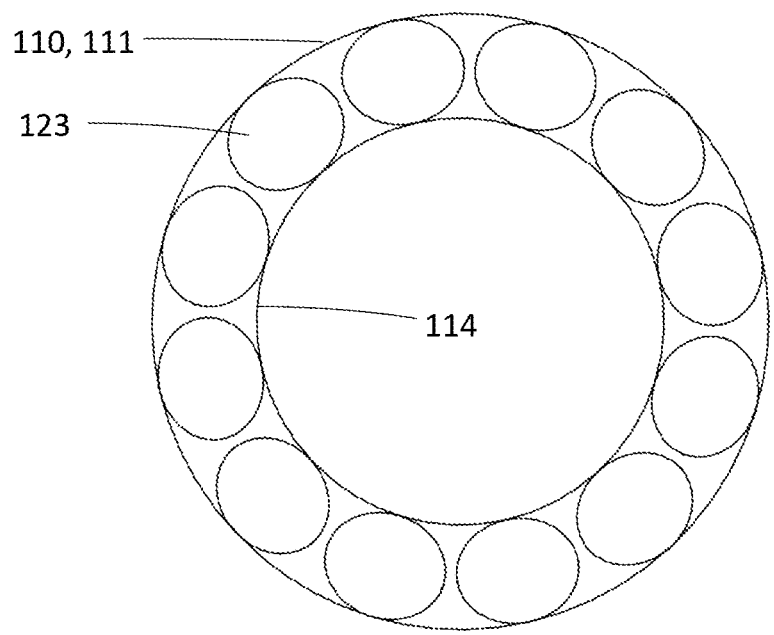
FIG. 51 is a schematic illustration of a gearbox showing planet gear deformation.

Load sharing can be provided for example by outer gear deformation, as shown schematically in FIG. 49, by sun ring deformation, as shown schematically in FIG. 50, or by planet gear deformation, as shown schematically in FIG. 51.

While the embodiment shown above has a sun input and outer output and reference ring gears, an outer input ring and sun output and reference gears is another possible arrangement.

Some properties of selected materials are shown in the below table.

TABLE 2

| Material | Yield Strength (ksi) | Tensile Modulus (ksi) | Density (g/cm3) | Strength/ Stiffness | Strength/ Stiffness/ Density |
|---|---|---|---|---|---|
| Delrin | 11 | 450 | 1.42 | 0.0244 | 0.0172 |
| Nylon | 10.5 | 365 | 1.14 | 0.0288 | 0.0252 |
| Glass-PEEK | 28.3 | 1490 | 1.38 | 0.0190 | 0.0138 |
| PEEK | 16 | 540 | 1.3 | 0.0296 | 0.0228 |
| Carbon Filled PEEK | 40.6 | 3200 | 1.4 | 0.0127 | 0.0091 |
| Glass Filled PEEK | 29 | 1700 | 1.52 | 0.0171 | 0.0112 |
| 6061 | 40 | 10000 | 2.7 | 0.0040 | 0.0015 |
| 4140 Steel | 70.3 | 29700 | 7.85 | 0.0024 | 0.0003 |
| Maraging Steel | 245 | 27600 | 8 | 0.0089 | 0.0011 |

Figure 52:
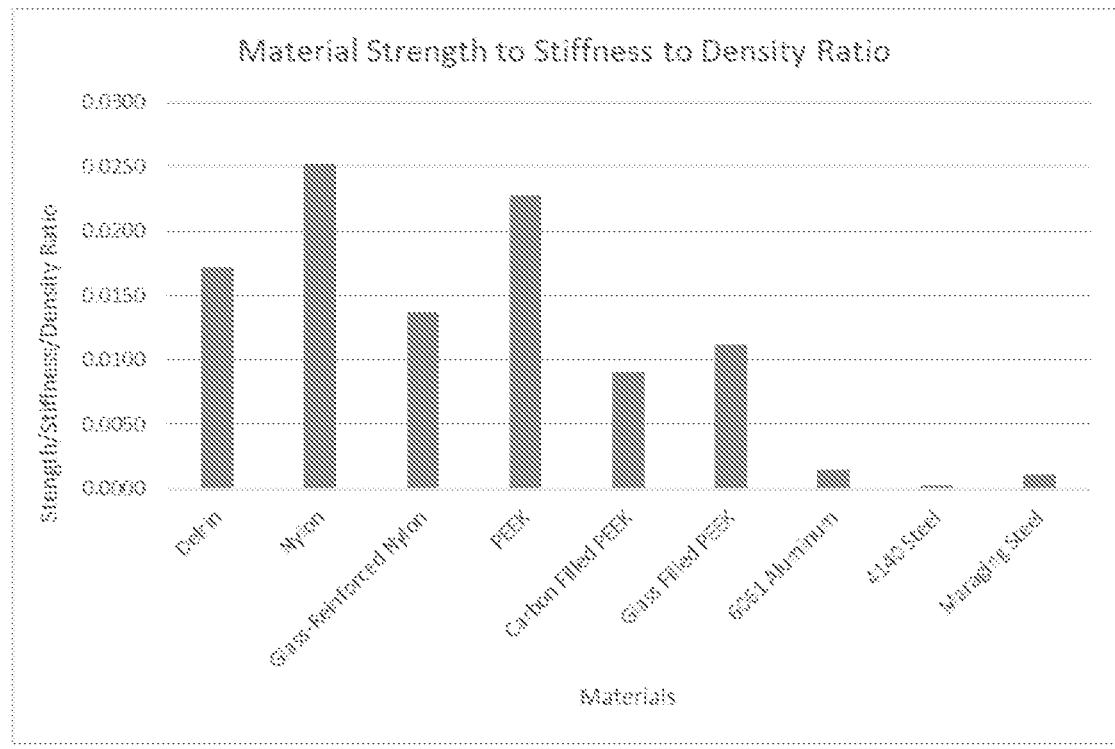
FIG. 52 is a bar chart showing material strength to stiffness to density ratio for selected materials.
Figure 53:
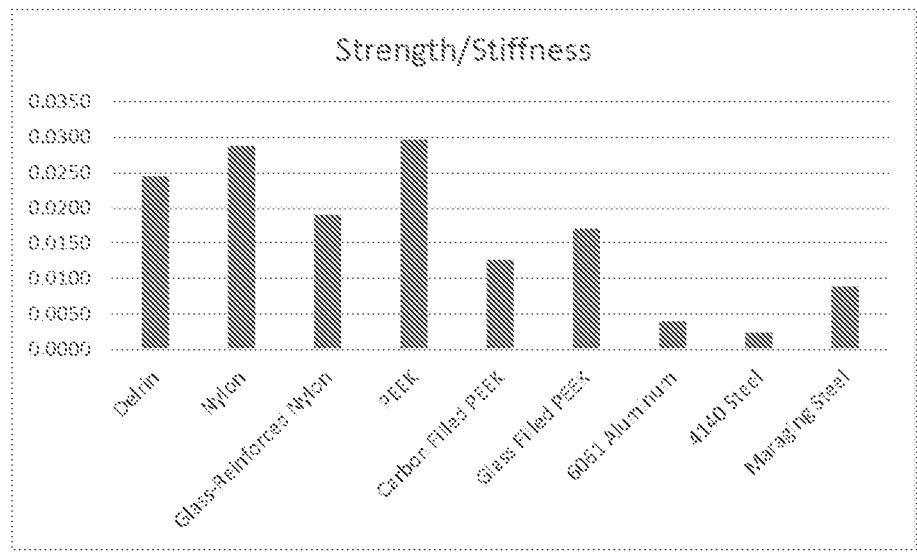
FIG. 53 is a bar chart showing material strength to stiffness ratio for selected materials.

FIGS. 52 and 53 are bar charts showing some material properties from table 2 in visual form.

FIG. 52 shows material strength to stiffness to density ratio. FIG. 52 shows clear difference between plastics and metals when comparing this ratio. For this application it is better to have higher strength with lower stiffness, and lower density. FIG. 53 shows a material strength to stiffness ratio.

In an embodiment, pinions may preferably have a ratio of yield strength to stiffness of greater than 0.010.

In an embodiment, pinions may have a ratio of torsion twist stiffness to bending stiffness of less than 1.

Figure 54:
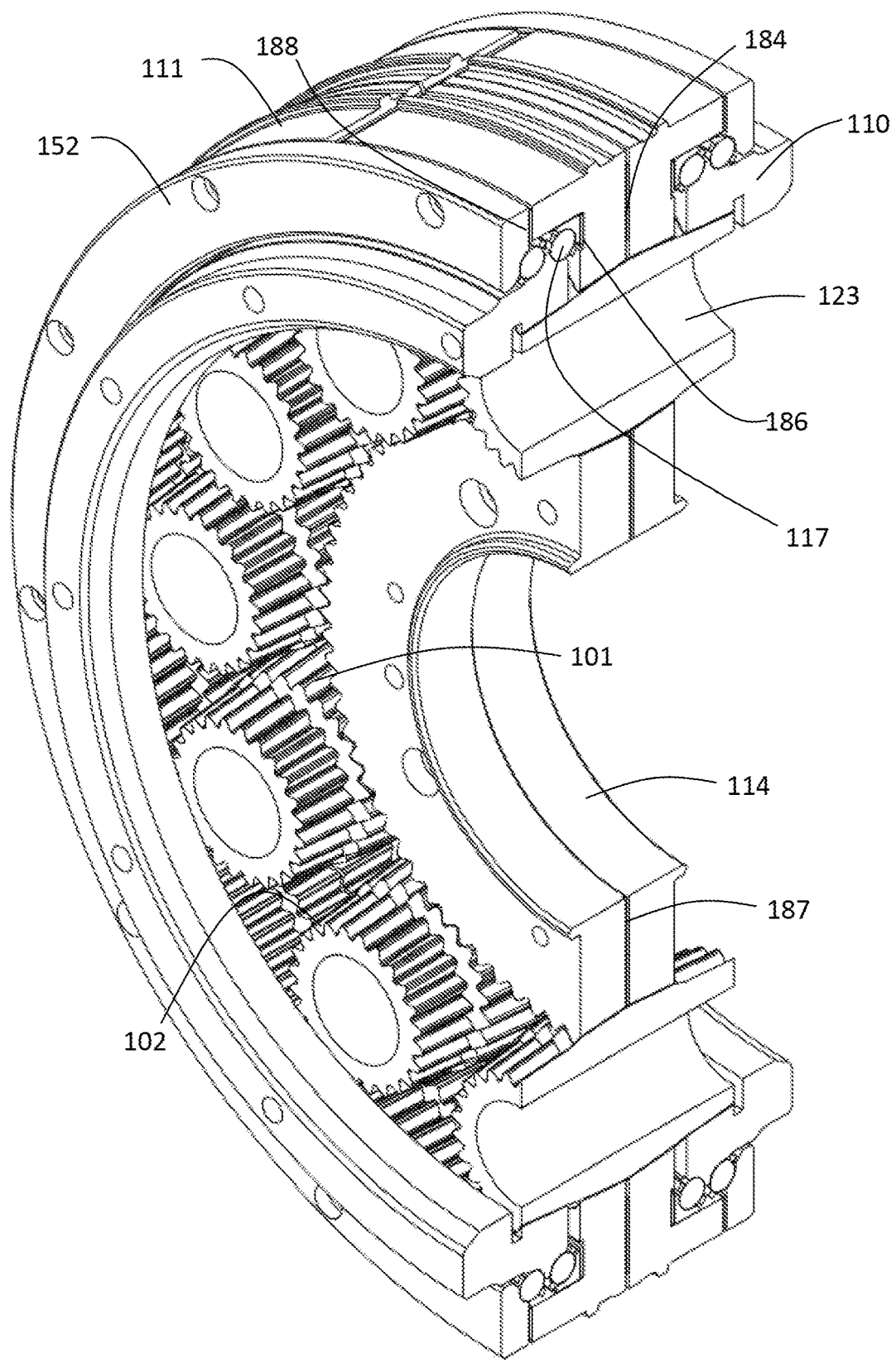
FIG. 54 is a cutaway isometric view of another exemplary gearbox.
Figure 55:
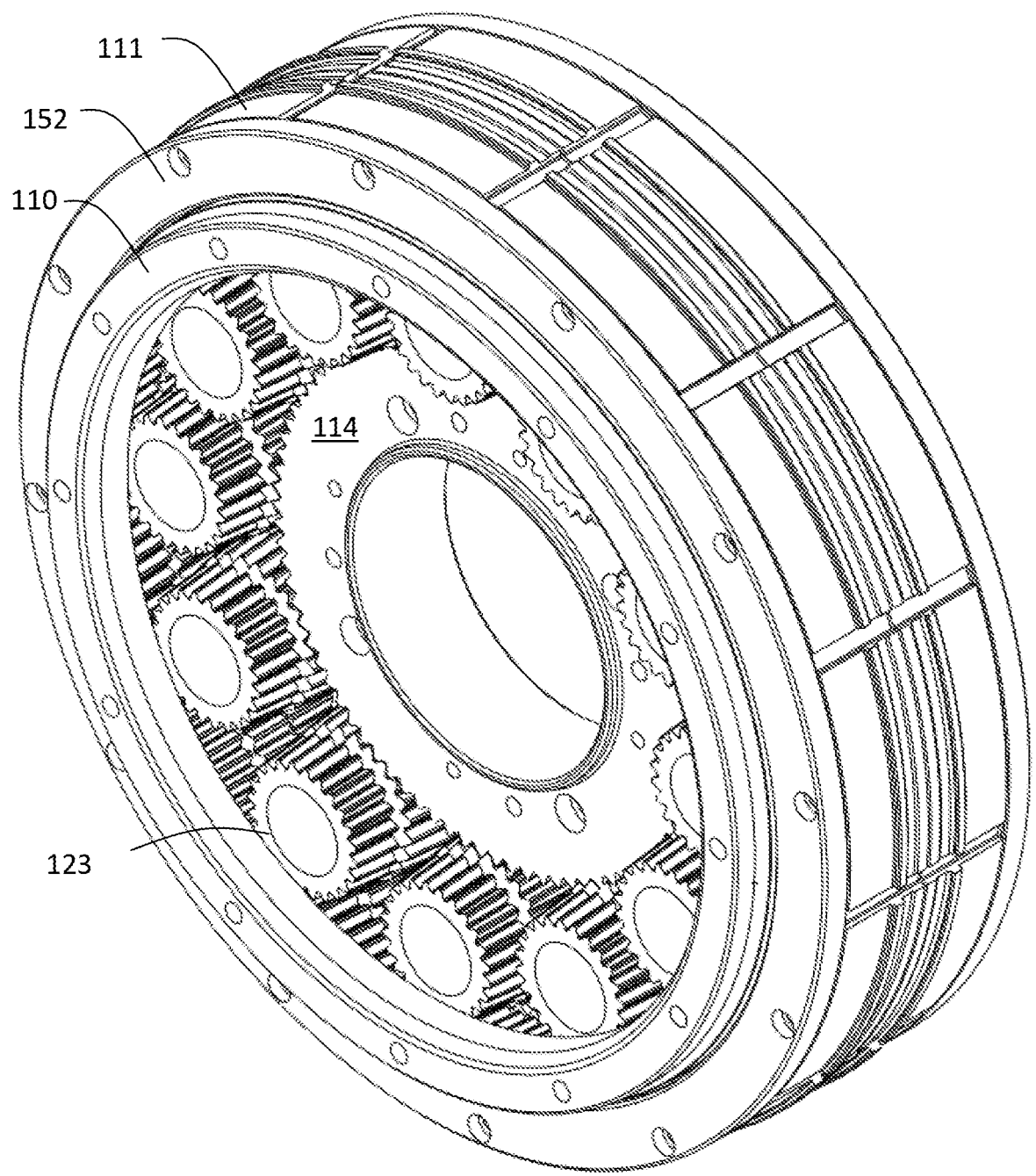
FIG. 55 is an isometric view of the gearbox of FIG. 54.
Figure 56:
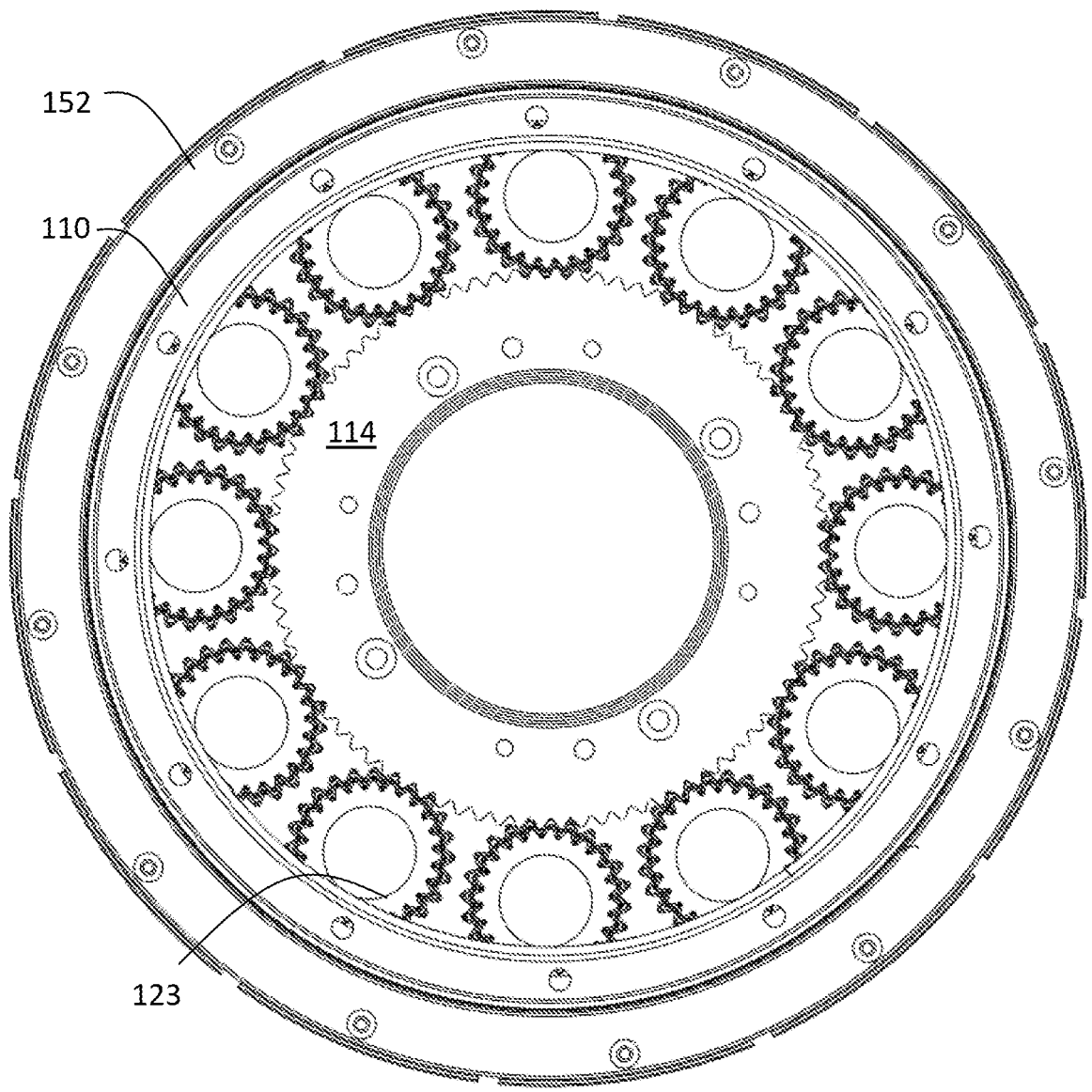
FIG. 56 is an axial end view of the gearbox of FIG. 54.

FIGS. 54-56 show another example of a differential gearbox. Unlike the embodiment in FIG. 27, this one has straight cut gears.

The gearbox comprises one or more sun gears 114 in geared contact with plural planet gears 123, the plural planet gears each in contact with different ring gears 110 and 111. The planets may have a different diameter in contact with different ring gears. Thus, if the sun gear(s) 114 is the input, a gear reduction may be obtained by the planets differentially moving the ring gears. One or more ring gears may be fixed and one or more may be an output. There may also be one or more additional floating sun gears contacting parts of the planets that are not contacted by the sun gear(s) which are providing input torque.

As with other examples shown in this document, in different embodiments all these input, output, fixed and optional floating gears may be arranged differently. For example, there may be output and fixed sun gears and input ring gear(s) and optional floating ring gear(s). The input and output gears could be switched in any embodiment to change from a reducer to an increaser.

The gears may be arranged in an axially symmetric arrangement with axial centering provided as described below, avoiding the need for a planetary carrier.

The gears in the particular embodiment shown in FIGS. 54-59 use straight cut (spur) gears for both the inner planetary gear teeth 101 and the outer planetary gear teeth 102, and all the other gear teeth that mesh with these gear teeth. Helical gears as disclosed in other embodiments in the incorporated material may also be used.

Figure 59:
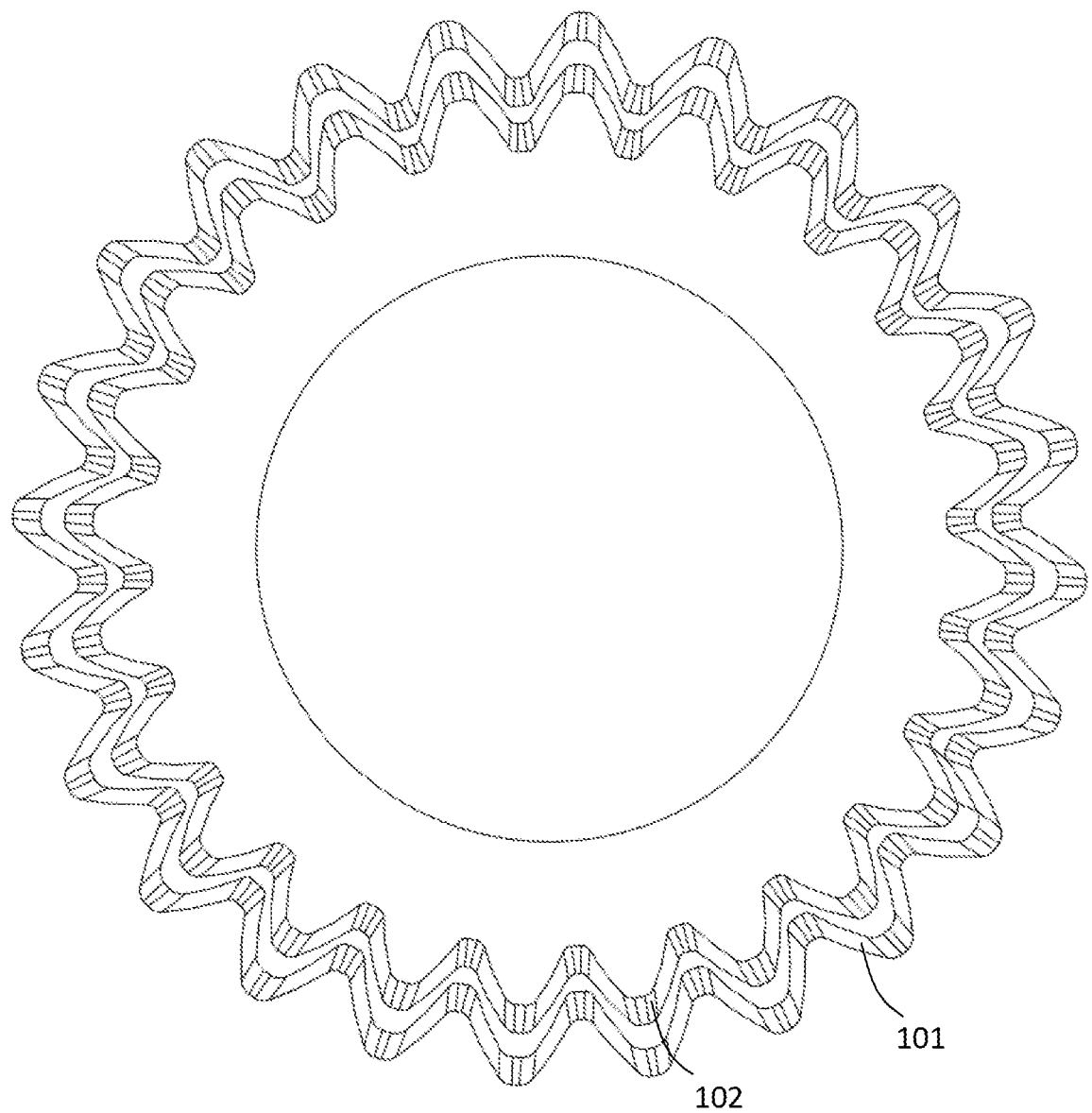
FIG. 59 is an axial end view of the planet of FIG. 57.
Figure 82:
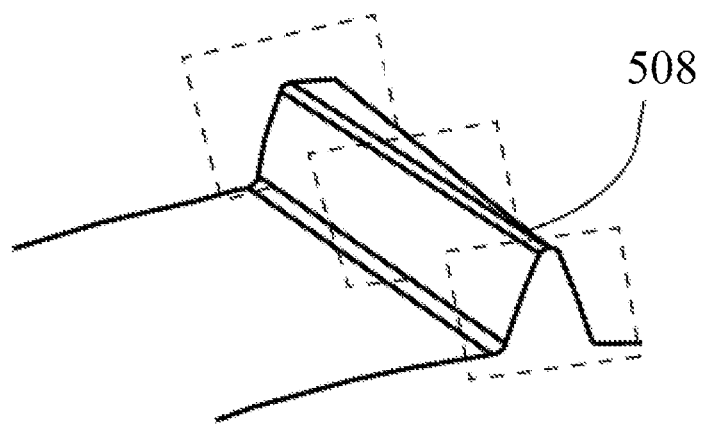
FIG. 82 shows a view of a gear tooth with a profile shift.

FIG. 59 shows a conical taper plus a profile shift, and a gear tooth 508 with a profile shift is more specifically shown in FIG. 82. The taper uses both a conical taper of the gear as well as a taper of the gear tooth involute profile by means of a profile shift that is varied across the width of a tooth. This allows the gear tooth contact to behave in a similar way to a conical taper, but retain the involute profile's ability to have proper gear tooth contact and conjugate motion. The profile shift acts to offset the involute profile in a positive direction on one axial direction of the tooth and in a negative direction on the axial direction. The meshing gear has the same shift except in opposite directions. Profile shift is often used in gears but will be constant across a tooth (partly due to manufacturing concerns) This can help make up for small errors in tooth contact or can help to optimize a gear set. The magnitude of this is typically quite small, but can be of similar magnitude as we are using. The profile shift across the tooth width is nominally linear, but could possibly be non-linear across the tooth width, providing the positive shift on one tooth matches the negative shift on the matching tooth. This profile shift changes across the depth of the tooth can be described as a tapering of the tooth itself along the axial direction which is independent of the conical taper of the gears. The profile shift may be applied to any of the gears. A suitable profile shift is shown for example in PCT/IB2018/055087, the content of which is hereby incorporated by reference.

One or both taper effects may be combined with shims between any one or more of symmetrical output ring halves, output rings and axed rings or symmetrical sun gear halves to allow preload adjustment of the bearings and of the gears to reduce or eliminate backlash.

The double helical or herringbone gears of the embodiment of FIG. 27 provide a stabilizing force to center the planets axially, without causing a net axial load due to the symmetric design, and would also provide such a benefit in the embodiment of FIG. 54. In the embodiment shown in this document, the planet gears and corresponding gears on the sun gear and ring gears are tapered. The taper also provides this stabilizing force to center the planets, so helical gears are not required for axial centering.

As described above, helical gears with different angles (or helical gears paired with spur gears), in combination with springs allowing changes in an axial separation of the gears of each planet, may be used to provide load sharing. This is particularly useful for allowing load sharing between relatively inflexible gears. In this particular embodiment shown, spur gears are used only, and the planets are a single piece. Thus, the above load sharing mechanism is not operative in this embodiment. The gears being spur gears and the planets being formed of a single piece is not necessary to the operation of the gear reducer, but these features simplify construction.

Load sharing may be provided in this embodiment by flexibility of the planet gears. The planet gears may be hollow and flex radially (for example changing in cross sectional shape from circular to slightly elliptical) to achieve a reduction or elimination of backlash. This may be facilitated by the use of a relatively flexible material to make the gears, and by the thinness of the walls of the hollow gears. The absence of a planet carrier aids in flexibility. Otherwise shafts and bearings associated with a planet carrier device would impede radial flexing.

In a typical rigid gear system, some space between meshing gears for thermal expansion is required to prevent binding, but this space allows backlash. The flexibility of the planets in this embodiment means that additional space to allow backlash is not necessary. The planets may be preloaded radially using shims between the elements holding the ring gears, which combined with the radial taper are adjusted during assembly to reduce or eliminate backlash. The radial flexibility of the hollow gears allows thermal expansion to flex the gears, making them oval shaped, for example as shown in FIG. 51, without causing binding.

The shims may be for example flat and may include a shim along the axial central plane of the gearbox, and others on either side of the bearing parts as shown in the figures below. The shims position the ring gears axially, which allows the tapered ring gears to engage with the tapered planets, taking up backlash.

Shims may be applied to adjust relative axial position of any of the elements relative to the axial center plane or each other. To maintain symmetry, it would generally not be desirable to change the axial position of elements that straddle the center plane. Such elements could however also be used as a reference to shim other elements, for example in an embodiment (not shown) with floating sun gears on either axial side of the input sun gear, and connected to it with bearings, shims analogous to shims B and C described below could be used to adjust the axial positions of the floating sun gears relative to the input sun gear and axial center plane.

The embodiment shown in FIGS. 54-56 has central output ring gears separated by a center shim 184, and fixed outer ring gears connected to the output ring gears by bearings with inner shim 186 and outer shim 188, described below. Center shim 184 adjusts the axial position of the output ring gears relative to each other and to the planets. Inner shims 186 and outer shim 188 adjust the positions of the fixed ring gears 110 relative to the output ring gears 111, and in combination with the center shim 184, relative to the planets. There is also shown in FIG. 54 a sun gear shim 187. Sun gear shim 187 adjusts the axial position of two sun gear halves (sun gears) relative to each other. This can be used to adjust the backlash as well. Sun gear shim 187 is not shown in the other figures for this embodiment. Corresponding elements are symmetrically arranged on the other side of the center plane, so only one side is described. Different shim adjustments may be used on different sides, but typically this would not be done except to correct another asymmetry.

In this particular embodiment, the sun gear 114 is one piece and straddles the axial central plane, and does not have a shim. Alternatively, the sun gear may be made of two pieces, similar to the output gear 111 of this embodiment, with a shim between the two pieces.

The embodiment shown may be formed by injection molding, for example out of plastic. Helical gears also provide a more consistent contact ratio and potentially less noise and transmission error, but may be more difficult to injection mold. The gears shrink axially as well as radially after molding, which makes it harder to get accurate final parts. A spur gear may therefore be easier to construct, and may make it easier to get precision parts, which may compensate for the advantages of helical gears.

Figure 57:
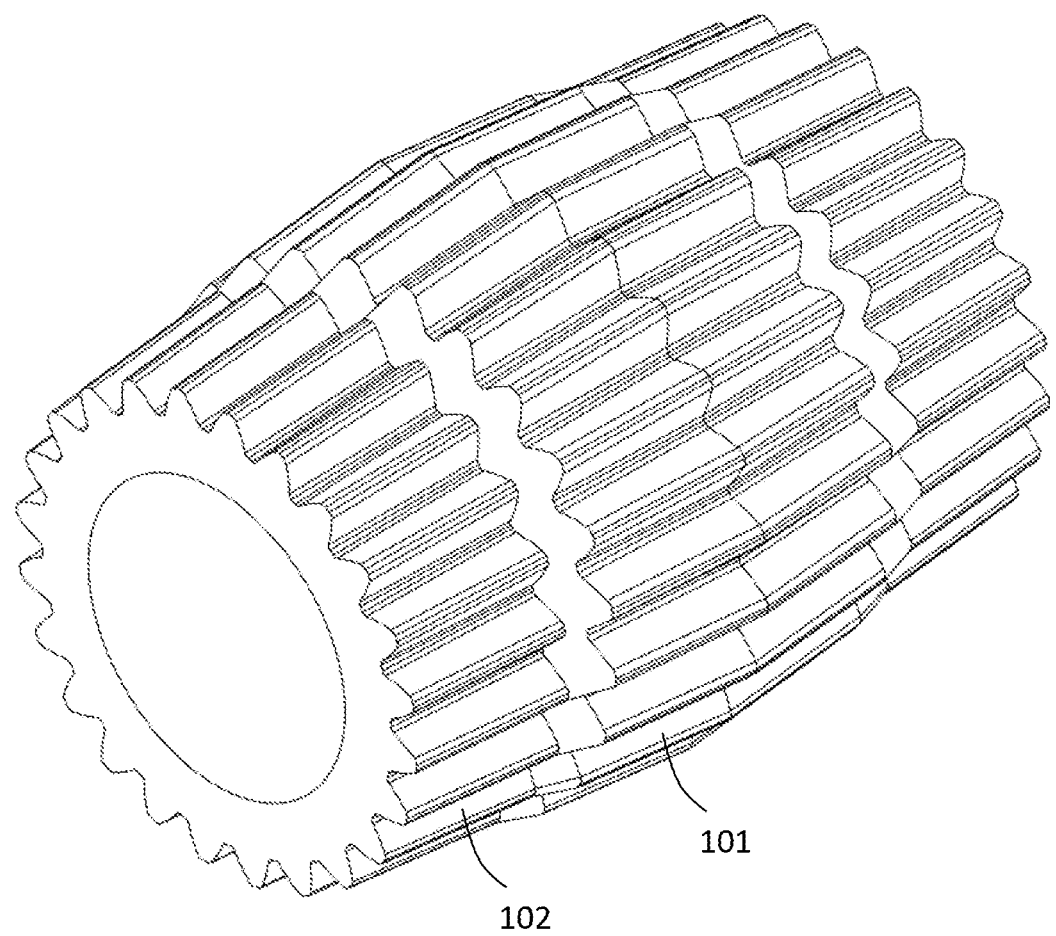
FIG. 57 is an isometric view of an exemplary planet for the gearbox of FIG. 54.
Figure 58:
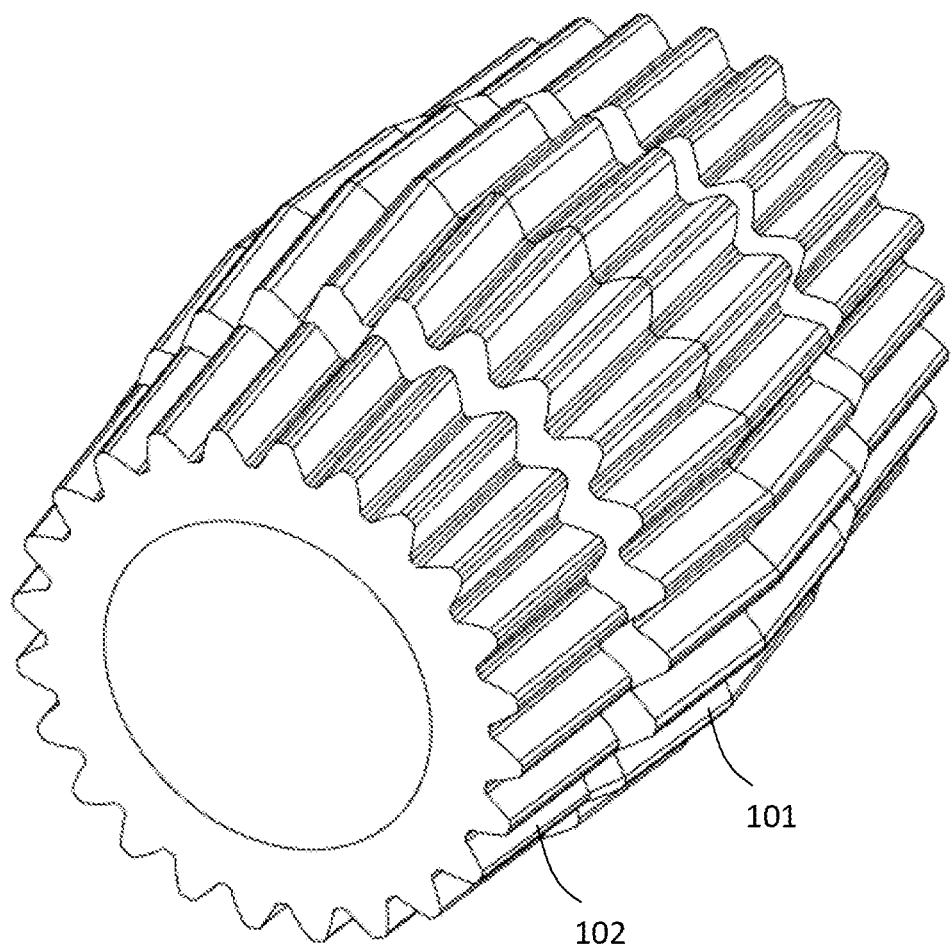
FIG. 58 is another isometric view of the planet of FIG. 57.

As shown in FIGS. 57-59, the planets each include portions with two different pitch diameters in order to differentially drive the fixed and output gears. To enable injection molding with no interference as the planets leave the mold, for example if the mold is formed of two halves separated at an axial central plane of the planets, in the embodiment shown the portions with the two different pitch diameters have the same number of teeth, and the teeth of the portions are aligned, as shown most clearly in the end view of a planet in FIG. 59.

The planets may also be formed by machining, or be machined after injection molding. The portions with the two different pitch diameters having the same number of teeth, and the teeth being aligned, also allows easier machining.

The fixed and output ring gears, on the other hand, would have different numbers of teeth in this embodiment to be driven differentially by the planet gears.

Metal gears, for example of steel, may also be used. To compensate for the greater stiffness, thinner walls may be used to allow radial flexibility.

As described below in relation to FIGS. 79-81, different planet gears may be arranged to be out of phase in terms of gear meshing. There may be sets of gears, the gears of each set being at the same phase, different sets being at different phase, or all gears may be at different phase. (Or they may all be at the same phase). For example, in an embodiment with 12 gears as shown here, there may be two sets of 6 gears each, for example every second gear being in a set, or all twelve gears may be at a different phase of meshing at any given moment. This distributes changes in forces due to the gear meshing or due to imperfections similarly aligned in different gears, so that they do not occur all at once.

In the embodiment shown in FIGS. 54-56, dual bearings are included between the fixed and output ring gears on each side of the axial center plane. The bearings are each angular contact bearings and may be preloaded using inner shim 186 and outer shim 188. The difference of width between inner shim 186 and outer shim 188 may be used to preload the bearings and adding or subtracting from the width of both of inner shim 186 and outer shim 188 equally may be used to determine the axial separation between the fixed and output ring gears. This arrangement has good stability. The sets of bearings on each side of the axial center plane may be preloaded separately. The set on the opposite side may be preloaded using the shims symmetric to inner shim 186 and outer shim 188 with respect to the axial center plane.

In an embodiment, the bearings may be made out of plastic. This allows reduced weight of the bearings compared to metal bearings.

FIG. 54 shows an isometric cutaway view, and FIG. 55 shows an isometric view, of this embodiment. FIG. 56 shows an axial end view.

FIGS. 57-59 show an exemplary planet for the differential planetary gearbox if FIGS. 54-56. FIGS. 57 and 58 show isometric views and FIG. 59 shows an axial end view.

Thus, there is provided a differential gearbox with a driving sun input on the ID of the pinions and one or more fixed ring gears on the OD of the pinions and one or more output ring gears on the OD of the pinions with a number of pinions greater than 5, 6, 7, 8, 9, 10, 11, 12, 13, 14, 15, 16, 17, 18, 19, 20 pinions with pinions and/or inner or outer ring gears: having a yield strength-to-stiffness ratio of greater than 0.10; made of plain or fiber reinforced polymer resin; with pinions having a torsionally flexible section between inner and outer gears to provide a torsion twist stiffness-to-bending stiffness of less than 1. There may be axial or helical slots in the cylindrical sections to increase torsional flexibility. There may be symmetrical opposing tapered pinions that allow backlash adjustment by axial shimming or other fixed positioning means for fixed and/or output ring gears. The gears may be straight or helical. There may be two sets of opposed bearing races integrated into housing and output ring gear.

Example Planet Driven Actuator

Figure 60:
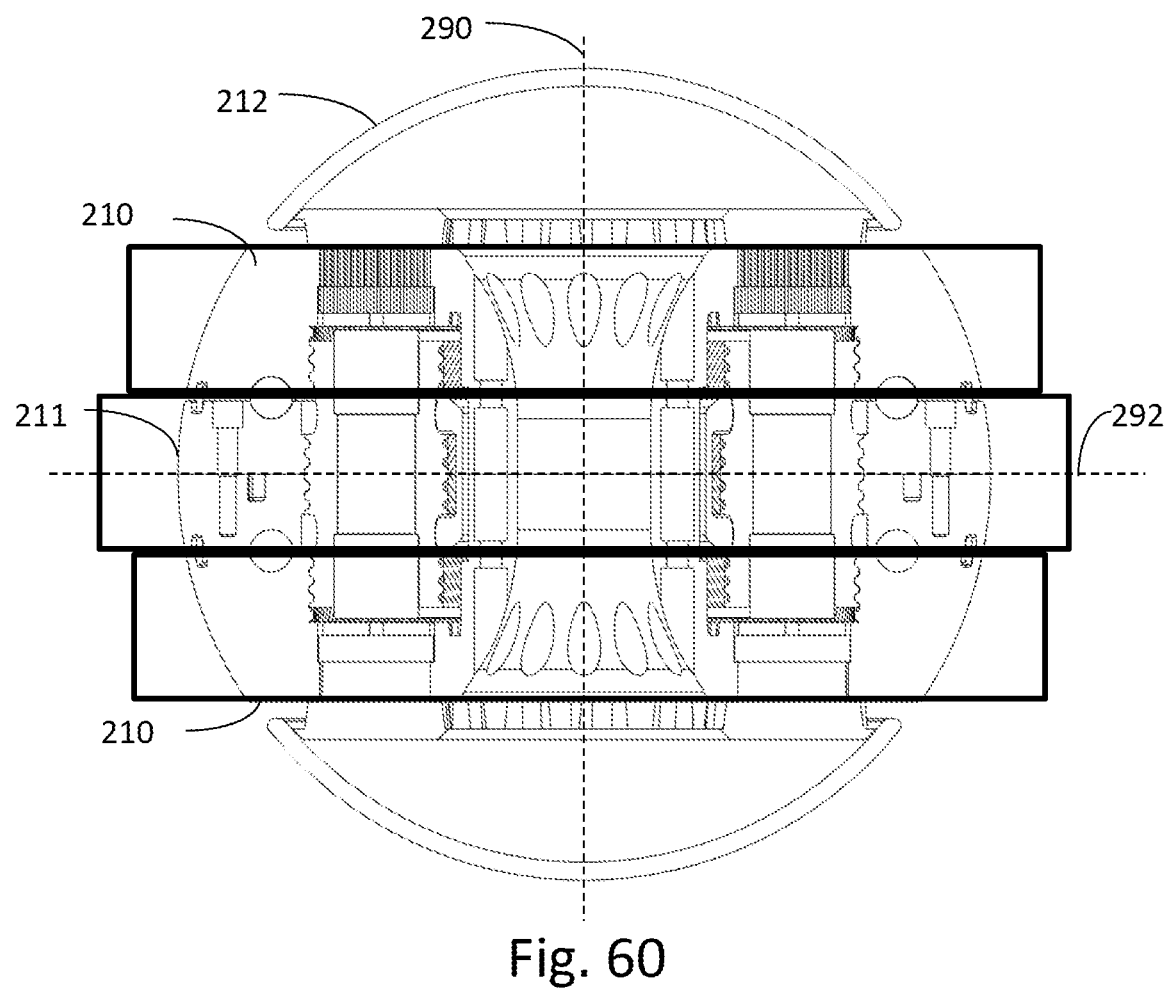
FIG. 60 is a side cutaway view of another exemplary embodiment of an actuator.
Figure 61:
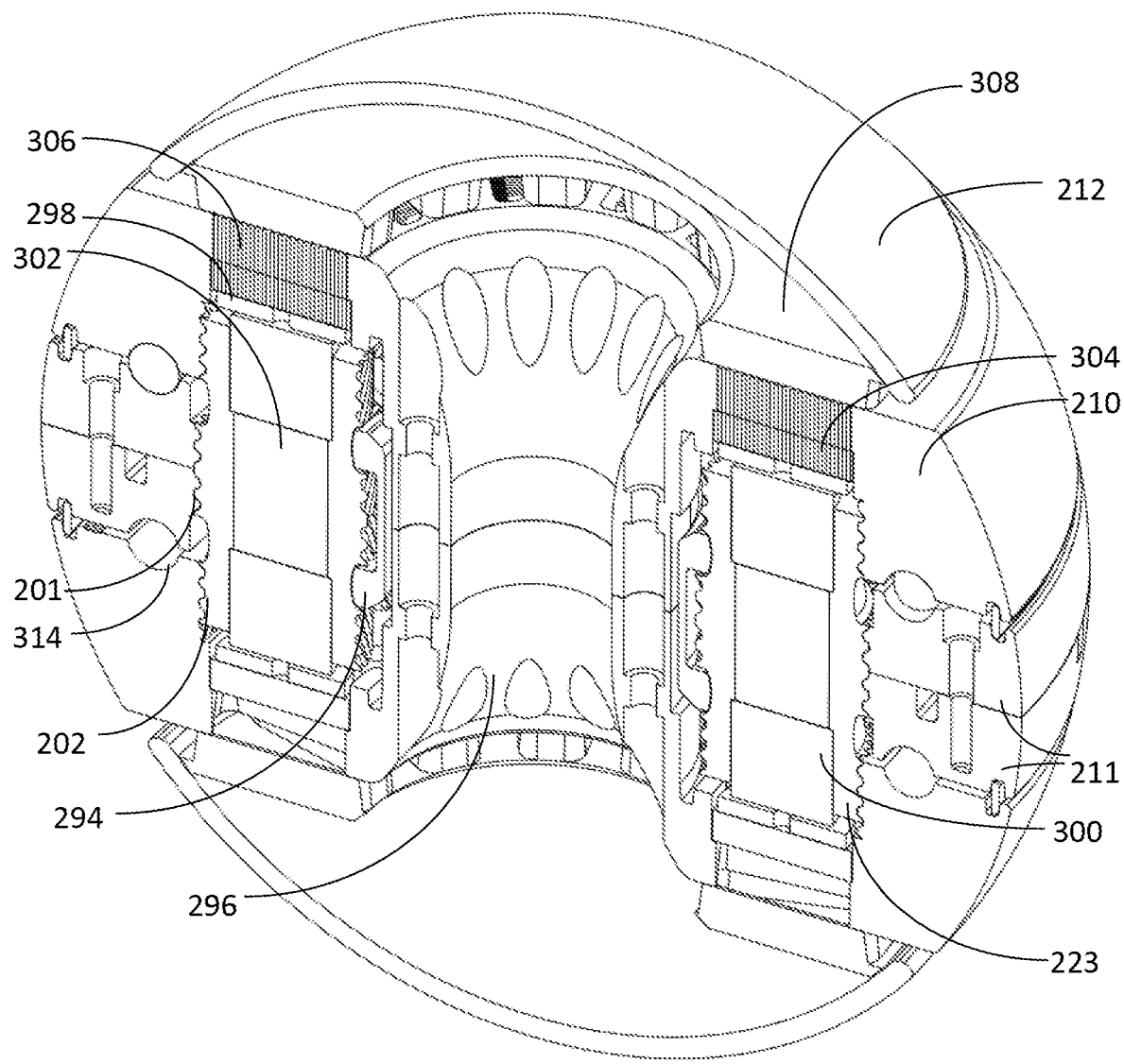
FIG. 61 is an isometric cutaway view of the actuator of FIG. 60.
Figure 62:
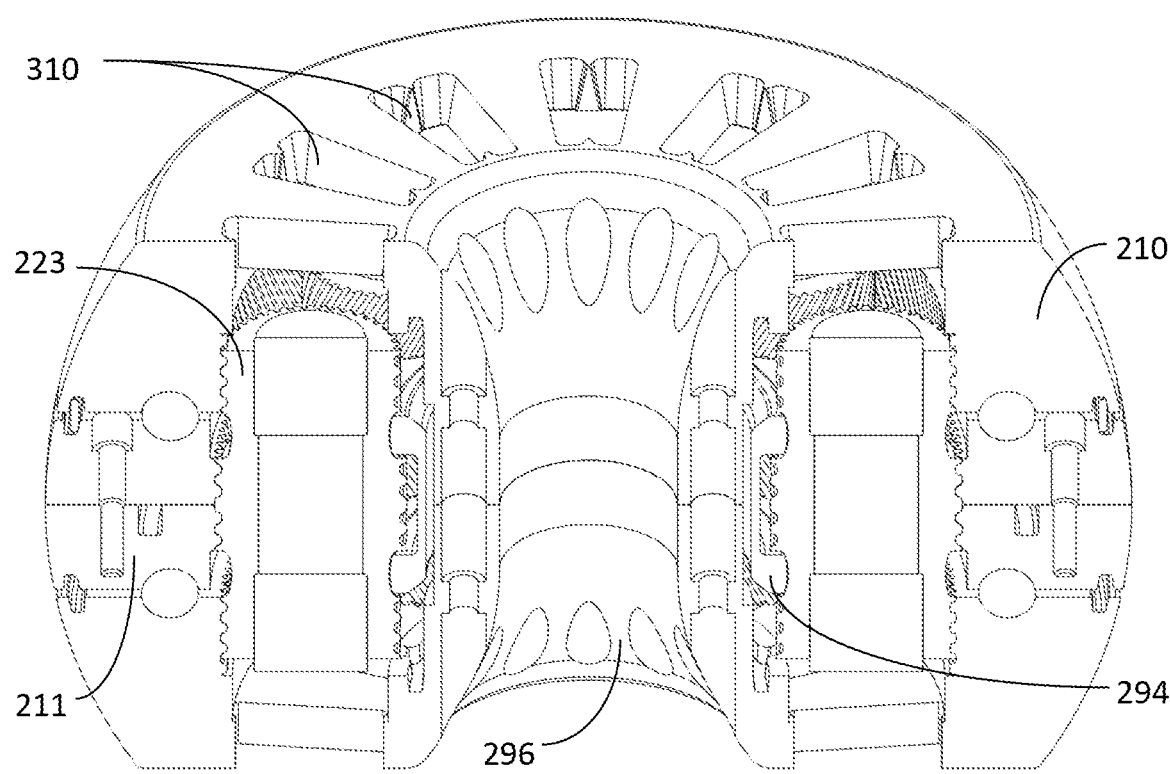
FIG. 62 is an isometric cutaway view of the actuator of FIG. 60 without motor input components.
Figure 63:
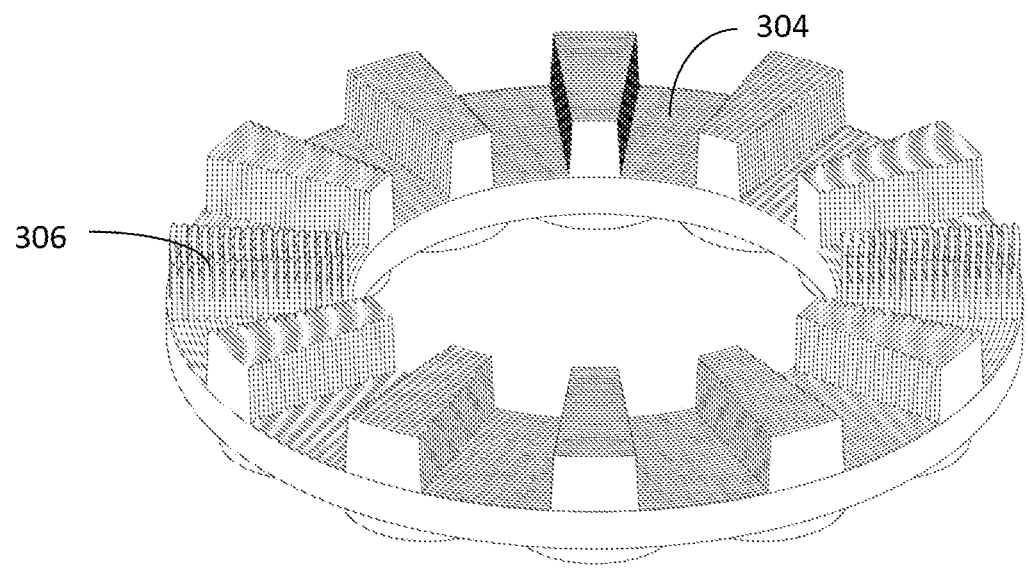
FIG. 63 is a top isometric view of upper motor components for the actuator of FIG. 60.

Embodiments of an exemplary actuator as shown in FIGS. 60-67 include an integrated symmetric differential gearbox coupled to a direct drive motor with two stators. Rectangular boxes in FIG. 60 show the portions of the gearbox corresponding axially to the output gear (in the axial center) and the fixed gears (above and below the output gear). Embodiments of the exemplary actuator further include the use of the pinions as permanent magnet carriers which serve the purpose of a rotor without the need for a separate rotating magnet carrier. Components may be enclosed in a sealed housing 212 and rotate about a common axis indicated by reference numeral 290, and may be symmetric about the axial center plane indicated by reference numeral 292. One or more electromagnetic stators provide the input torque to the gearbox and may be located outward from the axial center plane 292 of the device. Air coils (that is, electromagnetic coils with no soft magnetic core) may be used in the stators, and are commutated to act on permanent magnets which are inserted into the pinion gears. The pinion gears may be radially preloaded by a floating rolling contact sun ring 294 shown in FIG. 61. The pinion gear teeth have two symmetric tooth profiles which may be one or more of helical, tapered, or have an involute profile. The pinion teeth which are located at the axial center of the device, referred to as the inner pinion teeth 201, mesh with the output ring gear teeth 274 of output gear 211 at the axial center plane of the device. The pinion teeth located outward from the axial center of the device, referred to as the outer pinion teeth 202, mesh with the teeth 276 of two fixed input ring gears 210 which are located axially outward from the axial center of the device. The fixed ring gears 210 are secured together, such as through the axial center of the device. A different gear tooth ratio between the pinion and the fixed ring gear, and pinion and the output ring gear, is what causes the output ring to spin at a reduced speed relative to the orbiting speed of the pinions. The non-limiting exemplary embodied shown here has a 10:1 ratio and can be scaled accordingly to provide multiple ratios for different applications. FIG. 62 shows the device without the motor input components.

A non-limiting exemplary embodiment shown here comprises 8 planetary gears that have no sun gear input. A high number of planetary pinion gears 223 allows for a large torque capacity from the device. Load sharing is accomplished by applying magnetic force directly to the pinions 223 together with the rolling contact free spinning sun ring 294 which preloads the pinons against the fixed rings 210 and output rings 211 while allowing each pinion to find it is ideal circumferential position so all of the pinions are reasonably equally loaded when torque is applied through the electromagnetic stators. The pinons are kept in gear engagement with the outer rings 210 and 211 by using a rolling contact sun ring 294 closest to the radial center of the device. It is worth noting that the two fixed ring gears 210 are attached to each other in this embodiment as if they are one piece by means of a cylindrical member 296 that connects the fixed ring gears through the large center through hole of the actuator. The use of a traction interface between the rolling contact sun ring 294 and pinions 223 allows the pinions 223 to each find their own individual position with respect to the fixed and output gear rings. This may allow each of the pinons to more equally share the load that results from torque transfer of the device than if the inner ring was geared, for example.

The rotation of the planetary gears 223 is accomplished by the influence of an electromagnetic force produced by electromagnetic conductor coils 298 acting on permanent magnets 300 which are secured in the pinion gears 223 through both axial ends of the gears by an attracting magnetic force to a ferrous cylinder 302, such as but not limited to steel or iron, centered in the planets. In a non-limiting embodiment, motor stators use air coils 298 in combination with back iron 304 and a small enough air gap between magnets and back iron that a reasonably high torque can be achieved while at the same time eliminating passive cogging effects because there are no steel posts in the stator. Steel posts may be used as well for different torque effects. Alternatively, the electromagnets may have soft magnetic posts (not shown). If air coils are used, or if electromagnets with unusually small soft magnetic posts are used, the stator may use a soft magnetic material backiron to improve the efficiency of the electromagnetic coils with minimal or no cogging.

The laminated back iron 304 in the motor stators may be made up of alternating layers of laminates and protruding aluminum fins 306 which extend through openings in the fixed input ring gear 210/housing. Manufacturing is simplified because the back iron 304 is made of spirals of steel (represented by concentric rings in FIG. 63 which shows an upper view of components of the upper motor) and does not require any alignment of pole sections. Periodic layers (such as every second layer) of the concentric winding can be steel and serve as a flux path between air coils, but is preferably hard anodized aluminum or some other high heat conductivity material such but not limited to aluminum.

In this non-limiting configuration the aluminum provides a heat path directly from the coil to the heat extraction surfaces on the outside of the actuator. Heat is transferred from the copper conductors of the air coils 298 into the back iron 304 and dispersed at openings in the housing as air passes through the fins 306. An air fence component 308 with extrusions 312 formed in a serpentine pattern overlaps with openings 310 in the housing to guide air from an input past the fins 306 and out of the device, best shown in FIG. 65. Arrows 316 show air flow through cavities of the air fence 308.

Figure 64:
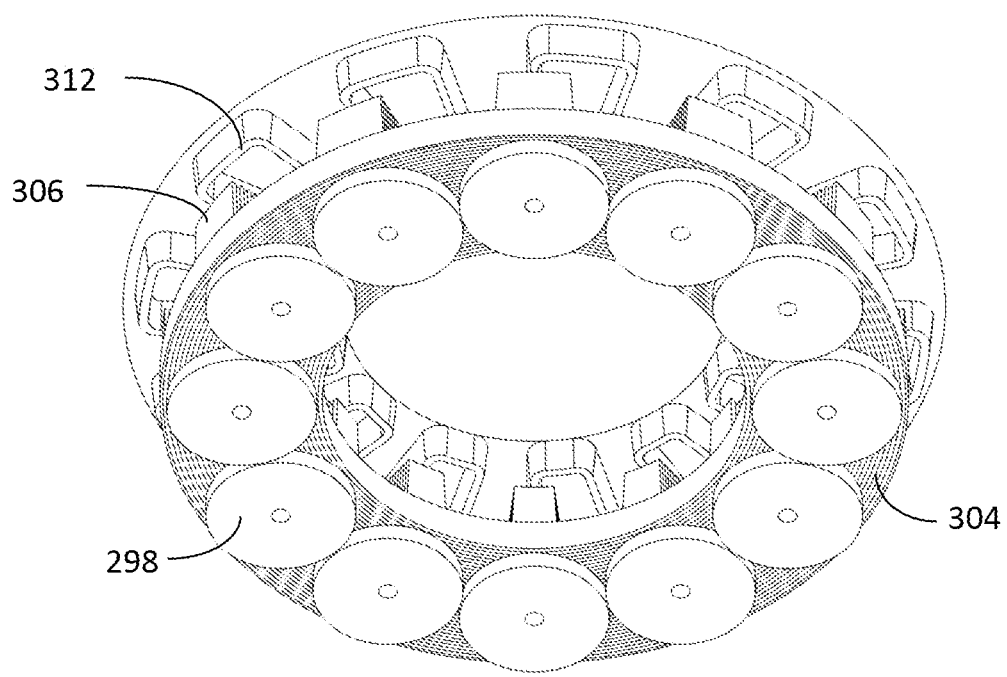
FIG. 64 is a bottom isometric view of upper motor components for the actuator of FIG. 60.
Figure 65:
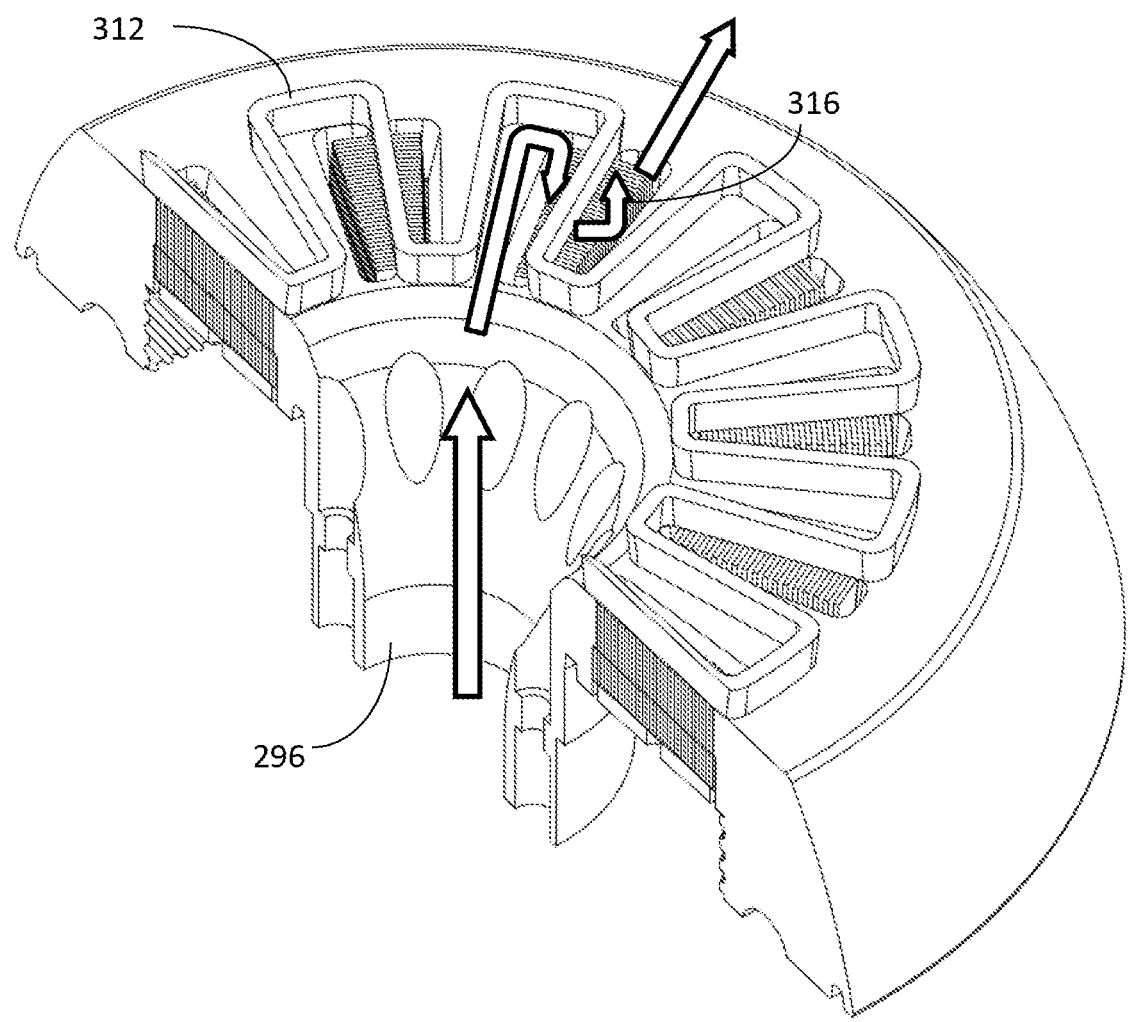
FIG. 65 is a cutaway isometric view of an upper portion of the actuator of FIG. 60 showing airflow paths.

FIG. 64 shows a bottom view of components of the upper motor. FIG. 64 shows a circumferential offset of cavities defined by the air fence 308 above aluminum fins 306.

Figure 66:
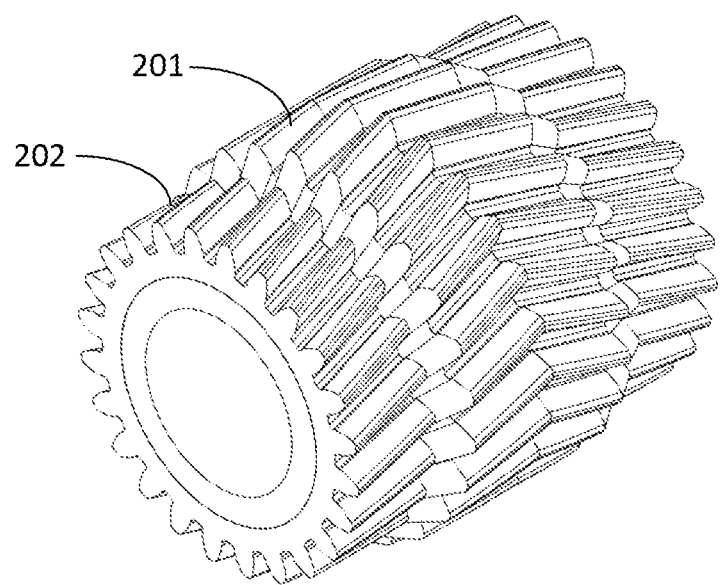
FIG. 66 is an isometric view of an exemplary planet for the actuator of FIG. 60 with continuous features to ease injection molding.

In order to simplify manufacturing, planet gears can be made to be injection moldable such as from plastic. A configuration of the planet gears can include continuous features such as the helical teeth along their axes without an undercut as shown in FIG. 66 to ease injection molding.

Figure 67:
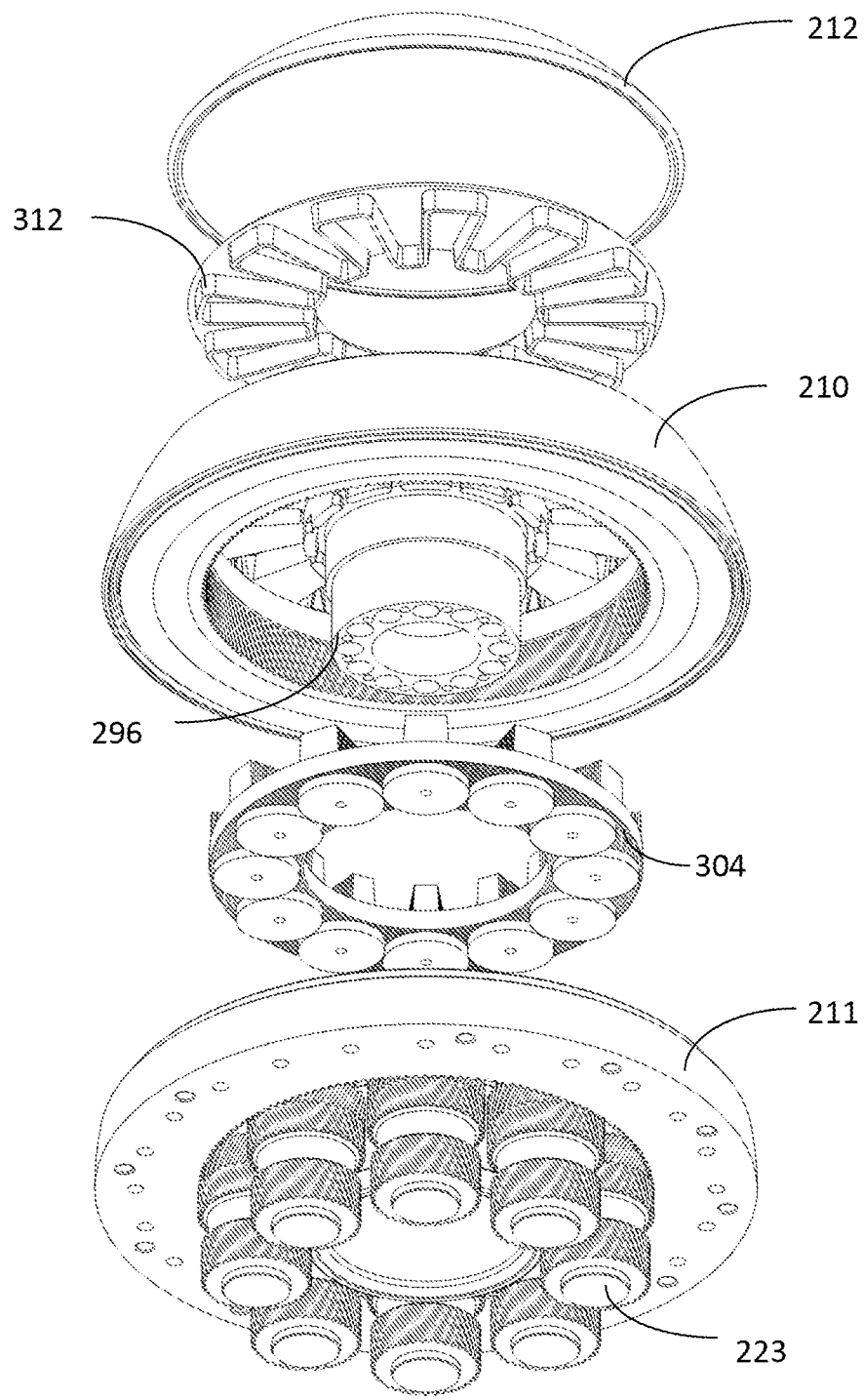
FIG. 67 is an exploded view of an upper half of the actuator of FIG. 60.

FIG. 67 shows an exploded view of an upper half of the gearbox of FIG. 60.

The taper required for injection molding then requires that the maximum addendum diameter of the axially outer section of a planetary gear must be smaller than the minimum addendum diameter of the axially inner section. A preferred embodiment of the planet gears would include a number of teeth in the axially outer section to be either a factor of or equal to the number of teeth of the axially inner gears. In an embodiment with injection moldable planet gears, a geared floating inner ring can be used to preload pinion gears and keep them in engagement with outer rings. A geared floating inner ring may have the advantage of transferring torque from pinions that are under high magnetic force to pinions that are in between phases of EM force input. It is worth noting that if the number of teeth on the axially outer section is a factor of the number of teeth on the axially inner section the whole gear can still be injection molded with step change at the start of the tooth on the axially inner one that does not align with a tooth on the axially outer.

An embodiment includes seals that are added along the inputs and outputs of the motor to protect inner components from dust and particulate.

The tapered gears allow geared parts to be removed from an injection mold or other process such as compacted powder process such as powdered metal. The taper may have a different helix angle on leading and training faces of each gear tooth and/or taper of addendum and dedendum so that the gear releases from the mold with no binding. Other characteristics of the tapered tooth design allow the involute shape to operate correctly.

There may be a rolling feature (e.g., cylindrical section) between the inner and outer gears on the pinion 223. This provides a mid-force position for the preload provided by the rolling sun ring 294.

This also allows the steel pinion core 302 width to be wide enough (axially long enough) so rolling contact of sun ring 294 on plastic pinion race (rolling feature) transfers compression load to steel core 302 rather than to magnets 300 on either end of steel core. Steel has much better strength and endurance than typical PM magnet material so this will contribute to increased service life.

The magnets 300 are preferably not stressed by the preload of the sun ring 294, so the PM magnets can be magnetically attracted to and therefore attached to the axial ends of the steel cores without contacting the ID of the ends of the plastic pinion gears. A cylindrical boss on the inner axial end of the PM's will fit into a circular bore in the end of the steel core to center the PM's.

The PM's 300 may have a larger OD beyond the axial ends of the pinions 223 to provide a larger magnetic pole to interact with the electromagnetic stators.

Assembly sequence may be as follows and is enabled by a symmetric split output ring 210.

If the pinons 223 are placed into the ring gears as a prior step, the sun ring contacts would interfere with the pinions preventing assembly of the sun ring. Likewise, if the sun ring and pinions are assembled first, the output ring would interfere with the pinons and would prevent assembly. By using a split output ring gear 210, however, it is possible to assemble the pinions 223 and sun ring 294 or sun ring assembly first, and then to assemble each of the two output ring gear halves 211 together toward the center plane. The two tapered fixed gear rings 210 are then assembled. This prevents any interference during assembly and allows a zero backlash final result.

Figure 68:
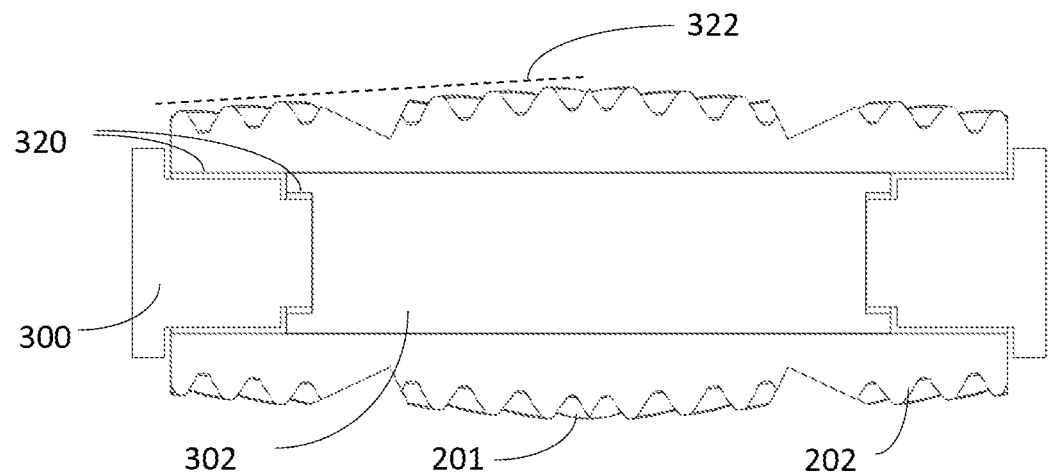
FIG. 68 is a side section view of another exemplary planet for the actuator of FIG. 60.
Figure 69:
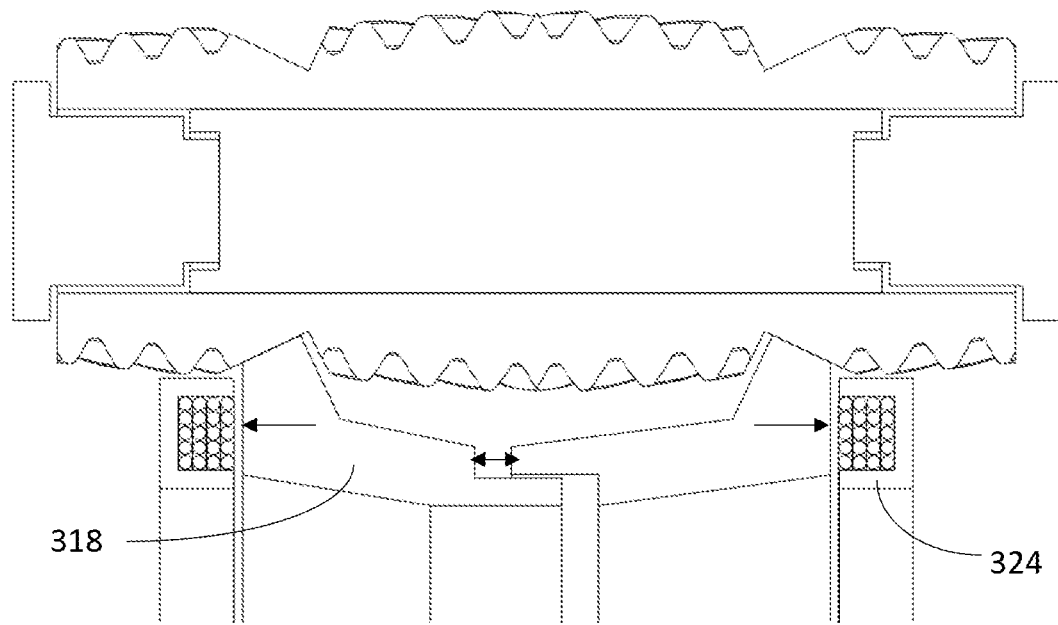
FIG. 69 is a side section view of an expandable sun ring interfacing with the planet of FIG. 68.

Note that to achieve a true zero backlash final assembly it is provided that the axial position of the fixed rings 210 can be adjusted relative to the output ring gear 211 assembly. The problem with that solution is it makes an integrated bearing race 314 between the fixed and output rings very difficult to implement. Instead, an embodiment uses an expandable sun ring 318, as shown below, which can provide gear preload at a range of radial positions for the pinion center axes. FIG. 68 shows a planet 223 having a shape suitable to be used with an expandable sun ring 318 for example as shown in FIG. 69. The planet 232 may have a magnet 300 arranged with clearances 320 between the magnet and the planet gear teeth portion, and between the magnet and radially separated portions of the steel core 302. A line 322 indicates a tooth angle of the inner 201 and outer 202 teeth.

A replaceable/adjustable shim (not shown) is provided in the assembly between the two output ring gear halves to adjust their relative axial position to each other at the center plane. This shim can be a replaceable ring or ring sections that can be inserted during assembly, or it can be a rotating ring with ramps or threads that can be adjusted via rotation around the actuator center axis after assembly of all the components but before the two output ring halves are secured together such as by tightening together with bolts. By creating the assembly so the output ring gears 210 have backlash when at the maximum shim adjustment thickness, the fixed 210 and output 211 ring gears and pinions 223 and expandable sun gear 318 can be loosely arranged but assembled close to their final positions. At this point, the preload of the sun ring 318 will push the outer pinion gears 202 and fixed ring gear 210 teeth into engagement with no backlash. Reducing the axial distance between the output gear rings 211 will then remove the backlash from the inner gears 201 and output rings 211. To allow a single shim stack (between only the two halves of the output ring gears) to adjust the backlash in the fixed and output gear meshes, requires that the pinons can be moved outward as a result of the expanding sun ring 318, and that the taper on the inner gears 201 of the pinion 223 (and the output gear 211) be of a greater taper angle. This way the axial adjustment of the output ring gears 211 has more effect on the inner gear mesh between inner teeth 201 and output gears 211 than the outer gear mesh between outer teeth 202 and fixed gears 210. As a result, the relative position of the fixed ring gear 210 on an end and the output ring gear 211 half on that end, do not need to be changed. This allows the bearing races 314 to be molded or machined into the fixed and output gears because there is no change in this relative position required during backlash adjustment. The only thing that must be considered in this adjustment strategy is that the relative position of the two fixed ring gears 210 to each other will need to be shimmed/adjusted at the same time as the two output ring gears 211 are adjusted. This adjustment could, however, be a result of the compliance of the housing 212 which supports and secures, including via connecting portion 296, the two fixed rings 210 together.

Adjustable sun ring pressure via axially spring two-piece sun ring with a mechanical spring (or repelling magnet ring) pushing axially outward will compensate for thermal expansion and gear surface wear while reducing or eliminating backlash. This allows for a greater tolerance range on the diameters of the sun ring and pinion contact races, as well as the tolerance of the gear faces.

An axially expandable sun ring 318, as shown in FIG. 69, provides the capability to adjust the preload force of the sun ring races on the pinion races. This can be done by a number of means including, for example, a magnetic coil 324 on both axial ends of the axially expandable sun ring assembly as shown below. The electromagnetic coils in this example are fixed to the actuator housing. By powering them to a level that is proportional to the output torque of the actuator, the preload of the pinions and ring gears can be adjusted at all times to ensure a zero-backlash gear interface and the lowest possible friction.

Figure 70:
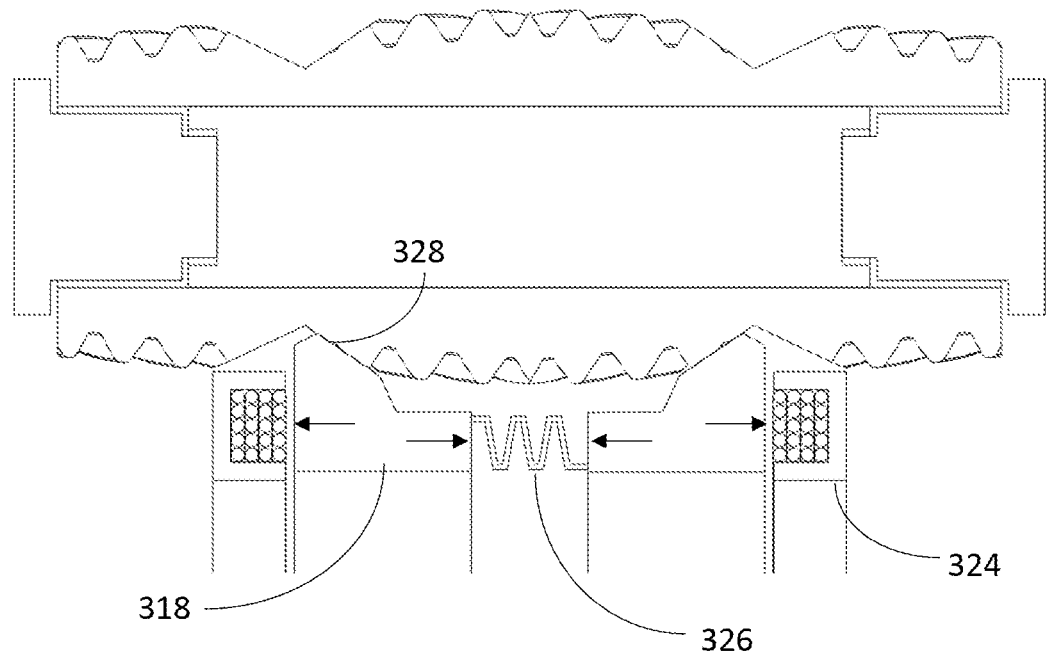
FIG. 70 is a side section view of an adjustable sun ring interfacing with a planet to provide a safety brake.

In an embodiment, shown in FIG. 70, a power-off safety brake is integrated into the gearbox as follows. A separation spring 326 is strong enough to create a high level of friction between the sun ring 318 and pinion contact face 328. This friction also results in higher friction between the gear mesh surfaces making the gearbox very difficult or impossible to backdrive. This results in a power-off brake that prevents rotation of the actuator when power is lost. To release the brake, an actuation means, such as an electromagnetic coil 324 exerts a force in the opposite direction. The level of this force can then be adjusted to relieve enough of the spring force to eliminate unnecessary friction, but not so much as to cause backlash at any given torque output. For clarity, the greater the EM force on the sun ring assembly, the lower the preloading force on the pinions. When power is lost to the actuator, the EM coils become unpowered and the mechanical spring provides the preload force which is then high enough to make the gearbox less or completely non-backdrivable.

Features of embodiments of this planet driven actuator may include: the fixed ring gears are secured together, such as through the axial center of the device; planet gears would include a number of teeth in the axially outer section to be either a factor of or equal to the number of teeth of the axially inner gears; serpentine air fence causes air to pas circumferentially between cooling fins as it flows from the center axis outward; a non-geared sun ring preloads pinons but allows them to float for equal torque transfer; the sun ring can be geared; the sun ring may also distributes torque between pinions when some pinons are no being pulled along by stator; and the sun ring can be used as a brake member (not shown) by applying braking force to sun ring (whether geared or not) with a brake device (not shown). An alternative brake using a sun ring is shown in FIG. 70.

Planetary Bearing

A rotor can be coupled to a gearbox and make use of the planet gears as a bearing with the sun as the interface. Six non-limiting configurations of gearboxes (71-78) are presented to demonstrate the configuration of gears such that the planets can act as bearings. This can work for any number of planets greater than 3. FIGS. 71-78 cover configurations of symmetric planetary gearboxes with either axially inner or axially outer sun interfaces of many possible gear ratios. This principle works in any planetary system with an input gear and a stationary gear on opposing radial sides (ex. left and right of planet gear in FIGS. 71-78) of a planetary gear.

Each of FIGS. 71-78 shows a 2D section view of a respective embodiment. Gear teeth are not shown for simplification. Each shows a planet 400 interfacing with an input gear 402, a stationary gear 404, and an output gear 406. A dotted line 408 indicates a central axis about which the input and output gears rotate.

Figure 71:
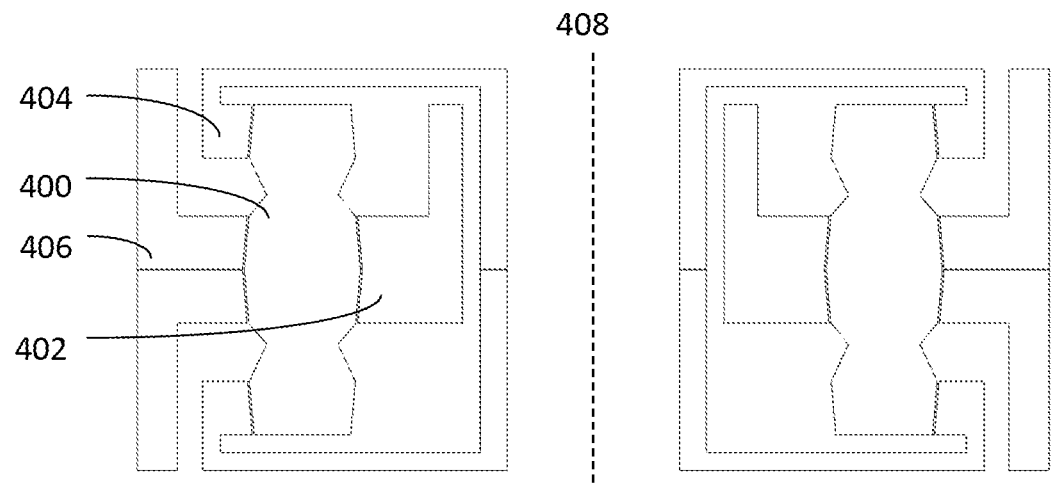
FIGS. 71-78 are side section views of different configurations of gearboxes suitable to act as bearings.

FIG. 71 shows an embodiment using a sun input 402 interfacing with axially inner planet gear teeth and outer stationary gear 404 interfacing with axially outer planet gear teeth.

Figure 72:
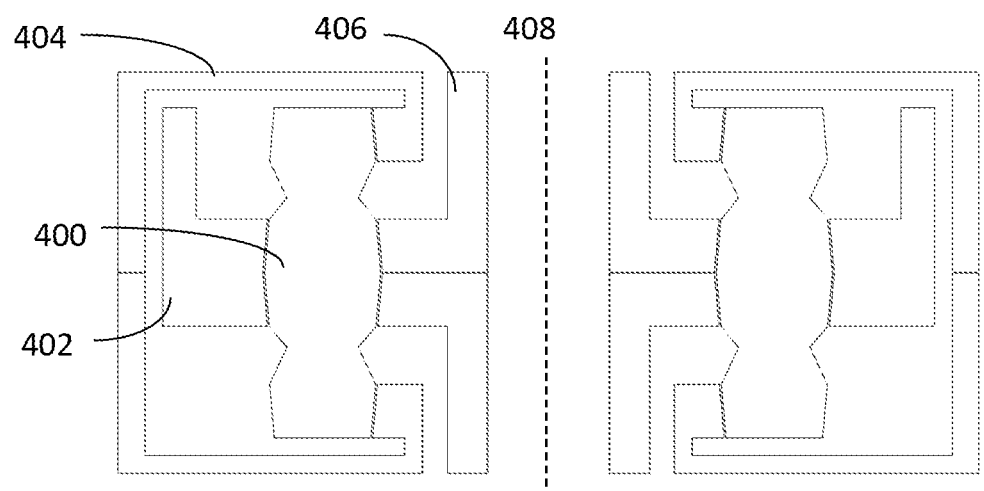

FIG. 72 shows an input ring gear 402 interfacing with the axially inner (or outer) planet gear teeth and a stationary sun gear 404 interfacing with the axially outer planet gear teeth (and curving outward to loop around the input ring gear), and an output sun gear 406 interfacing the axially inner planet gear teeth. FIG. 72 is the same as FIG. 71 but with what is radially inner and what is radially outer inverted.

Figure 73:
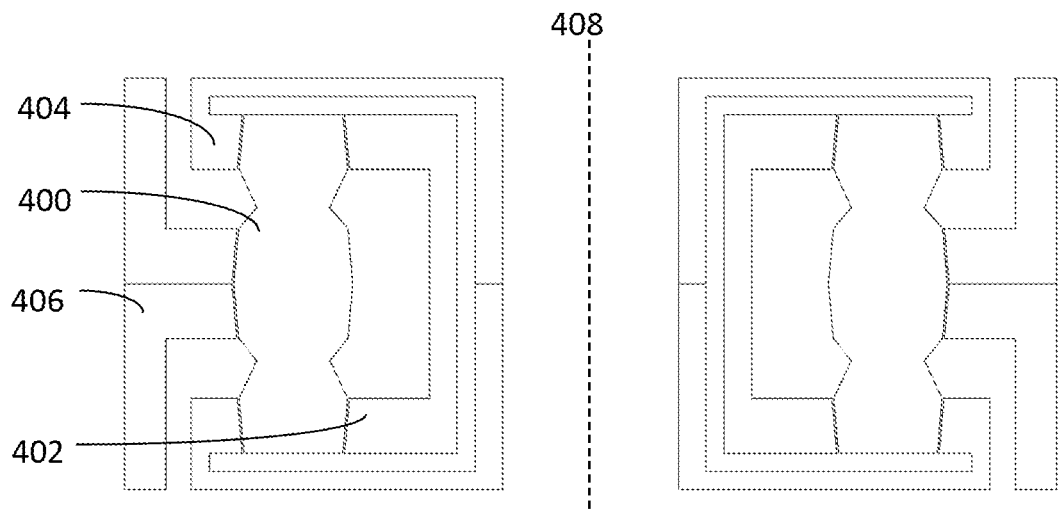

FIG. 73 shows a sun input 402 interfacing with axially outer planet gear teeth and outer stationary 404 interfacing with axially outer planet gear teeth.

Figure 74:
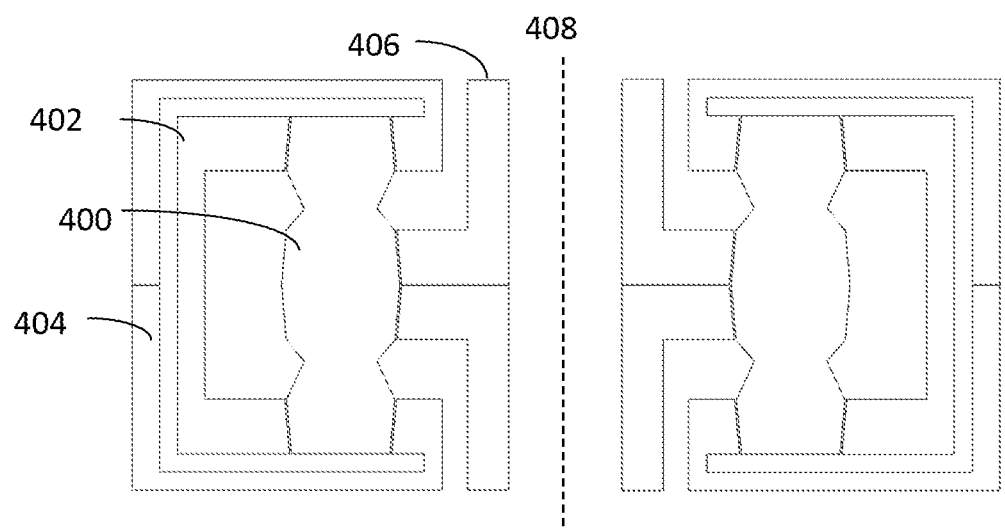

FIG. 74 is the same as FIG. 73 but with what is radially inner and what is radially outer inverted.

Figure 75:
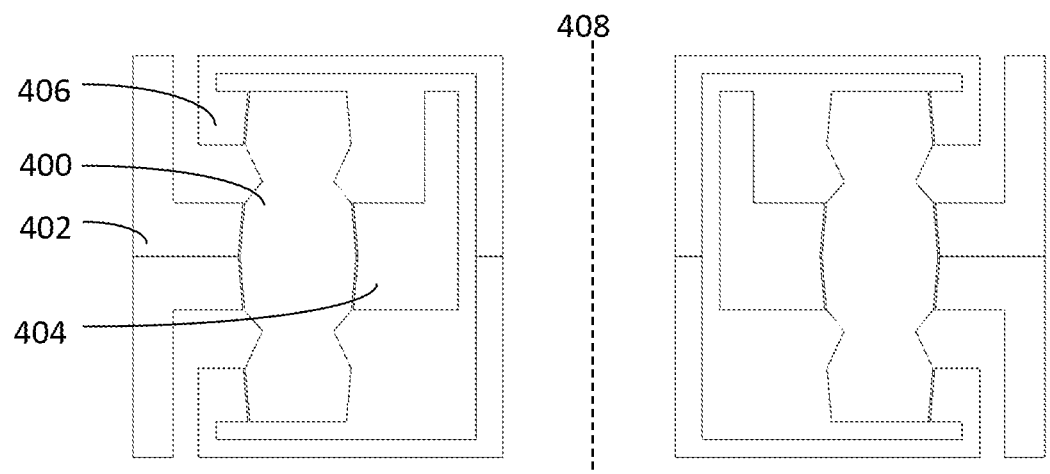
Figure 76:
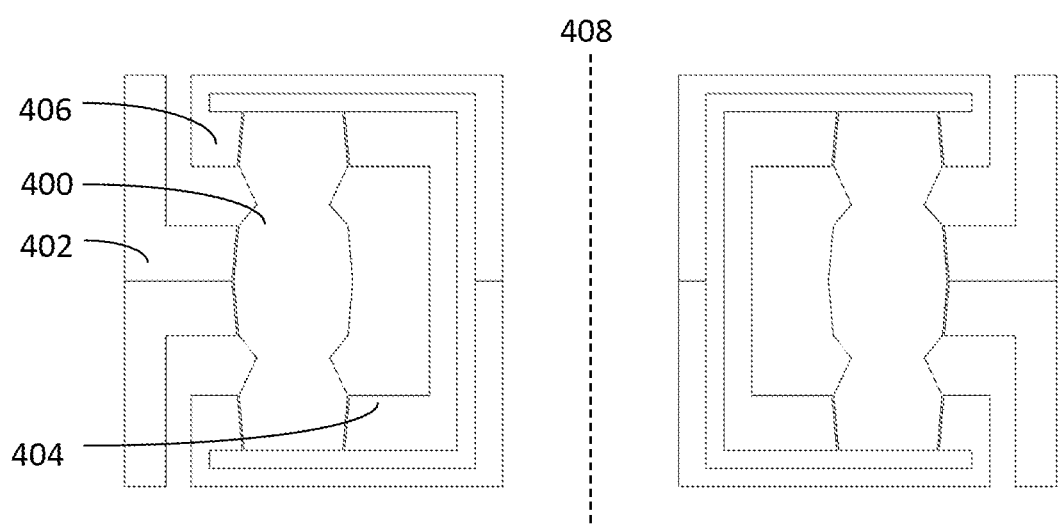

FIGS. 75 and 76 have a stationary portion surrounded by a moving part. This would not work for continuous motion, but would be perfectly allowable for a limited range or motion joint, i.e., the moving part would have a slot part of the way around the circumference which allows the stationary part to be grounded. These would also be a speed increaser if the axially inner planet gear is larger than the axially outer planet gear. This could also be reversed to change it to a reducer, although this may make it more difficult to manufacture/assemble the planet gear.

FIG. 75 shows an outer input gear 402 interfacing with axially inner planet gear teeth and stationary sun gear 404 interfacing with axially inner planet gear teeth.

FIG. 76 shows an outer input gear 402 interfacing with axially inner planet gear teeth and stationary sun gear 404 interfacing with axially outer planet gear teeth.

Figure 77:
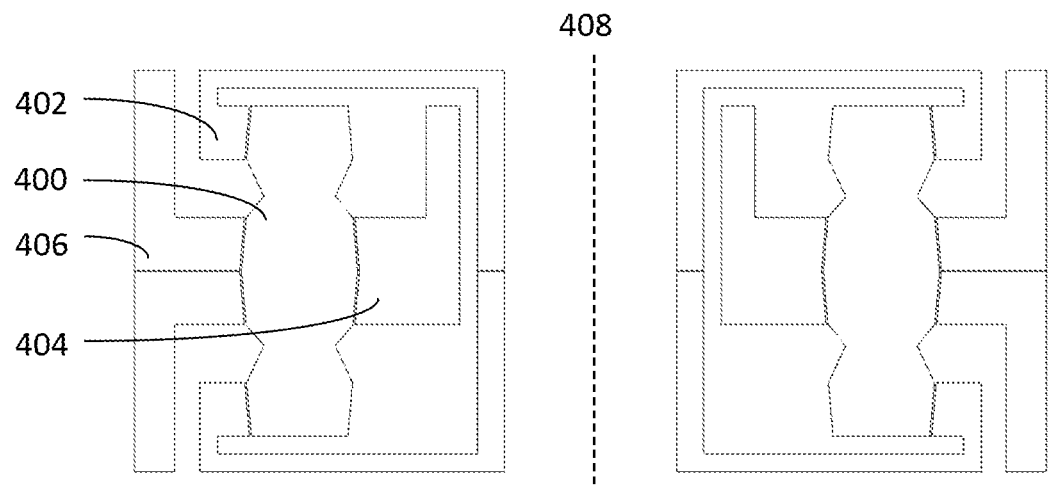

FIG. 77 shows an outer input gear 402 interfacing with axially outer planet gear teeth and a stationary sun gear 404 interfacing with axially inner planet gear teeth.

Figure 78:
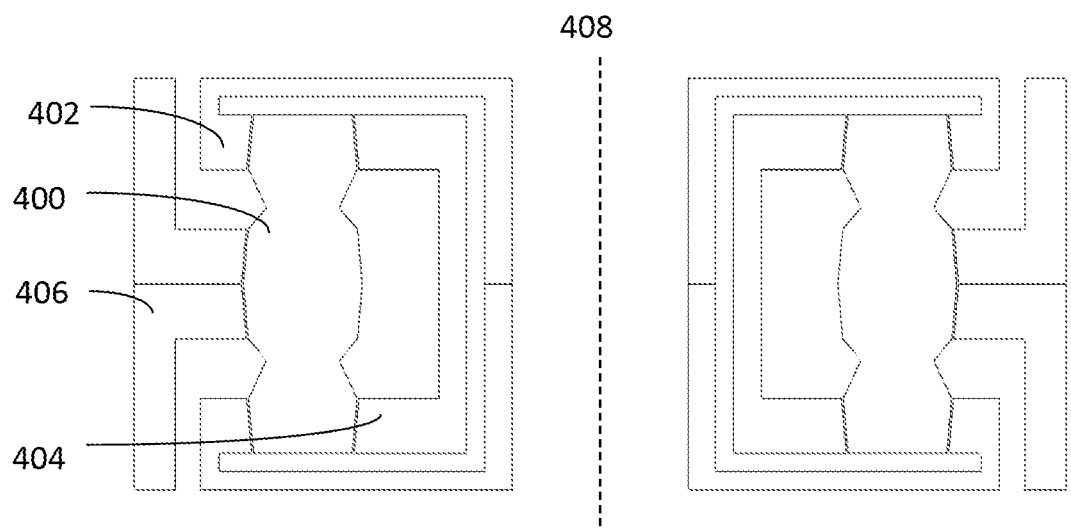

FIG. 78 shows an outer input gear 402 interfacing with axially outer planet gear teeth and a stationary sun gear 404 interfacing with axially outer planet gear teeth.

Out of Phase Gears

One potential drawback when using the differential gearbox is the additional gear meshes when compared to a three or four planet system. When the planets are all in phase, gears make contact with the next tooth at the same time, and with additional planets, the potential for noise and vibration are increased. By keeping the planets out of phase, the additional initial tooth contacts can be distributed more evenly, significantly reducing the 'cogging feel' of an in-phase system. In one exemplary embodiment, there are 14 planets and thus 14 initial contacts for each tooth. In a single phase system, all of these contacts occur at one point in time, while in a 7 phase system, only two contacts occur at a single point in time, but the contacts occur 7× as often.

Figure 79:
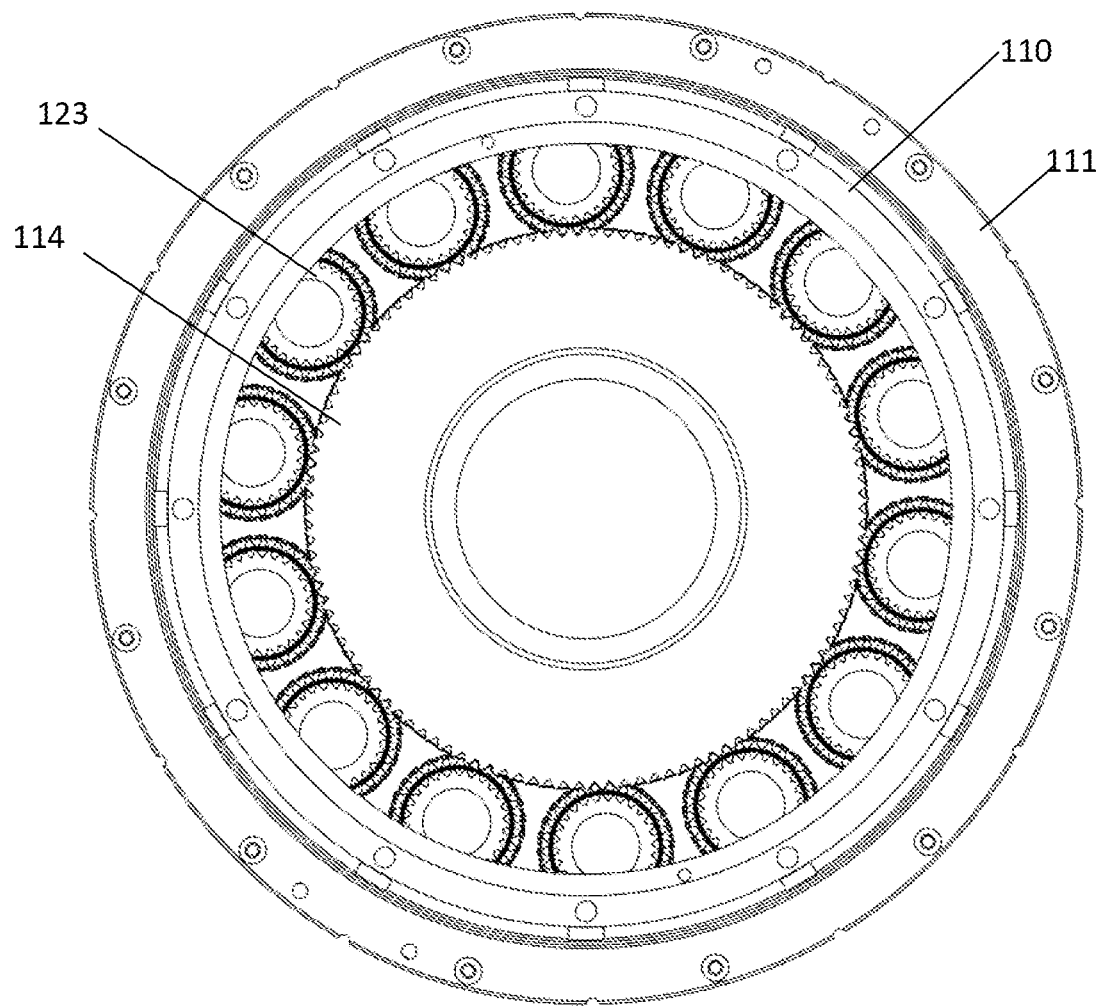
FIG. 79 is an axial end view of another exemplary gearbox.
Figure 80:
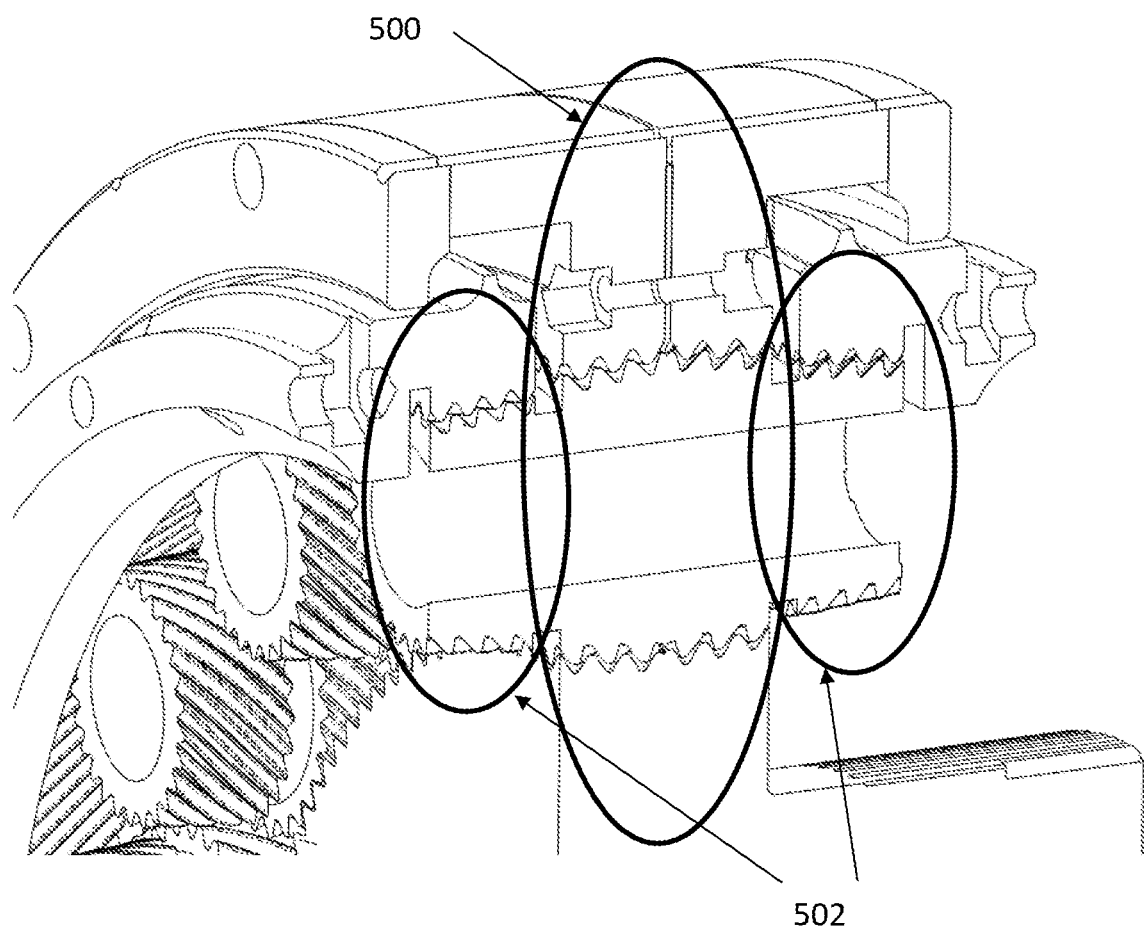
FIG. 80 is an isometric cutaway view of the gearbox of FIG. 79 showing gearsets.

In one embodiment, shown in FIG. 79, and FIG. 80, there are 14 planets 123 positioned evenly around the sun 114. Each planet is identical and there are 7 unique phases of planet. Opposite planets are in the same phase. The gear diameters and tooth numbers are provided in Table 3.

TABLE 3

|  | Scaled Diameter | Teeth |
|---|---|---|
| Sun | 89.18 | 114 |
| Outer Ring | 129.86 | 166 |
| Stator Ring | 126.47 | 194 |
| Planet Large | 20.34 | 26 |
| Planet Small | 16.95 | 26 |
| Sun 2 | 92.57 | 142 |

This can be separated into two traditional planetary gearsets: an inner gearset 500 and outer gearset 502, each with a sun gear, planet gear, and ring gear. Each gearset has a constant pitch or module, which may be different from the other gearset. Note that the differential gearset does not make use of a sun gear on the outer gearset. The virtual sun gear would fit into the system, but is not required due to the balanced nature of the system.

TABLE 4

|  | Inner Gearset | | Outer Gearset | |
|---|---|---|---|---|
|  | Diameter | Teeth | Diameter | Teeth |
| Sun | 89.18 | 114 | 92.57 | 142 |
| Ring | 129.86 | 166 | 126.47 | 194 |
| Planet | 20.34 | 26 | 16.95 | 26 |

The two gearsets are designed such that diameters and tooth numbers in the system are compatible in:
The number of planets
The radial and tangential position of the planets
The phase of the planets
Individually, the gearsets follow known rules for planetary geartrains, with the sum of the number of teeth in the sun and ring gears being evenly divisible by the number of planets. This ensures that the planets are evenly spaced around the sun.

$$\text{Inner Gearset} \rightarrow \frac{114 + 166}{14} = 20$$

$$\text{Outer Gearset} \rightarrow \frac{142 + 194}{14} = 24$$

The radial position of the planets is controlled by the relative scales of the two gearsets, ensuring that the planet gear axes fall on the same radius.

The phase of the planets is kept compatible by ensuring that the two gearsets have the same number of unique phases. The number of unique phases in the system is calculated by dividing the number of planets by the greatest common factor of the number of teeth on the sun gear, ring gear, and the number of planets.

$$\text{Inner Gearset} \rightarrow \frac{14}{GCF(114, 166, 14)} = \frac{14}{2} = 7$$

$$\text{Outer Gearset} \rightarrow \frac{14}{GCF(142, 192, 14)} = \frac{14}{2} = 7$$

The phases are organized such that similar planet phases are distributed evenly around the sun. In the example above, there are 2 planets for each unique phase. The two planets in one phase will be located 180° from each other.

With the same number and position of unique gear phases, the system can operate. If only the position were compatible, the system could operate only if there were planet configurations specified for each individual gear position. Each planet configuration would use identical gears, but the rotational alignment between the inner and outer gears would be unique for each phase pair.

In an embodiment, the number of teeth on the planet gears may either be equal, or the number of teeth on one planet may be an integer multiple of the number of teeth of the other planet. This provides a number of advantages.

First, the planet may be more easily manufactured as a single piece using methods including, but not limited to injection molding. It is beneficial to have the planets as a single piece in order to better allow for load sharing mechanisms in the system. One of the load sharing mechanisms that the exemplary system relies on is the radial compression of the planets to ensure gear tooth contact on both the sun and the outer ring. One of the ways to ensure this occurs is to include a large through hole in the planet, allowing for some additional radial flexibility. If the planet were to be constructed of multiple pieces, the method of fastening them together would require significantly more material and thus result in significantly more stiffness.

Second, the system may be assembled with the planets as a single piece. In any planetary gearset, one or more of the gears must be inserted axially. In one process, planets could be placed around the sun radially, and the outer ring may be inserted axially around the planets. For the differential gearbox, two planetary gearsets are joined axially and if the planet is a single piece, there are limitations to the assembly method. By constraining the number of teeth on the planet gears, there are significantly more configurations that may be assembled. Without this constraint, some configurations cannot be assembled, as the outer planet gear teeth would prevent the axial insertion of a gear into the inner gearset. This is applicable for spur and helical gear teeth. See the additional specification filed herewith for images of the different configurations (sun input, ring input, etc.).

For most reasonable gear ratios, the two planet diameters must be similar. If the addendum of the smaller planet gear is larger than the dedendum of the larger gear, an undercut exists, meaning that a gear could not be axially inserted into position onto the inner gearset.

Figure 81:
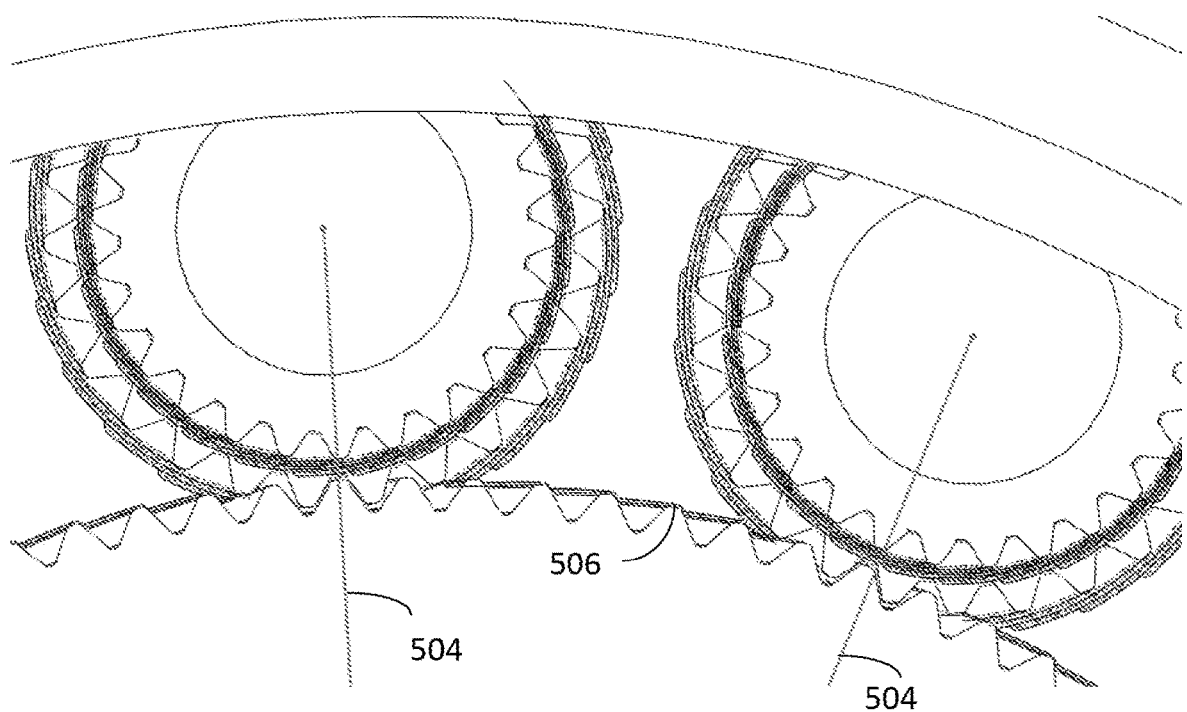
FIG. 81 is a side view of two planets contacting a sun gear, out of phase.

In FIG. 81, it is clear that the two planets shown are out of phase. The respective lines 504 running between the gear center axes and the center axis of the device intersects the gear teeth 506 at a different point on the nearest tooth, falling near the center of the sun tooth on the left gear, and falling to one side of the sun tooth on the right gear.

By using the principles described above, there are a number of unique solutions that may be used in a differential gearbox. A list of these solutions is shown below, but the scope of the claims is not limited to these specific solutions. Additional solutions exist with different numbers of gear teeth and each solution may be geometrically scaled to suit any diameter, keeping the number of teeth constant. Specific configurations can be determined by solution of known equations applied following the principles in this disclosure.

TABLE 5

| Gear Ratio | Number of Planets | Sun Diameter | Outer Ring Diameter | Stator Ring Diameter | Planet Large Diameter | Planet Small Diameter | Sun 2 Diameter | Sun Teeth | Outer Ring Teeth | Stator Ring Teeth | Planet Large Teeth | Planet Small Teeth | Sun 2 Teeth |
|---|---|---|---|---|---|---|---|---|---|---|---|---|---|
| 7.220339 | 26 | 137.6667 | 165.6667 | 161.6667 | 14 | 10 | 141.6667 | 118 | 142 | 194 | 12 | 12 | 170 |
| 3.61017 | 26 | 196.6667 | 236.6667 | 226.6667 | 20 | 10 | 206.6667 | 118 | 142 | 272 | 12 | 12 | 248 |
| 2.707627 | 26 | 255.6667 | 307.6667 | 291.6667 | 26 | 10 | 271.6667 | 118 | 142 | 350 | 12 | 12 | 326 |
| 13.23729 | 26 | 118 | 142 | 140 | 12 | 10 | 120 | 118 | 142 | 168 | 12 | 12 | 144 |
| 4.211864 | 26 | 177 | 213 | 205 | 18 | 10 | 185 | 118 | 142 | 246 | 12 | 12 | 222 |
| 2.922518 | 26 | 236 | 284 | 270 | 24 | 10 | 250 | 118 | 142 | 324 | 12 | 12 | 300 |
| 2.54049 | 26 | 275.3333 | 331.3333 | 313.3333 | 28 | 10 | 293.3333 | 118 | 142 | 376 | 12 | 12 | 352 |
| 3.20904 | 26 | 216.3333 | 260.3333 | 248.3333 | 22 | 10 | 228.3333 | 118 | 142 | 298 | 12 | 12 | 274 |
| 5.214689 | 26 | 157.3333 | 189.3333 | 183.3333 | 16 | 10 | 163.3333 | 118 | 142 | 220 | 12 | 12 | 196 |
| 5.253687 | 25 | 150.6667 | 182.6667 | 176.6667 | 16 | 10 | 156.6667 | 113 | 137 | 212 | 12 | 12 | 188 |
| 3.233038 | 25 | 207.1667 | 251.1667 | 239.1667 | 22 | 10 | 219.1667 | 113 | 137 | 287 | 12 | 12 | 263 |
| 2.559489 | 25 | 263.6667 | 319.6667 | 301.6667 | 28 | 10 | 281.6667 | 113 | 137 | 362 | 12 | 12 | 338 |
| 13.33628 | 25 | 113 | 137 | 135 | 12 | 10 | 115 | 113 | 137 | 162 | 12 | 12 | 138 |
| 4.243363 | 25 | 169.5 | 205.5 | 197.5 | 18 | 10 | 177.5 | 113 | 137 | 237 | 12 | 12 | 213 |
| 2.944374 | 25 | 226 | 274 | 260 | 24 | 10 | 240 | 113 | 137 | 312 | 12 | 12 | 288 |
| 2.727876 | 25 | 244.8333 | 296.8333 | 280.8333 | 26 | 10 | 260.8333 | 113 | 137 | 337 | 12 | 12 | 313 |
| 3.637168 | 25 | 188.3333 | 228.3333 | 218.3333 | 20 | 10 | 198.3333 | 113 | 137 | 262 | 12 | 12 | 238 |
| 7.274336 | 25 | 131.8333 | 159.8333 | 155.8333 | 14 | 10 | 135.8333 | 113 | 137 | 187 | 12 | 12 | 163 |
| 4.569328 | 24 | 173.9231 | 211.9231 | 203.9231 | 19 | 11 | 181.9231 | 119 | 145 | 241 | 13 | 13 | 215 |
| 2.893908 | 24 | 247.1539 | 301.1539 | 285.1539 | 27 | 11 | 263.1539 | 119 | 145 | 337 | 13 | 13 | 311 |
| 2.70775 | 24 | 265.4615 | 323.4615 | 305.4615 | 29 | 11 | 283.4615 | 119 | 145 | 361 | 13 | 13 | 335 |
| 3.89916 | 24 | 192.2308 | 234.2308 | 224.2308 | 21 | 11 | 202.2308 | 119 | 145 | 265 | 13 | 13 | 239 |
| 14.62185 | 24 | 119 | 145 | 143 | 13 | 11 | 121 | 119 | 145 | 169 | 13 | 13 | 143 |
| 3.452381 | 24 | 210.5385 | 256.5385 | 244.5385 | 23 | 11 | 222.5385 | 119 | 145 | 289 | 13 | 13 | 263 |
| 7.920168 | 24 | 137.3077 | 167.3077 | 163.3077 | 15 | 11 | 141.3077 | 119 | 145 | 193 | 13 | 13 | 167 |
| 3.133253 | 24 | 228.8462 | 278.8462 | 264.8462 | 25 | 11 | 242.8462 | 119 | 145 | 313 | 13 | 13 | 287 |
| 5.686275 | 24 | 155.6154 | 189.6154 | 183.6154 | 17 | 11 | 161.6154 | 119 | 145 | 217 | 13 | 13 | 191 |
| 13.44444 | 24 | 108 | 132 | 130 | 12 | 10 | 110 | 108 | 132 | 156 | 12 | 12 | 132 |
| 7.333333 | 24 | 126 | 154 | 150 | 14 | 10 | 130 | 108 | 132 | 180 | 12 | 12 | 156 |
| 5.296296 | 24 | 144 | 176 | 170 | 16 | 10 | 150 | 108 | 132 | 204 | 12 | 12 | 180 |
| 4.277778 | 24 | 162 | 198 | 190 | 18 | 10 | 170 | 108 | 132 | 228 | 12 | 12 | 204 |
| 3.666667 | 24 | 180 | 220 | 210 | 20 | 10 | 190 | 108 | 132 | 252 | 12 | 12 | 228 |
| 3.259259 | 24 | 198 | 242 | 230 | 22 | 10 | 210 | 108 | 132 | 276 | 12 | 12 | 252 |
| 2.968254 | 24 | 216 | 264 | 250 | 24 | 10 | 230 | 108 | 132 | 300 | 12 | 12 | 276 |
| 2.75 | 24 | 234 | 286 | 270 | 26 | 10 | 250 | 108 | 132 | 324 | 12 | 12 | 300 |
| 2.580247 | 24 | 252 | 308 | 290 | 28 | 10 | 270 | 108 | 132 | 348 | 12 | 12 | 324 |
| 13.44444 | 26 | 108 | 132 | 130 | 12 | 10 | 110 | 117 | 143 | 169 | 13 | 13 | 143 |
| 7.333333 | 26 | 126 | 154 | 150 | 14 | 10 | 130 | 117 | 143 | 195 | 13 | 13 | 169 |
| 5.296296 | 26 | 144 | 176 | 170 | 16 | 10 | 150 | 117 | 143 | 221 | 13 | 13 | 195 |
| 4.277778 | 26 | 162 | 198 | 190 | 18 | 10 | 170 | 117 | 143 | 247 | 13 | 13 | 221 |
| 3.666667 | 26 | 180 | 220 | 210 | 20 | 10 | 190 | 117 | 143 | 273 | 13 | 13 | 247 |
| 3.259259 | 26 | 198 | 242 | 230 | 22 | 10 | 210 | 117 | 143 | 299 | 13 | 13 | 273 |
| 2.968254 | 26 | 216 | 264 | 250 | 24 | 10 | 230 | 117 | 143 | 325 | 13 | 13 | 299 |
| 2.75 | 26 | 234 | 286 | 270 | 26 | 10 | 250 | 117 | 143 | 351 | 13 | 13 | 325 |
| 2.580247 | 26 | 252 | 308 | 290 | 28 | 10 | 270 | 117 | 143 | 377 | 13 | 13 | 351 |
| 13.55357 | 25 | 103.3846 | 127.3846 | 125.3846 | 12 | 10 | 105.3846 | 112 | 138 | 163 | 13 | 13 | 137 |
| 2.601191 | 25 | 241.2308 | 297.2308 | 279.2308 | 28 | 10 | 259.2308 | 112 | 138 | 363 | 13 | 13 | 337 |
| 2.772321 | 25 | 224 | 276 | 260 | 26 | 10 | 240 | 112 | 138 | 338 | 13 | 13 | 312 |
| 2.992347 | 25 | 206.7692 | 254.7692 | 240.7692 | 24 | 10 | 220.7692 | 112 | 138 | 313 | 13 | 13 | 287 |
| 3.285714 | 25 | 189.5385 | 233.5385 | 221.5385 | 22 | 10 | 201.5385 | 112 | 138 | 288 | 13 | 13 | 262 |
| 3.696429 | 25 | 172.3077 | 212.3077 | 202.3077 | 20 | 10 | 182.3077 | 112 | 138 | 263 | 13 | 13 | 237 |
| 4.3125 | 25 | 155.0769 | 191.0769 | 183.0769 | 18 | 10 | 163.0769 | 112 | 138 | 238 | 13 | 13 | 212 |
| 5.339286 | 25 | 137.8462 | 169.8462 | 163.8462 | 16 | 10 | 143.8462 | 112 | 138 | 213 | 13 | 13 | 187 |
| 7.392857 | 25 | 120.6154 | 148.6154 | 144.6154 | 14 | 10 | 124.6154 | 112 | 138 | 188 | 13 | 13 | 162 |
| 7.398058 | 23 | 120.1667 | 148.1667 | 144.1667 | 14 | 10 | 124.1667 | 103 | 127 | 173 | 12 | 12 | 149 |
| 3.699029 | 23 | 171.6667 | 211.6667 | 201.6667 | 20 | 10 | 181.6667 | 103 | 127 | 242 | 12 | 12 | 218 |
| 2.774272 | 23 | 223.1667 | 275.1667 | 259.1667 | 26 | 10 | 239.1667 | 103 | 127 | 311 | 12 | 12 | 287 |
| 13.56311 | 23 | 103 | 127 | 125 | 12 | 10 | 105 | 103 | 127 | 150 | 12 | 12 | 126 |
| 4.315534 | 23 | 154.5 | 190.5 | 182.5 | 18 | 10 | 162.5 | 103 | 127 | 219 | 12 | 12 | 195 |
| 2.994452 | 23 | 206 | 254 | 240 | 24 | 10 | 220 | 103 | 127 | 288 | 12 | 12 | 264 |
| 2.603021 | 23 | 240.3333 | 296.3333 | 278.3333 | 28 | 10 | 258.3333 | 103 | 127 | 334 | 12 | 12 | 310 |
| 3.288026 | 23 | 188.8333 | 232.8333 | 220.8333 | 22 | 10 | 200.8333 | 103 | 127 | 265 | 12 | 12 | 241 |
| 5.343042 | 23 | 137.3333 | 169.3333 | 163.3333 | 16 | 10 | 143.3333 | 103 | 127 | 196 | 12 | 12 | 172 |
| 3.181598 | 24 | 210.7143 | 260.7143 | 246.7143 | 25 | 11 | 224.7143 | 118 | 146 | 314 | 14 | 14 | 286 |
| 4.639831 | 24 | 160.1429 | 198.1429 | 190.1429 | 19 | 11 | 168.1429 | 118 | 146 | 242 | 14 | 14 | 214 |
| 14.84746 | 24 | 109.5714 | 135.5714 | 133.5714 | 13 | 11 | 111.5714 | 118 | 146 | 170 | 14 | 14 | 142 |
| 2.938559 | 24 | 227.5714 | 281.5714 | 265.5714 | 27 | 11 | 243.5714 | 118 | 146 | 338 | 14 | 14 | 310 |
| 3.959322 | 24 | 177 | 219 | 209 | 21 | 11 | 187 | 118 | 146 | 266 | 14 | 14 | 238 |
| 2.749529 | 24 | 244.4286 | 302.4286 | 284.4286 | 29 | 11 | 262.4286 | 118 | 146 | 362 | 14 | 14 | 334 |
| 8.042373 | 24 | 126.4286 | 156.4286 | 152.4286 | 15 | 11 | 130.4286 | 118 | 146 | 194 | 14 | 14 | 166 |
| 3.50565 | 24 | 193.8571 | 239.8571 | 227.8571 | 23 | 11 | 205.8571 | 118 | 146 | 290 | 14 | 14 | 262 |
| 5.774011 | 24 | 143.2857 | 177.2857 | 171.2857 | 17 | 11 | 149.2857 | 118 | 146 | 218 | 14 | 14 | 190 |
| 2.757202 | 22 | 240.9231 | 298.9231 | 280.9231 | 29 | 11 | 258.9231 | 108 | 134 | 332 | 13 | 13 | 306 |
| 3.190476 | 22 | 207.6923 | 257.6923 | 243.6923 | 25 | 11 | 221.6923 | 108 | 134 | 288 | 13 | 13 | 262 |

These parameters for the gearbox, using two sizes of radially outer planets which alternate as you look around the circle (A, B, A, B, A . . . ), while each of the radially inner planets are of the same size, are believed to work: (P=planet, R=ring, in =inner, out=outer).

TABLE 6

| Soln | # Ps | Diameter Sun | Outer R | P out | P Out 2 | P in | Teeth Sun | Out R | P Out | P Out 2 | P in | Pitch | Ratio | Total Error |
|---|---|---|---|---|---|---|---|---|---|---|---|---|---|---|
| 1 | 14 | 105 | 168 | 21.9 | 18.6 | 18.6 | 350 | 560 | 73 | 62 | 62 | 3.33 | 2.67 | 0.102 |
| 2 | 10 | 98 | 161 | 29.4 | 23.1 | 17.5 | 140 | 230 | 42 | 33 | 25 | 1.43 | 2.56 | 0.144 |
| 3 | 14 | 114.8 | 173.6 | 12.2 | 10.4 | 28 | 574 | 868 | 61 | 52 | 140 | 5 | 2.95 | 0.156 |
| 4 | 10 | 79.9 | 159.8 | 27.5 | 22.3 | 23.78 | 215 | 430 | 74 | 60 | 64 | 2.69 | 2 | 0.193 |
| 5 | 10 | 86 | 172 | 29.6 | 24 | 25.6 | 215 | 430 | 74 | 60 | 64 | 2.5 | 2 | 0.198 |
| 6 | 16 | 103.2 | 163.2 | 19.8 | 18.3 | 16.5 | 344 | 544 | 66 | 61 | 55 | 3.33 | 2.72 | 0.202 |
| 7 | 16 | 103.2 | 163.2 | 19.8 | 18.3 | 16.5 | 344 | 544 | 66 | 61 | 55 | 3.33 | 2.72 | 0.202 |
| 8 | 10 | 81.35 | 162.7 | 28 | 22.7 | 24.22 | 215 | 430 | 74 | 60 | 64 | 2.64 | 2 | 0.203 |
| 9 | 16 | 116.8 | 156.8 | 15.8 | 14.4 | 13.8 | 584 | 784 | 79 | 72 | 69 | 5 | 3.92 | 0.227 |
| 10 | 16 | 116.8 | 156.8 | 15.8 | 14.4 | 13.8 | 584 | 784 | 79 | 72 | 69 | 5 | 3.92 | 0.227 |
| 11 | 12 | 105.6 | 172.8 | 15.4 | 13.6 | 30 | 528 | 864 | 77 | 68 | 150 | 5 | 2.57 | 0.253 |
| 12 | 18 | 126.9 | 189 | 20.4 | 18.9 | 17.4 | 423 | 630 | 68 | 63 | 58 | 3.33 | 3.04 | 0.255 |
| 13 | 18 | 126.9 | 189 | 20.4 | 18.9 | 17.4 | 423 | 630 | 68 | 63 | 58 | 3.33 | 3.04 | 0.255 |
| 14 | 18 | 126.9 | 172.8 | 14.1 | 12.3 | 17.4 | 423 | 576 | 47 | 41 | 58 | 3.33 | 3.76 | 0.255 |
| 15 | 18 | 126.9 | 172.8 | 14.1 | 12.3 | 17.4 | 423 | 576 | 47 | 41 | 58 | 3.33 | 3.76 | 0.255 |
| 16 | 18 | 132.75 | 180 | 14 | 12.5 | 18.5 | 531 | 720 | 56 | 50 | 74 | 4 | 3.81 | 0.265 |
| 17 | 18 | 132.75 | 180 | 14 | 12.5 | 18.5 | 531 | 720 | 56 | 50 | 74 | 4 | 3.81 | 0.265 |
| 18 | 24 | 150.6 | 194.4 | 16.5 | 9.9 | 15 | 502 | 648 | 55 | 33 | 50 | 3.33 | 4.44 | 0.267 |
| 19 | 24 | 150.6 | 194.4 | 16.5 | 9.9 | 15 | 502 | 648 | 55 | 33 | 50 | 3.33 | 4.44 | 0.267 |
| 20 | 14 | 119 | 173.6 | 15.8 | 11.6 | 24.2 | 595 | 868 | 79 | 58 | 121 | 5 | 3.18 | 0.273 |
| 21 | 10 | 104 | 196 | 24.4 | 20.8 | 36.4 | 260 | 490 | 61 | 52 | 91 | 2.5 | 2.13 | 0.273 |
| 22 | 22 | 116.8 | 158.4 | 13.2 | 9.4 | 14.4 | 584 | 792 | 66 | 47 | 72 | 5 | 3.81 | 0.281 |
| 23 | 12 | 104.4 | 183.6 | 21.3 | 20.1 | 28.2 | 348 | 612 | 71 | 67 | 94 | 3.33 | 2.32 | 0.31 |
| 24 | 26 | 121.2 | 156 | 11.4 | 9.9 | 10.8 | 404 | 520 | 38 | 33 | 36 | 3.33 | 4.48 | 0.324 |
| 25 | 26 | 121.2 | 156 | 11.4 | 9.9 | 10.8 | 404 | 520 | 38 | 33 | 36 | 3.33 | 4.48 | 0.324 |
| 26 | 20 | 146.02 | 189 | 18.9 | 12.5 | 14.02 | 479 | 620 | 62 | 41 | 46 | 3.28 | 4.4 | 0.327 |
| 27 | 20 | 146.02 | 189 | 18.9 | 12.5 | 14.02 | 479 | 620 | 62 | 41 | 46 | 3.28 | 4.4 | 0.327 |
| 28 | 20 | 143.7 | 186 | 18.6 | 12.3 | 13.8 | 479 | 620 | 62 | 41 | 46 | 3.33 | 4.4 | 0.332 |
| 29 | 20 | 143.7 | 186 | 18.6 | 12.3 | 13.8 | 479 | 620 | 62 | 41 | 46 | 3.33 | 4.4 | 0.332 |
| 30 | 20 | 141.38 | 183 | 18.3 | 12.1 | 13.58 | 479 | 620 | 62 | 41 | 46 | 3.39 | 4.4 | 0.336 |
| 31 | 20 | 141.38 | 183 | 18.3 | 12.1 | 13.58 | 479 | 620 | 62 | 41 | 46 | 3.39 | 4.4 | 0.336 |
| 32 | 12 | 100.56 | 161.5 | 24.3 | 17.2 | 19.44 | 269 | 432 | 65 | 46 | 52 | 2.67 | 2.65 | 0.342 |
| 33 | 24 | 118.2 | 158.4 | 13.5 | 12 | 11.4 | 394 | 528 | 45 | 40 | 38 | 3.33 | 3.94 | 0.343 |
| 34 | 24 | 118.2 | 158.4 | 13.5 | 12 | 11.4 | 394 | 528 | 45 | 40 | 38 | 3.33 | 3.94 | 0.343 |
| 35 | 12 | 99.47 | 160 | 13.6 | 11.2 | 28.53 | 373 | 600 | 51 | 42 | 107 | 3.75 | 2.64 | 0.344 |
| 36 | 12 | 111.9 | 180 | 15.3 | 12.6 | 32.1 | 373 | 600 | 51 | 42 | 107 | 3.33 | 2.64 | 0.344 |
| 37 | 12 | 124.33 | 200 | 17 | 14 | 35.66 | 373 | 600 | 51 | 42 | 107 | 3 | 2.64 | 0.344 |
| 38 | 12 | 113.05 | 180.6 | 24.5 | 16.8 | 24.5 | 323 | 516 | 70 | 48 | 70 | 2.86 | 2.67 | 0.347 |
| 39 | 12 | 107.6 | 172.8 | 26 | 18.4 | 20.8 | 269 | 432 | 65 | 46 | 52 | 2.5 | 2.65 | 0.348 |
| 40 | 10 | 120 | 195 | 21 | 15.5 | 37.5 | 240 | 390 | 42 | 31 | 75 | 2 | 2.6 | 0.353 |
| 41 | 10 | 96 | 156 | 16.8 | 12.4 | 30 | 240 | 390 | 42 | 31 | 75 | 2.5 | 2.6 | 0.353 |
| 42 | 20 | 127.08 | 169 | 20.8 | 11.7 | 11.7 | 391 | 520 | 64 | 36 | 36 | 3.08 | 4.03 | 0.358 |
| 43 | 20 | 127.08 | 169 | 20.8 | 11.7 | 11.7 | 391 | 520 | 64 | 36 | 36 | 3.08 | 4.03 | 0.358 |
| 44 | 20 | 146.63 | 195 | 24 | 13.5 | 13.5 | 391 | 520 | 64 | 36 | 36 | 2.67 | 4.03 | 0.358 |
| 45 | 20 | 146.63 | 195 | 24 | 13.5 | 13.5 | 391 | 520 | 64 | 36 | 36 | 2.67 | 4.03 | 0.358 |
| 46 | 20 | 136.85 | 182 | 22.4 | 12.6 | 12.6 | 391 | 520 | 64 | 36 | 36 | 2.86 | 4.03 | 0.358 |
| 47 | 20 | 136.85 | 182 | 22.4 | 12.6 | 12.6 | 391 | 520 | 64 | 36 | 36 | 2.86 | 4.03 | 0.358 |
| 48 | 20 | 117.3 | 156 | 19.2 | 10.8 | 10.8 | 391 | 520 | 64 | 36 | 36 | 3.33 | 4.03 | 0.358 |
| 49 | 20 | 117.3 | 156 | 19.2 | 10.8 | 10.8 | 391 | 520 | 64 | 36 | 36 | 3.33 | 4.03 | 0.358 |
| 50 | 12 | 106.56 | 183.4 | 22.5 | 20.8 | 26.32 | 251 | 432 | 53 | 49 | 62 | 2.36 | 2.39 | 0.367 |
| 51 | 14 | 101.2 | 162.4 | 21.2 | 16.8 | 18.8 | 253 | 406 | 53 | 42 | 47 | 2.5 | 2.65 | 0.369 |
| 52 | 12 | 100.4 | 172.8 | 21.2 | 19.6 | 24.8 | 251 | 432 | 53 | 49 | 62 | 2.5 | 2.39 | 0.371 |
| 53 | 12 | 117 | 180 | 18.3 | 13.2 | 28.8 | 390 | 600 | 61 | 44 | 96 | 3.33 | 2.86 | 0.379 |
| 54 | 8 | 87.96 | 158.9 | 22.7 | 18.8 | 32.63 | 248 | 448 | 64 | 53 | 92 | 2.82 | 2.24 | 0.38 |
| 55 | 16 | 124.8 | 163.2 | 17.7 | 14.7 | 13.2 | 416 | 544 | 59 | 49 | 44 | 3.33 | 4.25 | 0.381 |
| 56 | 16 | 124.8 | 163.2 | 17.7 | 14.7 | 13.2 | 416 | 544 | 59 | 49 | 44 | 3.33 | 4.25 | 0.381 |
| 57 | 8 | 101.53 | 183.4 | 26.2 | 21.7 | 37.66 | 248 | 448 | 64 | 53 | 92 | 2.44 | 2.24 | 0.381 |
| 58 | 12 | 107.45 | 155.4 | 22.4 | 14.7 | 17.85 | 307 | 444 | 64 | 42 | 51 | 2.86 | 3.24 | 0.389 |
| 59 | 12 | 122.8 | 177.6 | 25.6 | 16.8 | 20.4 | 307 | 444 | 64 | 42 | 51 | 2.5 | 3.24 | 0.389 |
| 60 | 12 | 138.15 | 199.8 | 28.8 | 18.9 | 22.95 | 307 | 444 | 64 | 42 | 51 | 2.22 | 3.24 | 0.389 |
| 61 | 20 | 116.68 | 167 | 16.7 | 15.6 | 13.84 | 531 | 760 | 76 | 71 | 63 | 4.55 | 3.32 | 0.389 |
| 62 | 20 | 116.68 | 167 | 16.7 | 15.6 | 13.84 | 531 | 760 | 76 | 71 | 63 | 4.55 | 3.32 | 0.389 |
| 63 | 12 | 91.8 | 158.4 | 21.3 | 18.3 | 21.6 | 306 | 528 | 71 | 61 | 72 | 3.33 | 2.38 | 0.391 |
| 64 | 12 | 104.7 | 169.2 | 15 | 10.8 | 30.6 | 349 | 564 | 50 | 36 | 102 | 3.33 | 2.62 | 0.401 |
| 65 | 12 | 122.15 | 197.4 | 17.5 | 12.6 | 35.7 | 349 | 564 | 50 | 36 | 102 | 2.86 | 2.62 | 0.401 |
| 66 | 20 | 125 | 161 | 16.1 | 12.3 | 10.73 | 559 | 720 | 72 | 55 | 48 | 4.47 | 4.47 | 0.401 |
| 67 | 20 | 125 | 161 | 16.1 | 12.3 | 10.73 | 559 | 720 | 72 | 55 | 48 | 4.47 | 4.47 | 0.401 |
| 68 | 12 | 117 | 180 | 24.5 | 21 | 20.5 | 234 | 360 | 49 | 42 | 41 | 2 | 2.86 | 0.409 |
| 69 | 12 | 122.77 | 187.7 | 23.7 | 10.9 | 29.39 | 259 | 396 | 50 | 23 | 62 | 2.11 | 2.89 | 0.409 |

TABLE 6-continued

| Soln | # Ps | Diameter Sun | Outer R | P out | P Out 2 | P in | Teeth Sun | Out R | P Out | P Out 2 | P in | Pitch | Ratio | Total Error |
|---|---|---|---|---|---|---|---|---|---|---|---|---|---|---|
| 70 | 12 | 129.85 | 193.2 | 23.8 | 13.3 | 28.35 | 371 | 552 | 68 | 38 | 81 | 2.86 | 3.05 | 0.41 |
| 71 | 12 | 111.3 | 165.6 | 20.4 | 11.4 | 24.3 | 371 | 552 | 68 | 38 | 81 | 3.33 | 3.05 | 0.41 |
| 72 | 12 | 103.6 | 158.4 | 20 | 9.2 | 24.8 | 259 | 396 | 50 | 23 | 62 | 2.5 | 2.89 | 0.41 |
| 73 | 12 | 129.5 | 198 | 25 | 11.5 | 31 | 259 | 396 | 50 | 23 | 62 | 2 | 2.89 | 0.41 |
| 74 | 12 | 110.33 | 168.7 | 21.3 | 9.8 | 26.41 | 259 | 396 | 50 | 23 | 62 | 2.35 | 2.89 | 0.411 |
| 75 | 20 | 154.5 | 199 | 19.9 | 15.2 | 13.27 | 559 | 720 | 72 | 55 | 48 | 3.62 | 4.47 | 0.411 |
| 76 | 20 | 154.5 | 199 | 19.9 | 15.2 | 13.27 | 559 | 720 | 72 | 55 | 48 | 3.62 | 4.47 | 0.411 |
| 77 | 24 | 133.5 | 165.6 | 12.9 | 8.7 | 11.4 | 445 | 552 | 43 | 29 | 38 | 3.33 | 5.16 | 0.414 |
| 78 | 24 | 133.5 | 165.6 | 12.9 | 8.7 | 11.4 | 445 | 552 | 43 | 29 | 38 | 3.33 | 5.16 | 0.414 |
| 79 | 12 | 86.1 | 162 | 21 | 19.8 | 24.6 | 287 | 540 | 70 | 66 | 82 | 3.33 | 2.13 | 0.414 |
| 80 | 12 | 100.45 | 189 | 24.5 | 23.1 | 28.7 | 287 | 540 | 70 | 66 | 82 | 2.86 | 2.13 | 0.414 |
| 81 | 12 | 131.2 | 198.4 | 24 | 17.6 | 27.21 | 246 | 372 | 45 | 33 | 51 | 1.88 | 2.95 | 0.415 |
| 82 | 12 | 114.8 | 173.6 | 21 | 15.4 | 23.8 | 246 | 372 | 45 | 33 | 51 | 2.14 | 2.95 | 0.415 |
| 83 | 12 | 123 | 186 | 22.5 | 16.5 | 25.5 | 246 | 372 | 45 | 33 | 51 | 2 | 2.95 | 0.415 |
| 84 | 12 | 106.6 | 161.2 | 19.5 | 14.3 | 22.1 | 246 | 372 | 45 | 33 | 51 | 2.31 | 2.95 | 0.415 |
| 85 | 12 | 105.2 | 177.6 | 20.4 | 18.8 | 26.4 | 263 | 444 | 51 | 47 | 66 | 2.5 | 2.45 | 0.417 |
| 86 | 12 | 130 | 187.2 | 27.6 | 11.2 | 25.6 | 325 | 468 | 69 | 28 | 64 | 2.5 | 3.27 | 0.419 |
| 87 | 20 | 137.5 | 185 | 20 | 15 | 13 | 550 | 740 | 80 | 60 | 52 | 4 | 3.89 | 0.419 |
| 88 | 20 | 137.5 | 185 | 20 | 15 | 13 | 550 | 740 | 80 | 60 | 52 | 4 | 3.89 | 0.419 |
| 89 | 20 | 129.25 | 173.9 | 18.8 | 14.1 | 12.22 | 550 | 740 | 80 | 60 | 52 | 4.26 | 3.89 | 0.419 |
| 90 | 20 | 129.25 | 173.9 | 18.8 | 14.1 | 12.22 | 550 | 740 | 80 | 60 | 52 | 4.26 | 3.89 | 0.419 |
| 91 | 20 | 134.75 | 181.3 | 19.6 | 14.7 | 12.74 | 550 | 740 | 80 | 60 | 52 | 4.08 | 3.89 | 0.419 |
| 92 | 20 | 134.75 | 181.3 | 19.6 | 14.7 | 12.74 | 550 | 740 | 80 | 60 | 52 | 4.08 | 3.89 | 0.419 |
| 93 | 20 | 126.5 | 170.2 | 18.4 | 13.8 | 11.96 | 550 | 740 | 80 | 60 | 52 | 4.35 | 3.89 | 0.419 |
| 94 | 20 | 126.5 | 170.2 | 18.4 | 13.8 | 11.96 | 550 | 740 | 80 | 60 | 52 | 4.35 | 3.89 | 0.419 |
| 95 | 20 | 148.5 | 199.8 | 21.6 | 16.2 | 14.04 | 550 | 740 | 80 | 60 | 52 | 3.7 | 3.89 | 0.419 |
| 96 | 20 | 148.5 | 199.8 | 21.6 | 16.2 | 14.04 | 550 | 740 | 80 | 60 | 52 | 3.7 | 3.89 | 0.419 |
| 97 | 20 | 123.75 | 166.5 | 18 | 13.5 | 11.7 | 550 | 740 | 80 | 60 | 52 | 4.44 | 3.89 | 0.419 |
| 98 | 20 | 123.75 | 166.5 | 18 | 13.5 | 11.7 | 550 | 740 | 80 | 60 | 52 | 4.44 | 3.89 | 0.419 |
| 99 | 20 | 143 | 192.4 | 20.8 | 15.6 | 13.52 | 550 | 740 | 80 | 60 | 52 | 3.85 | 3.89 | 0.419 |
| 100 | 20 | 143 | 192.4 | 20.8 | 15.6 | 13.52 | 550 | 740 | 80 | 60 | 52 | 3.85 | 3.89 | 0.419 |

These parameters for the gearbox, where the radially inner planets are all the same size and the radially outer planets are all the same size, but not necessarily the same as the inner, are believed to work:

TABLE 7

| Diameter Solution | # Planets | Sun | Outer Ring | Planet Outer | Planet Inner | Teeth Sun | Outer Ring | Planet Outer | Planet Inner | Pitch | Ratio | Total Error |
|---|---|---|---|---|---|---|---|---|---|---|---|---|
| 1 | 25 | 165.00 | 195.00 | 9.90 | 13.80 | 550 | 650 | 33 | 46 | 3.33 | 6.50 | 0.028 |
| 2 | 22 | 137.18 | 184.90 | 12.20 | 17.35 | 506 | 682 | 45 | 64 | 3.69 | 3.87 | 0.028 |
| 3 | 18 | 115.20 | 172.80 | 18.40 | 15.73 | 432 | 648 | 69 | 59 | 3.75 | 3.00 | 0.030 |
| 4 | 18 | 129.60 | 194.40 | 20.70 | 17.70 | 432 | 648 | 69 | 59 | 3.75 | 3.00 | 0.030 |
| 5 | 25 | 144.00 | 180.00 | 8.40 | 15.60 | 600 | 750 | 35 | 65 | 4.17 | 5.00 | 0.031 |
| 6 | 25 | 156.00 | 195.00 | 9.10 | 16.90 | 600 | 750 | 35 | 65 | 3.85 | 5.00 | 0.031 |
| 7 | 22 | 115.82 | 156.10 | 10.30 | 14.65 | 506 | 682 | 45 | 64 | 4.37 | 3.88 | 0.036 |
| 8 | 22 | 110.00 | 167.20 | 15.80 | 16.20 | 550 | 836 | 79 | 81 | 5.00 | 2.92 | 0.038 |
| 9 | 22 | 118.35 | 179.90 | 17.00 | 17.43 | 550 | 836 | 79 | 81 | 4.65 | 2.92 | 0.040 |
| 10 | 19 | 142.50 | 180.50 | 13.00 | 15.50 | 570 | 722 | 52 | 62 | 4.00 | 4.75 | 0.056 |
| 11 | 22 | 118.80 | 167.20 | 9.20 | 19.60 | 594 | 836 | 46 | 98 | 5.00 | 3.45 | 0.058 |
| 12 | 39 | 129.62 | 168.50 | 11.30 | 9.97 | 390 | 507 | 34 | 30 | 3.01 | 4.33 | 0.063 |
| 13 | 39 | 143.38 | 186.40 | 12.50 | 11.03 | 390 | 507 | 34 | 30 | 2.72 | 4.33 | 0.066 |
| 14 | 38 | 159.60 | 199.50 | 9.80 | 12.95 | 456 | 570 | 28 | 37 | 2.86 | 5.00 | 0.068 |
| 15 | 38 | 136.80 | 171.00 | 8.40 | 11.10 | 456 | 570 | 28 | 37 | 3.33 | 5.00 | 0.068 |
| 16 | 42 | 123.20 | 156.80 | 10.40 | 8.00 | 462 | 588 | 39 | 30 | 3.75 | 4.67 | 0.072 |
| 17 | 42 | 138.60 | 176.40 | 11.70 | 9.00 | 462 | 588 | 39 | 30 | 3.33 | 4.67 | 0.072 |
| 18 | 42 | 154.00 | 196.00 | 13.00 | 10.00 | 462 | 588 | 39 | 30 | 3.00 | 4.67 | 0.072 |
| 19 | 34 | 142.80 | 163.20 | 9.00 | 6.00 | 476 | 544 | 30 | 20 | 3.33 | 8.00 | 0.073 |
| 20 | 34 | 166.60 | 190.40 | 10.50 | 7.00 | 476 | 544 | 30 | 20 | 2.86 | 8.00 | 0.073 |
| 21 | 32 | 136.00 | 184.00 | 15.00 | 11.50 | 544 | 736 | 60 | 46 | 4.00 | 3.83 | 0.081 |
| 22 | 32 | 122.40 | 165.60 | 13.50 | 10.35 | 544 | 736 | 60 | 46 | 4.44 | 3.83 | 0.081 |
| 23 | 17 | 132.60 | 198.90 | 15.60 | 24.97 | 170 | 255 | 20 | 32 | 1.28 | 3.00 | 0.083 |
| 24 | 17 | 129.20 | 193.80 | 15.20 | 24.33 | 170 | 255 | 20 | 32 | 1.32 | 3.00 | 0.083 |
| 25 | 17 | 115.60 | 173.40 | 13.60 | 21.77 | 170 | 255 | 20 | 32 | 1.47 | 3.00 | 0.083 |
| 26 | 17 | 119.00 | 178.50 | 14.00 | 22.41 | 170 | 255 | 20 | 32 | 1.43 | 3.00 | 0.083 |
| 27 | 17 | 122.40 | 183.60 | 14.40 | 23.05 | 170 | 255 | 20 | 32 | 1.39 | 3.00 | 0.083 |
| 28 | 17 | 125.80 | 188.70 | 14.80 | 23.69 | 170 | 255 | 20 | 32 | 1.35 | 3.00 | 0.083 |
| 29 | 17 | 108.80 | 163.20 | 12.80 | 20.49 | 170 | 255 | 20 | 32 | 1.56 | 3.00 | 0.083 |
| 30 | 17 | 112.20 | 168.30 | 13.20 | 21.13 | 170 | 255 | 20 | 32 | 1.52 | 3.00 | 0.083 |
| 31 | 17 | 105.40 | 158.10 | 12.40 | 19.85 | 170 | 255 | 20 | 32 | 1.61 | 3.00 | 0.083 |

TABLE 7-continued

| Diameter Solution | # Planets | Sun | Outer Ring | Planet Outer | Planet Inner | Teeth Sun | Outer Ring | Planet Outer | Planet Inner | Pitch | Ratio | Total Error |
|---|---|---|---|---|---|---|---|---|---|---|---|---|
| 32 | 30 | 132.00 | 180.00 | 12.40 | 14.40 | 330 | 450 | 31 | 36 | 2.50 | 3.75 | 0.086 |
| 33 | 30 | 129.87 | 177.10 | 12.20 | 14.17 | 330 | 450 | 31 | 36 | 2.54 | 3.75 | 0.088 |
| 34 | 22 | 130.90 | 161.70 | 11.90 | 10.50 | 374 | 462 | 34 | 30 | 2.86 | 5.25 | 0.089 |
| 35 | 22 | 149.60 | 184.80 | 13.60 | 12.00 | 374 | 462 | 34 | 30 | 2.50 | 5.25 | 0.089 |
| 36 | 18 | 132.30 | 182.70 | 10.50 | 22.75 | 378 | 522 | 30 | 65 | 2.86 | 3.63 | 0.089 |
| 37 | 18 | 113.40 | 156.60 | 9.00 | 19.50 | 378 | 522 | 30 | 65 | 3.33 | 3.63 | 0.089 |
| 38 | 18 | 119.70 | 165.30 | 9.50 | 20.58 | 378 | 522 | 30 | 65 | 3.16 | 3.63 | 0.089 |
| 39 | 18 | 138.60 | 191.40 | 11.00 | 23.83 | 378 | 522 | 30 | 65 | 2.73 | 3.63 | 0.089 |
| 40 | 18 | 126.00 | 174.00 | 10.00 | 21.66 | 378 | 522 | 30 | 65 | 3.00 | 3.63 | 0.089 |
| 41 | 30 | 134.13 | 182.90 | 12.60 | 14.63 | 330 | 450 | 31 | 36 | 2.46 | 3.75 | 0.089 |
| 42 | 19 | 117.93 | 179.70 | 13.30 | 22.76 | 399 | 608 | 45 | 77 | 3.38 | 2.91 | 0.096 |
| 43 | 23 | 138.00 | 172.50 | 15.90 | 7.50 | 460 | 575 | 53 | 25 | 3.33 | 5.00 | 0.097 |
| 44 | 23 | 155.36 | 194.20 | 17.90 | 8.45 | 460 | 575 | 53 | 25 | 2.96 | 5.00 | 0.098 |
| 45 | 17 | 107.93 | 166.80 | 20.20 | 14.42 | 187 | 289 | 35 | 25 | 1.73 | 2.83 | 0.184 |
| 46 | 17 | 126.63 | 195.70 | 23.70 | 16.92 | 187 | 289 | 35 | 25 | 1.48 | 2.83 | 0.185 |
| 47 | 22 | 126.50 | 187.00 | 14.50 | 20.00 | 506 | 748 | 58 | 80 | 4.00 | 3.09 | 0.105 |
| 48 | 22 | 143.00 | 176.00 | 15.50 | 8.50 | 286 | 352 | 31 | 17 | 2.00 | 5.33 | 0.107 |
| 49 | 22 | 158.68 | 195.30 | 17.20 | 9.43 | 286 | 352 | 31 | 17 | 1.80 | 5.33 | 0.109 |
| 50 | 22 | 155.92 | 191.90 | 16.90 | 9.27 | 286 | 352 | 31 | 17 | 1.83 | 5.33 | 0.109 |
| 51 | 22 | 130.08 | 160.10 | 14.10 | 7.73 | 286 | 352 | 31 | 17 | 2.20 | 5.33 | 0.109 |
| 52 | 22 | 127.32 | 156.70 | 13.80 | 7.57 | 286 | 352 | 31 | 17 | 2.25 | 5.33 | 0.109 |
| 53 | 25 | 137.20 | 176.40 | 9.80 | 14.90 | 350 | 450 | 25 | 38 | 2.55 | 4.50 | 0.112 |
| 54 | 25 | 140.00 | 180.00 | 10.00 | 15.20 | 350 | 450 | 25 | 38 | 2.50 | 4.50 | 0.112 |
| 55 | 25 | 138.60 | 178.20 | 9.90 | 15.05 | 350 | 450 | 25 | 38 | 2.53 | 4.50 | 0.112 |
| 56 | 25 | 135.80 | 174.60 | 9.70 | 14.75 | 350 | 450 | 25 | 38 | 2.58 | 4.50 | 0.112 |
| 57 | 25 | 134.40 | 172.80 | 9.60 | 14.59 | 350 | 450 | 25 | 38 | 2.60 | 4.50 | 0.112 |
| 58 | 25 | 154.00 | 198.00 | 11.00 | 16.72 | 350 | 450 | 25 | 38 | 2.27 | 4.50 | 0.112 |
| 59 | 25 | 155.40 | 199.80 | 11.10 | 16.87 | 350 | 450 | 25 | 38 | 2.25 | 4.50 | 0.112 |
| 60 | 25 | 126.00 | 162.00 | 9.00 | 13.68 | 350 | 450 | 25 | 38 | 2.78 | 4.50 | 0.112 |
| 61 | 25 | 148.40 | 190.80 | 10.60 | 16.11 | 350 | 450 | 25 | 38 | 2.36 | 4.50 | 0.112 |
| 62 | 25 | 151.20 | 194.40 | 10.80 | 16.42 | 350 | 450 | 25 | 38 | 2.31 | 4.50 | 0.112 |
| 63 | 25 | 152.60 | 196.20 | 10.90 | 16.57 | 350 | 450 | 25 | 38 | 2.29 | 4.50 | 0.112 |
| 64 | 25 | 149.80 | 192.60 | 10.70 | 16.27 | 350 | 450 | 25 | 38 | 2.34 | 4.50 | 0.112 |
| 65 | 25 | 133.00 | 171.00 | 9.50 | 14.44 | 350 | 450 | 25 | 38 | 2.63 | 4.50 | 0.112 |
| 66 | 25 | 124.60 | 160.20 | 8.90 | 13.53 | 350 | 450 | 25 | 38 | 2.81 | 4.50 | 0.112 |
| 67 | 25 | 123.20 | 158.40 | 8.80 | 13.38 | 350 | 450 | 25 | 38 | 2.84 | 4.50 | 0.112 |
| 68 | 25 | 121.80 | 156.60 | 8.70 | 13.23 | 350 | 450 | 25 | 38 | 2.87 | 4.50 | 0.112 |
| 69 | 25 | 127.40 | 163.80 | 9.10 | 13.83 | 350 | 450 | 25 | 38 | 2.75 | 4.50 | 0.112 |
| 70 | 25 | 128.80 | 165.60 | 9.20 | 13.99 | 350 | 450 | 25 | 38 | 2.72 | 4.50 | 0.112 |
| 71 | 25 | 131.60 | 169.20 | 9.40 | 14.29 | 350 | 450 | 25 | 38 | 2.66 | 4.50 | 0.112 |
| 72 | 25 | 130.20 | 167.40 | 9.30 | 14.14 | 350 | 450 | 25 | 38 | 2.69 | 4.50 | 0.112 |
| 73 | 25 | 141.40 | 181.80 | 10.10 | 15.35 | 350 | 450 | 25 | 38 | 2.48 | 4.50 | 0.112 |
| 74 | 25 | 142.80 | 183.60 | 10.20 | 15.51 | 350 | 450 | 25 | 38 | 2.45 | 4.50 | 0.112 |
| 75 | 25 | 144.20 | 185.40 | 10.30 | 15.66 | 350 | 450 | 25 | 38 | 2.43 | 4.50 | 0.112 |
| 76 | 25 | 145.60 | 187.20 | 10.40 | 15.81 | 350 | 450 | 25 | 38 | 2.40 | 4.50 | 0.112 |
| 77 | 25 | 147.00 | 189.00 | 10.50 | 15.96 | 350 | 450 | 25 | 38 | 2.38 | 4.50 | 0.112 |
| 78 | 25 | 142.50 | 187.50 | 12.90 | 14.40 | 475 | 625 | 43 | 48 | 3.33 | 4.17 | 0.113 |
| 79 | 25 | 125.93 | 165.70 | 11.40 | 12.73 | 475 | 625 | 43 | 48 | 3.77 | 4.17 | 0.115 |
| 80 | 21 | 130.13 | 185.90 | 18.00 | 14.76 | 441 | 630 | 61 | 50 | 3.39 | 3.33 | 0.116 |
| 81 | 19 | 140.18 | 185.40 | 11.90 | 19.04 | 589 | 779 | 50 | 80 | 4.20 | 4.10 | 0.119 |
| 82 | 35 | 175.00 | 192.50 | 8.50 | 8.00 | 350 | 385 | 17 | 16 | 2.00 | 11.00 | 0.119 |
| 83 | 34 | 150.09 | 180.10 | 10.30 | 8.54 | 510 | 612 | 35 | 29 | 3.40 | 6.00 | 0.121 |
| 84 | 19 | 117.80 | 155.80 | 10.00 | 16.00 | 589 | 779 | 50 | 80 | 5.00 | 4.10 | 0.122 |
| 85 | 20 | 117.59 | 170.30 | 14.80 | 16.42 | 580 | 840 | 73 | 81 | 4.93 | 3.23 | 0.124 |
| 86 | 34 | 153.00 | 183.60 | 10.50 | 8.70 | 510 | 612 | 35 | 29 | 3.33 | 6.00 | 0.124 |
| 87 | 20 | 116.00 | 168.00 | 14.60 | 16.20 | 580 | 840 | 73 | 81 | 5.00 | 3.23 | 0.125 |
| 88 | 32 | 172.80 | 192.00 | 8.40 | 9.60 | 576 | 640 | 28 | 32 | 3.33 | 10.00 | 0.125 |
| 89 | 23 | 138.67 | 184.90 | 10.30 | 18.34 | 552 | 736 | 41 | 73 | 3.98 | 4.00 | 0.126 |
| 90 | 24 | 116.72 | 158.40 | 13.20 | 11.46 | 336 | 456 | 38 | 33 | 2.88 | 3.80 | 0.127 |
| 91 | 24 | 124.67 | 169.20 | 14.10 | 12.24 | 336 | 456 | 38 | 33 | 2.70 | 3.80 | 0.127 |
| 92 | 24 | 125.56 | 170.40 | 14.20 | 12.33 | 336 | 456 | 38 | 33 | 2.68 | 3.80 | 0.127 |
| 93 | 24 | 126.44 | 171.60 | 14.30 | 12.42 | 336 | 456 | 38 | 33 | 2.66 | 3.80 | 0.127 |
| 94 | 24 | 120.25 | 163.20 | 13.60 | 11.81 | 336 | 456 | 38 | 33 | 2.79 | 3.80 | 0.127 |
| 95 | 24 | 122.91 | 166.80 | 13.90 | 12.07 | 336 | 456 | 38 | 33 | 2.73 | 3.80 | 0.127 |
| 96 | 24 | 117.60 | 159.60 | 13.30 | 11.55 | 336 | 456 | 38 | 33 | 2.86 | 3.80 | 0.127 |
| 97 | 24 | 115.83 | 157.20 | 13.10 | 11.38 | 336 | 456 | 38 | 33 | 2.90 | 3.80 | 0.127 |
| 98 | 24 | 114.95 | 156.00 | 13.00 | 11.29 | 336 | 456 | 38 | 33 | 2.92 | 3.80 | 0.127 |
| 99 | 24 | 123.79 | 168.00 | 14.00 | 12.16 | 336 | 456 | 38 | 33 | 2.71 | 3.80 | 0.127 |
| 100 | 24 | 121.14 | 164.40 | 13.70 | 11.90 | 336 | 456 | 38 | 33 | 2.77 | 3.80 | 0.127 |

Whether by material choice, stiffness reducing geometric features, or both, the planet gear should have a torsional stiffness such that the inner and outer gears may flex torsionally enough to take up any manufacturing tolerance in the gears and ensure proper gear tooth contact on both the inner and outer gearsets, while retaining enough torsional stiffness to keep the inner and outer planet gears axially aligned in the system and able to transmit a local torque of a magnitude correlating to the intended maximum torque of the gear system. In addition, the bending stiffness of the planet gear should be sufficient to prevent slipping of the gear teeth due to planet bending deflection.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

That which is claimed:

1. A torque transfer device, comprising:
   a plurality of planet assemblies, each planet assembly including a respective first set of planetary gears comprising plural planetary gears connected to rotate together and wherein the plural planetary gears of the first set of planetary gears each have an equal number of gear teeth, and a respective second set of planetary gears comprising plural planetary gears corresponding to and arranged axially symmetrically with respect to the first set of planetary gears such that the plural planetary gears of the first set of planetary gears and the plural planetary gears of the second set of planetary gears are connected to rotate together on a shared axis;
   at least one sun gear, the plurality of planet assemblies arranged for planetary rotation about the at least one sun gear; and
   at least one ring gear, the plurality of planet assemblies arranged for planetary rotation within the at least one ring gear;
   wherein a first output gear of the at least one sun gear or the at least one ring gear is arranged to mesh with a respective planetary gear of each first set of planetary gears,
   wherein a first reference gear of the at least one sun gear or the at least one ring gear is arranged to mesh with a respective planetary gear of each first set of planetary gears, and
   wherein a first input gear of the at least one sun gear or the at least one ring gear is arranged to mesh with a respective planetary gear of each first set of planetary gears.

2. The torque transfer device as defined in claim 1, wherein the first output gear is provided as a first sun gear of the at least one sun gear, wherein the first reference gear is provided as a second sun gear of the at least one sun gear, and wherein the first input gear is provided as a ring gear of the at least one ring gear.

3. The torque transfer device as defined in claim 1, wherein the first output gear is provided as a first ring gear of the at least one ring gear, wherein the first reference gear is provided as a second ring gear of the at least one ring gear, and wherein the first input gear is provided as a sun gear of the at least one sun gear.

4. The torque transfer device as defined in claim 1, wherein the first input gear is provided as a first sun gear of the at least one sun gear, wherein the first reference gear is provided as a second sun gear of the at least one sun gear, and wherein the first output gear is provided as a ring gear of the at least one ring gear.

5. The torque transfer device as defined in claim 1, wherein the first input gear is provided as a first ring gear of the at least one ring gear, wherein the first reference gear is provided as a second ring gear of the at least one ring gear, and wherein the first output gear is provided as a sun gear of the at least one sun gear.

6. The torque transfer device as defined in claim 1, wherein the first output gear is provided as a first sun gear of the at least one sun gear, wherein the first input gear is provided as a second sun gear of the at least one sun gear, and wherein the first reference gear is provided as a ring gear of the at least one ring gear.

7. The torque transfer device as defined in claim 1, wherein the first output gear is provided as a first ring gear of the at least one ring gear, wherein the first input gear is provided as a second ring gear of the at least one ring gear, and wherein the first output gear is provided as a sun gear of the at least one sun gear.

8. The torque transfer device as defined in claim 1, wherein the plural planetary gears each have a number of teeth on each part, and wherein each part has a different pitch diameter.

9. The torque transfer device as defined in claim 1, wherein a second output gear of the at least one sun gear or the at least one ring gear is arranged to mesh with a respective planetary gear of each second set of planetary gears, and wherein a second reference gear of the at least one sun gear or the at least one ring gear is arranged to mesh with a respective planetary gear of each second set of planetary gears.

10. The torque transfer device as defined in claim 9, wherein the first and second reference gears are connected via a positioning shim for adjusting a relative axial positioning of the first and second reference gears.

11. The torque transfer device as defined in claim 9, wherein the first and second output gears are connected via a shim for adjusting a relative axial positioning of the first and second output gears.

12. The torque transfer device as defined in claim 9, wherein the second output gear is the first output gear or the second reference gear is the first reference gear or both.

13. The torque transfer device as defined in claim 1, wherein the second set of planetary gears of each planet assembly has a gear tooth profile axially symmetric with respect to a gear tooth profile of the corresponding first set of planetary gears.

14. The torque transfer device as defined in claim 1, wherein the first set of planetary gears are mounted on double bearings that are each adjustable by one or more bearing shims to adjust pre-load of the bearings.

15. The torque transfer device as defined in claim 1, wherein the plurality of planet assemblies number at least three.

16. The torque transfer device as defined in claim 15, wherein the plurality of planet assemblies number from five to twenty.

17. The torque transfer device as defined in claim 1, wherein the at least one sun gear or the at least one ring gear is formed of a first material with a yield strength-to-stiffness ratio between 0.010 and 0.030.

18. The torque transfer device as defined in claim 1, wherein the first set of planetary gears, the at least one sun gear and the at least one ring gear each have one or both of a conical taper and a profile shift.

19. The torque transfer device as defined in claim 1, wherein the first reference gear and the first output gear are connected via bearings, and wherein the bearings are connected to at least one of the first reference gear and the first output gear via a shim.

20. The torque transfer device as defined in claim 1, wherein the first input gear is supported by the planet assemblies.

21. The torque transfer device as defined in claim 20, wherein the first input gear comprises a rotor of an electric motor.

* * * * *